(12) United States Patent
Weiss et al.

(10) Patent No.: US 9,390,145 B2
(45) Date of Patent: *Jul. 12, 2016

(54) SYSTEM AND METHOD FOR PROVIDING RECOMMENDATIONS WITH A LOCATION-BASED SERVICE

(71) Applicant: Foursquare Labs, Inc., New York, NY (US)

(72) Inventors: Noah Weiss, New York, NY (US); Tristan Walker, Palo Alto, CA (US); Jason Liszka, New York, NY (US); Tim Julien, New York, NY (US); Justin Moore, Brooklyn, NY (US); Benjamin N. Lee, Mountain View, CA (US); Max Elliot Sklar, New York, NY (US); Blake Shaw, New York, NY (US)

(73) Assignee: FOURSQUARE LABS, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/736,456

(22) Filed: Jun. 11, 2015

(65) Prior Publication Data

US 2015/0278225 A1  Oct. 1, 2015

Related U.S. Application Data

(63) Continuation of application No. 14/283,484, filed on May 21, 2014, now Pat. No. 9,183,504, which is a continuation of application No. 13/660,261, filed on Oct. 25, 2012, now Pat. No. 8,775,351, which is a (Continued)

(51) Int. Cl.
*G06F 17/00* (2006.01)
*G06N 5/00* (2006.01)

(Continued)

(52) U.S. Cl.
CPC ...... *G06F 17/3053* (2013.01); *G06F 17/30241* (2013.01); *G06N 5/04* (2013.01);
(Continued)

(58) Field of Classification Search
USPC .......................................................... 706/45
See application file for complete search history.

(56) References Cited

U.S. PATENT DOCUMENTS

6,282,516 B1   8/2001  Giuliani
7,856,360 B2  12/2010  Kramer et al.

(Continued)

OTHER PUBLICATIONS

TripPlanner: Personalized Trip Planning Leveraging Heterogeneous Crowdsourced Digital Footprints Chao Chen; Daqing Zhang; Bin Guo; Xiaojuan Ma; Gang Pan; Zhaohui Wu IEEE Transactions on Intelligent Transportation Systems Year: 2015, vol. 16, Issue: 3 pp. 1259-1273, DOI: 10.1109/TITS.2014.2357835 IEEE Journals & Magazines.*

(Continued)

*Primary Examiner* — Michael B Holmes

(57) ABSTRACT

A mobile application is provided that provides intelligent recommendations based on the knowledge of where the user has been, and what venues the user would like to visit. Further, such an application may be capable of determining where people in a user's social network have been and what venue locations these related users would like to visit. Also, in another implementation, the application may be capable of determining where people with similar taste have been, and where they would like to go. Some or all of this information may be used by a mobile application that provides recommendations to a user. For instance, in one implementation, a user having a mobile device such as a cell phone wishes to locate a venue based on one or more parameters, and some or all of this information may be used to order to rank recommendations with the interface.

20 Claims, 37 Drawing Sheets

Related U.S. Application Data continuation of application No. 13/415,277, filed on Mar. 8, 2012, which is a continuation of application No. 13/408,150, filed on Feb. 29, 2012, now abandoned.

(60) Provisional application No. 61/450,616, filed on Mar. 8, 2011, provisional application No. 61/449,233, filed on Mar. 4, 2011, provisional application No. 61/450,616, filed on Mar. 8, 2011.

(51) Int. Cl.
*G06F 17/30* (2006.01)
*G06Q 30/02* (2012.01)
*G06N 5/04* (2006.01)
*H04W 4/02* (2009.01)
*H04W 4/20* (2009.01)
*G06Q 50/00* (2012.01)
*H04L 29/08* (2006.01)

(52) U.S. Cl.
CPC ....... *G06Q 30/0259* (2013.01); *G06Q 30/0261* (2013.01); *G06Q 50/01* (2013.01); *H04L 67/22* (2013.01); *H04W 4/021* (2013.01); *H04W 4/206* (2013.01)

(56) References Cited

U.S. PATENT DOCUMENTS

| | | | |
|---|---|---|---|
| 8,150,844 B2 | 4/2012 | Redstone et al. | |
| 8,224,766 B2* | 7/2012 | Skibiski | G06Q 30/02 706/55 |
| 8,229,458 B2 | 7/2012 | Busch | |
| 8,295,855 B2 | 10/2012 | Narayan et al. | |
| 8,333,316 B2* | 12/2012 | Heath | G06Q 10/087 235/375 |
| 8,355,987 B2 | 1/2013 | Hirson et al. | |
| 8,364,171 B2 | 1/2013 | Busch | |
| 8,437,776 B2 | 5/2013 | Busch | |
| 8,447,331 B2 | 5/2013 | Busch | |
| 8,447,760 B1* | 5/2013 | Tong | G06F 17/3053 707/714 |
| 8,515,459 B2 | 8/2013 | Busch | |
| 8,559,977 B2 | 10/2013 | Busch | |
| 8,566,236 B2 | 10/2013 | Busch | |
| 8,620,624 B2* | 12/2013 | Skibiski | H04L 41/0618 702/188 |
| 8,626,194 B2 | 1/2014 | Busch | |
| 8,626,918 B2* | 1/2014 | Moore | G06F 9/505 709/223 |
| 8,768,379 B2 | 7/2014 | Busch | |
| 8,774,839 B2 | 7/2014 | Busch | |
| 8,775,351 B2* | 7/2014 | Moore | G06Q 30/0259 706/46 |
| 8,812,500 B2* | 8/2014 | Fontes | G06F 17/30991 707/736 |
| 8,892,126 B2 | 11/2014 | Busch | |
| 8,959,098 B2* | 2/2015 | Skibiski | G06Q 30/02 455/404.2 |
| 8,972,394 B1* | 3/2015 | Tong | G06F 17/3071 707/728 |
| 8,977,612 B1* | 3/2015 | Tong | G06F 17/3071 707/728 |
| 8,996,035 B2 | 3/2015 | Busch | |
| 9,008,691 B2 | 4/2015 | Busch | |
| 9,082,082 B2* | 7/2015 | Jebara | G06N 99/005 |
| 9,183,504 B2* | 11/2015 | Moore | G06Q 30/0259 |
| 9,210,228 B2* | 12/2015 | Williams | H04L 67/306 |
| 2002/0002485 A1 | 1/2002 | O'Brien et al. | |
| 2003/0182191 A1 | 9/2003 | Oliver et al. | |
| 2006/0178932 A1 | 8/2006 | Lang | |
| 2007/0005419 A1 | 1/2007 | Horvitz et al. | |
| 2007/0192182 A1 | 8/2007 | Monaco et al. | |
| 2008/0065774 A1 | 3/2008 | Keeler | |
| 2008/0097844 A1 | 4/2008 | Hsu et al. | |
| 2008/0306826 A1 | 12/2008 | Kramer et al. | |
| 2009/0005077 A1 | 1/2009 | Forstall et al. | |
| 2009/0024477 A1 | 1/2009 | Kramer et al. | |
| 2009/0076925 A1 | 3/2009 | DeWitt et al. | |
| 2009/0102859 A1 | 4/2009 | Athsani et al. | |
| 2009/0123004 A1 | 5/2009 | Otto et al. | |
| 2009/0157513 A1 | 6/2009 | Bonev et al. | |
| 2009/0259547 A1 | 10/2009 | Clopp | |
| 2010/0076951 A1 | 3/2010 | Lyle et al. | |
| 2010/0130223 A1 | 5/2010 | Liao et al. | |
| 2010/0130233 A1 | 5/2010 | Parker | |
| 2010/0138443 A1 | 6/2010 | Ramakrishnan et al. | |
| 2010/0144367 A1 | 6/2010 | Goh et al. | |
| 2010/0153292 A1 | 6/2010 | Zheng et al. | |
| 2010/0211308 A1 | 8/2010 | Zheng et al. | |
| 2010/0318407 A1 | 12/2010 | Leff et al. | |
| 2010/0332324 A1 | 12/2010 | Khosravy et al. | |
| 2011/0087538 A1 | 4/2011 | Bous et al. | |
| 2011/0093340 A1 | 4/2011 | Kramer et al. | |
| 2011/0191180 A1 | 8/2011 | Blackhurst et al. | |
| 2011/0231233 A1 | 9/2011 | Iannace et al. | |
| 2011/0276478 A1 | 11/2011 | Hirson et al. | |
| 2011/0313826 A1 | 12/2011 | Keen et al. | |
| 2012/0047129 A1 | 2/2012 | Redstone et al. | |
| 2012/0130796 A1 | 5/2012 | Busch | |
| 2012/0197696 A1 | 8/2012 | Beyeler et al. | |
| 2012/0197709 A1 | 8/2012 | Kendall et al. | |
| 2012/0197724 A1 | 8/2012 | Kendall | |
| 2012/0203604 A1 | 8/2012 | Baker et al. | |
| 2012/0209685 A1 | 8/2012 | Nealer et al. | |
| 2012/0215614 A1 | 8/2012 | Hochstatter et al. | |
| 2012/0233158 A1 | 9/2012 | Braginsky et al. | |
| 2012/0245985 A1 | 9/2012 | Cho et al. | |
| 2012/0290383 A1 | 11/2012 | Busch | |
| 2013/0066821 A1 | 3/2013 | Moore et al. | |
| 2013/0073422 A1 | 3/2013 | Moore et al. | |
| 2013/0097022 A1 | 4/2013 | Horvitz et al. | |
| 2014/0256360 A1 | 9/2014 | Busch | |
| 2014/0358836 A1 | 12/2014 | Moore et al. | |

OTHER PUBLICATIONS

Semantic-Based Location Recommendation With Multimodal Venue Semantics Xiangyu Wang; Yi-Liang Zhao; Liqiang Nie; Yue Gao; Weizhi Nie; Zheng-Jun Zha; Tat-Seng Chua IEEE Transactions on Multimedia Year: 2015, vol. 17, Issue: 3 pp. 409-419, DOI: 10.1109/TMM.2014.2385473 IEEE Journals & Magazines.*

Mining Urban Deprivation from Foursquare: Implicit Crowdsourcing of City Land Use Daniele Quercia; Doris Saez IEEE Pervasive Computing Year: 2014, vol. 13, Issue: 2 pp. 30-36, DOI: 10.1109/MPRV.2014.31 IEEE Journals & Magazines.*

Finding relevant answers in software forums Swapna Gottipati; David Lo; Jing Jiang Automated Software Engineering (ASE), 2011 26th IEEE/ACM International Conference on Year: 2011 pp. 323-332, DOI: 10.1109/ASE.2011.6100069 IEEE Conference Publications.*

Jin, et al. (2013) Work in Progress session at PerCom 2013, San Diego 401-404 "Recommendations-based Location Privacy Control".

Li, et al. (2010) 24th IEEE International Conference on Advanced Information Networking and Applications 1255-1262 "Using Ontology for Personalized Mobile Message Computation".

Noulas, et al. (2012) ASE/IEEE International Conference on Social Computing and ASE/IEEE International Conference on Privacy, Security, Risk and Trust 144-153 "A Random Walk Around the City: New Venue Recommendation in Location-Based Social Networks".

U.S. Appl. No. 14/283,484, Notice of Allowance mailed Jul. 7, 2015, 6 pages.

U.S. Appl. No. 13/408,155, Non-Final Rejection mailed Oct. 7, 2015, 22 pages.

U.S. Appl. No. 13/408,160, Non-Final Rejection mailed Oct. 7, 2015, 24 pages.

Yingchen, et al. (2009) IITA International Conference on Services Science, Management and Engineering 336-339 "An Ontology-based Approach for Mobile Personalized Recommendation".

(56) References Cited

OTHER PUBLICATIONS

Advisory Action for U.S. Appl. No. 13/408,160, mailed Sep. 19, 2014, 6 pages.
Advisory Action for U.S. Appl. No. 13/408,155, mailed Sep. 25, 2014, 11 pages.
Advisory Action for U.S. Appl. No. 13/408,157, mailed Sep. 25, 2014, 8 pages.
Advisory Action for U.S. Appl. No. 13/415,277, mailed Nov. 14, 2014, 8 pages.
Amendment and Response for U.S. Appl. No. 13/408,155, filed Sep. 30, 2013, 8 pages.
Amendment and Response for U.S. Appl. No. 13/660,261, filed Feb. 7, 2014, 14 pages.
Amendment and Response for U.S. Appl. No. 13/408,157, filed Mar. 12, 2014, 8 pages.
Amendment and Response for U.S. Appl. No. 13/408,160, filed Mar. 13, 2014, 8 pages.
Amendment and Response for U.S. Appl. No. 13/408,168, filed Mar. 31, 2014, 10 pages.
Amendment and Response for U.S. Appl. No. 13/408,150, filed Apr. 1, 2014, 13 pages.
Amendment and Response for U.S. Appl. No. 13/408,155, filed Apr. 17, 2014, 9 pages.
Amendment and Response for U.S. Appl. No. 13/415,277, filed Apr. 18, 2014, 17 pages.
Amendment and Response for U.S. Appl. No. 13/408,160, filed Sep. 4, 2014, 9 pages.
Amendment and Response for U.S. Appl. No. 13/408,155, filed Sep. 15, 2014, 11 pages.
Amendment and Response for U.S. Appl. No. 13/408,157, filed Sep. 16, 2014, 11 pages.
Amendment and Response for U.S. Appl. No. 13/408,160, filed Oct. 9, 2014, 11 pages.
Amendment and Response for U.S. Appl. No. 13/408,155, filed Oct. 20, 2014, 12 pages.
Amendment and Response for U.S. Appl. No. 13/415,277, filed Oct. 28, 2014, 18 pages.
Amendment and Response for U.S. Appl. No. 13/408,168, filed Nov. 14, 2014, 13 pages.
Amendment and Response for U.S. Appl. No. 13/408,168, filed Dec. 29, 2014, 8 pages.
Amendment and Response for U.S. Appl. No. 13/408,150, filed Jan. 28, 2015, 16 pages.
Amendment and Response for U.S. Appl. No. 14/283,484, filed Mar. 2, 2015, 11 pages.
Duda et al. (2005) "Architectures for Mobile Device Integration into Service-Oriented Architectures" Proceedings of the International Conference on Mobile Business, 6 pages.
EESR and Search Opinion for EP Application No. 12754643.0, mailed Feb. 12, 2015, 5 pages.
Final Rejection for U.S. Appl. No. 13/408,157, mailed Mar. 27, 2014, 21 pages.
Final Rejection for U.S. Appl. No. 13/408,160, mailed Apr. 9, 2014, 20 pages.
Final Rejection for U.S. Appl. No. 13/415,277, mailed Jun. 16, 2014, 27 pages.
Final Rejection for U.S. Appl. No. 13/408,155, mailed Jun. 18, 2014, 24 pages.
Final Rejection for U.S. Appl. No. 13/408,168, mailed Jan. 16, 2015, 16 pages.
Final Rejection for U.S. Appl. No. 13/408,150, mailed May 22, 2015, 23 pages.
Howell et al. (2004) "Using a Web Service, Mobile Device and Low-Cost Robot to Teach Computer Science and Engineering" IEEE Electro/Information Technology Conference 234-245.
International Search Report for International Application No. PCT/US2012/028248, mailed Jun. 20, 2012, 2 pages.
International Search Report for International Application No. PCT/US2012/027125, mailed Aug. 7, 2012, 5 pages.
Liu, et al. (2010) "Cloud Service Portal for Mobile Device Management" IEEE International Conference on E-Business Engineering 474-478.
Non-Final Rejection for U.S. Appl. No. 13/408,155, mailed Jun. 28, 2013, 13 pages.
Non-Final Rejection for U.S. Appl. No. 13/660,261, mailed Aug. 9, 2013, 9 pages.
Non-Final Rejection for U.S. Appl. No. 13/408,157, mailed Sep. 13, 2013, 16 pages.
Non-Final Rejection for U.S. Appl. No. 13/408,160, mailed Sep. 13, 2013, 14 pages.
Non-Final Rejection for U.S. Appl. No. 13/408,168, mailed Sep. 30, 2013, 15 pages.
Non-Final Rejection for U.S. Appl. No. 13/408,150, mailed Oct. 1, 2013, 19 pages.
Non-Final Rejection for U.S. Appl. No. 13/415,277, mailed Oct. 18, 2013, 21 pages.
Non-Final Rejection for U.S. Appl. No. 13/408,168, mailed Aug. 14, 2014, 24 pages.
Non-Final Rejection for U.S. Appl. No. 13/408,150, mailed Aug. 27, 2014, 24 pages.
Non-Final Rejection for U.S. Appl. No. 14/283,484, mailed Dec. 1, 2014, 21 pages.
Notice of Allowance for U.S. Appl. No. 13/660,261, mailed Feb. 25, 2014, 27 pages.
Notice of Allowance for U.S. Appl. No. 14/283,484, mailed Mar. 16, 2015, 21 pages.
Ristola, et al. (2005) "The Effect on Familiar Mobile Device and Usage Time on Creating Perceptions Towards Mobile Services" Proceedings of the International Conference on Mobile Business, 8 pages.
U.S. Appl. No. 13/415,277, Non-Final Rejection mailed Jan. 20, 2016, 16 pages.

* cited by examiner

Online
3400

- 3401 Customer See Marketing to Go to Website
- 3402 Customer Lands on Program Landing Page
- 3403 Customer Links Their Location Based Service Identity and Loyalty Account In-Store
3410

- 3411 Customer Goes in Store
- 3412 Customer Swipes Credit Card at Checkout
- 3413 Customer Swipes Card (A)

| FIG. 34A |
| --- |
| FIG. 34B |

SYSTEM AND METHOD FOR PROVIDING RECOMMENDATIONS WITH A LOCATION-BASED SERVICE

RELATED APPLICATIONS

This application is a Continuation of U.S. application Ser. No. 14/283,484, entitled "SYSTEM AND METHOD FOR PROVIDING RECOMMENDATIONS WITH A LOCATION-BASED SERVICE," filed on May 21, 2014, which is a Continuation of U.S. application Ser. No. 13/660,261, entitled, "SYSTEM AND METHOD FOR PROVIDING RECOMMENDATIONS WITH A LOCATION-BASED SERVICE," filed Oct. 25, 2012, now U.S. Pat. No. 8,775,351 issued Jul. 8, 2014, which is a continuation of U.S. application Ser. No. 13/415,277, entitled "SYSTEM AND METHOD FOR PROVIDING RECOMMENDATIONS BY A LOCATION-BASED SERVICE," filed on Mar. 8, 2012, which claims priority under 35 U.S.C. §119(e) to U.S. Provisional Patent Application Ser. No. 61/450,616, entitled "SYSTEM AND METHOD FOR PROVIDING RECOMMENDATIONS WITH A LOCATION-BASED SERVICE," filed on Mar. 8, 2011, which applications are herein incorporated by reference by their entirety. U.S. application Ser. No. 13/415,277 is also a continuation-in-part of U.S. application Ser. No. 13/408,150, entitled "SYSTEM AND METHOD FOR MANAGING AND REDEEMING OFFERS WITH A LOCATION-BASED SERVICE" filed on Feb. 29, 2012, which claims priority under 35 U.S.C. §119(e) to U.S. Provisional Patent Application Ser. No. 61/449,233, entitled "SYSTEM AND METHOD FOR MANAGING AND REDEEMING OFFERS WITH A LOCATION-BASED SERVICE," filed on Mar. 4, 2011, and which also claims priority under 35 U.S.C. §119(e) to U.S. Provisional Patent Application Ser. No. 61/450,616, entitled "SYSTEM AND METHOD FOR PROVIDING RECOMMENDATIONS WITH A LOCATION-BASED SERVICE," filed on Mar. 8, 2011, all of which applications are herein incorporated by reference by their entirety.

BACKGROUND

There are many location-based systems in use today. In particular, location-based services such as the Foursquare system (available on the Internet at http://www.foursquare.com) permit users to verify their locations using one or more computer systems. Some services permit users to use their locations for the purpose of interacting within a social network. For instance, within one type of location-based social network, users are permitted to perform a "check-in" to particular locations, including venues such as businesses, retail locations, points of interest, or other locations. A check-in generally includes a process that identifies a user with a particular venue location at a given time, and such check-ins may be recorded over time (e.g., by a location-based social network). Such location-based social networks also permit users to interact with friends, find venues of interest, leave comments regarding particular venues, among other functions.

SUMMARY

It is appreciated that there is a need to provide more accurate and relevant recommendations by a location-based service. In one aspect of the present invention, it is desired that a mobile application be provided that provides intelligent recommendations based on the knowledge of where the user has been, and where the user would like to go. Further, such an application may be capable of determining where your friends have been and where they would like to go. Also, in another implementation, the application may be capable of determining where people with similar tastes have been, and where they would like to go. Some or all of this information may be used by a mobile application that provides recommendations to a user. For instance, in one implementation, a user having a mobile device such as a cell phone wishes to locate a venue (e.g., a restaurant or other business) based on one or more parameters, and some or all of this information may be used to order or rank recommendations within the interface of the mobile device.

It may be useful and particularly advantageous to provide recommendations using location-based services. Although locating venues based on location of a user using location-based services is known, it would be beneficial to provide higher quality recommendations to users (e.g., potential customers) using a location-based service. It is appreciated that the user benefits by having higher quality recommendations provided, and will therefore be more likely to use the location-based service. Further, because the quality of recommendations, according to one embodiment, are driven by the user interacting with the location-based service, the user will be more likely to interact with the location-based service in the future.

According to one embodiment, information associated with the user is used to determine recommendations. In one example, venue locations where the user has previously visited may influence what recommendations may be listed for a user. For instance, a location-based service may store information for each particular user, including preference information identifying preferences of particular venues the user has visited (e.g., "tips"). Further, the location-based service may store preferences for venues that the user has not yet visited (e.g., "to do" information).

In another embodiment, information associated with other users in the location-based system may be used to provide recommendations at a user. For instance, for users that are the current users "friends," information regarding what venues those users have visited, their preferences for particular venues, and preferences for venues that they have not visited may be used to influence what recommendations may be displayed to the current user. Other users not in the current user's network may also be used to determine what recommendations are displayed. For instance, certain recommendations may be determined as more popular and/or have higher quality ratings as determined by other users, specific groups of users, or the entire network itself.

A user interface may be provided that allows a user to more quickly locate desired venues. Also, because interfaces on mobile devices can display limited results, it is appreciated that the quality of recommendations within the display is important. An interface, according to one embodiment, may include an ordered list of recommendations (e.g., responsive to a query including one or more parameters such as keywords, distance, category, etc.), and this list of recommendations may be ordered based on one or more of the information items described above. According to one embodiment, the list may be adjusted according to personal information (e.g., information recorded regarding the current user's preferences and/or history), social network information (e.g., information recorded regarding the current user's friends), and/or popularity of the items themselves (e.g., as determined by group(s) of users and/or the entire network).

According to one embodiment, a search engine associated with a location-based service may provide recommendation information based on one or more inputs provided by a user (e.g., via an interface of a mobile device). For instance, a user may be located at a particular location and that user decides he/she would like to purchase food. That user may also provide more specific information (e.g., the keyword "thai") although the user could be less specific and just specify a category such as "food." In one implementation, the user may select a control on the mobile device (e.g., a button) that specifies the category "food" or lists a number of categories of interest (e.g., in a menu structure). In the example above, the user may not want to travel past a certain distance, so the interface may permit the user to enter a distance limitation to the search along with the user's current location. The search engine may use any parameters provided by the user and the system (e.g., location of the user in latitude/longitude, altitude, etc.) to determine a list of recommendations.

According to one embodiment, a ranking component may use the query results to determine a ranking of the venue locations based on one or more elements. For instance, for every venue that satisfies the original search criteria, a score may be determined based on one or more parameters. As discussed above, the list may be adjusted according to personal information, social network information, and/or popularity of the items themselves.

In one example implementation, a ranking may be provided that evaluates a particular venue (e.g., one that was returned from the query results), evaluate every venue the user has been within the location-based service (e.g., locations in which the user has "checked in") and approximate the user's rating for that particular venue. According to one embodiment, venue information may be scored using one or more functions that determine the user's preference for a particular venue. For instance, collaborative filtering functions, item-item correlation, k-nearest neighbors, or other functions may be used to determine a user's preference. Generally, such functions have been used to predict a user's affinity for certain products (e.g., movies, web pages, consumer products). However, it is appreciated that venue preferences may be predicted using such functions in a location-based service based on where the user has previously been, preferences of people in their social network, and/or preferences of the certain groups or the entire network of location-based service users.

In one example, for each venue, a system is provided that evaluates every venue (e.g., meeting the query criteria provided) where the user has previously been and approximates the user's rating of each venue using one or more functions (e.g., collaborative filtering, item-item, k-nearest neighbors, etc.). For each venue, the system may also determine if people in the user's social network (e.g., friends) have been to the venue, if so, the system may provide an approximation of the user's rating based on how much the user's social network rated the venue, visited the venue, or had an effect on any other parameter or combination thereof relating to the venue (e.g., as determined via collaborative filtering, user-user, k-nearest neighbors functions). Further, the system may determine, as a baseline measurement, how popular this particular venue is within the location-based system. These measurements may be adjusted by other factors (e.g., the probability that a user will perform a "check-in" at this venue at a particular time of day, day of week, etc.).

In one specific implementation, each venue has multiple scores associated with it, two approximations based on functions, baseline popularity as discussed above, and additional information such as preference information for venues already visited (e.g., "tips" to other users) and preferences for venues that the user has not yet visited (e.g., "to do" information). These scores may be added up for each venue, and the score may be adjusted for other factors (e.g., adjusted by the probability that the venue is open or being frequented now) and a per venue score may be determined. The output list of venues based on the original query may be ranked in the order of these final venue scores. A predetermined number of top scores may be provided to the user as recommendations. Such a list may be displayed within an interface of a mobile device associated with the user. Further, any justifications for particular rankings of recommendations may be provided to the user within the interface (e.g., "Your friend John recommended this restaurant.") to permit the user to make a more informed choice of venue.

According to another aspect, it is appreciated that a location-based service may assist with providing recommendations to a user. For instance, a location-based service may be used to store and manage recommendations for venue locations. Such recommendation information may be provided directly to users or one or more third party applications and/or systems. In one embodiment, a programmatic interface may be provided that allows third party applications to receive recommendations from the location-based service.

According to another aspect, it is appreciated that higher quality venues are desired for presentation to users. In one embodiment, it is appreciated that higher quality venues are contained by more lists of venues of more influential users of the location-based service than "average" venues. In one embodiment of a location-based service, users may be permitted to create one or more lists of venues that can be shared with other users. As discussed, it is desired that a signal indicative of the best venues would be helpful in the creation and display of a list to a user (e.g., particularly one of a location-based service that has limited display capability and/or needs to provide a limited number of recommendations). Thus, a method of ranking may be desired that provides a high-precision ranking of the "best" venues, but not necessarily a ranking of all venues, which might be typically returned in an Internet search.

To this end, it is appreciated that users of the location-based service that "follow" one or more lists of venues (e.g., in a particular geographic area, venue type, category of venue, or other parameter used to group venues) may provide better signals of what venues should be more highly ranked. For instance, a score or other type of ranking may be determined for a venue that determines how popular that venue is with "experts" in a particular category or other grouping of venues. In another example, a score or other type of ranking may be determined for a venue that identifies the number and/or quality of lists that contain this venue. For instance, the number of lists in which a venue appears may be determined and may be indicative of how good a venue is.

Also, in another example, there may be comparative rankings of lists that can be used to determine a ranking of a particular venue that is associated with the list. For instance, if a particular venue is highly ranked on a popular list, that venue may be ranked or scored relative to the list's popularity. In yet another example, tips associated with each venue that are left by users may be analyzed and scored for each venue. In one example, text associated with the tips themselves may be analyzed for particular keywords and scored depending on the types and number of keywords present. One advantage associated with some of these types of rankings discussed above is that they may be based on the analysis of users in general and are not dependent on one user's ranking or preferences. For instance, it may be beneficial in a location-based system to aggregate the responses of multiple users into a score for a particular venue, and that score may be used to rank venues within a recommendation interface presented to other users. Such a score may be determined using one or more of the scores determined based on any of the score types discussed above.

According to another aspect of the present invention, a location-based system may determine an adjustable boundary of a geographical area in which to search for venues based on a query (e.g., a query provided by a user within an interface of a mobile device). According to one embodiment, the boundary of search may be adjusted based on the density of venues within a particular area. For instance, from a particular geographic point, a radius from the geographic point may be adjusted to achieve a particular venue density within a circular area. Although a circle may be used, other boundary types and shapes may be used (e.g., square, rectangle, displayed map area, town, or similar boundary).

In another embodiment, the adjustable boundary may be determined based on a distance between subsequent "check-ins" in an area performed by users in that particular area in relation to some time. For instance, a determination may be made by the location-based system that a user checked in a certain distance from one check-in point (e.g., a first venue) to a second check-in point (e.g., a second venue). In one implementation, an average distance between check-ins (e.g., performed by one user, all users) may be used as an input to determine an adjustment of an adjustable boundary used for executing a search query for venue locations. According to one aspect, it is appreciated that the check-in history may be used as an indicator of the activity density within a particular region. In one implementation, check-in history may be used to determine a default or adjustable setting for performing a search query (e.g., as a setting in a location-based application operated by a user).

According to another aspect, it is appreciated that a time between check-ins performed with a particular venue or a time between check-ins performed by a particular user may be used by a location-based service to determine rankings of one or more venue locations. For instance, if two check-ins to a particular venue occur weeks apart, this sequence is less relevant than two check-ins that occur an hour or two apart. Further, in another example, time between check-ins may be used as a parameter to determine check-in density, which could be also used to determine an adjustable boundary for venue search.

According to one aspect of the present invention, a method for providing recommendations by a location-based service is provided. The method comprises acts of receiving, within an interface of a mobile device associated with a user, an input defining a query for a recommendation of one or more venue locations by the location-based service, determining, by the location-based service, a location of the mobile device, determining, a result set of venue locations based on the provided query, ordering, within the interface of the mobile device, a plurality of the venue locations of the result set based on at least one or more of a group of venue information comprising personal information associated with the user, the personal information relating to one or more of the plurality of venue locations, social network information relating to the one or more of the plurality of venue locations, and popularity information that identifies a popularity of the one or more of the plurality of venue locations as determined by a set of users defined in the location-based service. According to one embodiment of the present invention, the method further comprises an act of determining, for each of the venue locations in the result set, a respective score based on at least one or more of the group of venue information. According to another embodiment of the invention, the method further comprises an act of presenting, to the user in a display of the mobile device associated with the user, an input control in which the user provides one or more keywords. According to another embodiment of the invention, the method further comprises an act of presenting, to the user in a display of the mobile device associated with the user, an input control that permits the user to select a category of venues. According to another embodiment of the invention, the method further comprises an act of providing the user a control that permits the user to select a limitation of a distance from a current location of the user where recommendations will be provided.

According to one embodiment of the present invention, the personal information relating to one or more of the plurality of venue locations comprises preference information for venues already visited by the user. According to another embodiment of the invention, the personal information relating to one or more of the plurality of venue locations comprises preference information for venues not yet visited by the user. According to another embodiment of the invention, the social network information relating to the one or more of the plurality of venue locations comprises preference information for venues already visited by one or more users in the social network. According to another embodiment of the invention, the method further comprises an act of determining a popularity measure of the one or more of the plurality of venue locations as determined by the set of users defined in the location-based service. According to another embodiment of the invention, the act of determining, for each of the venue locations in the result set, the respective score based on the at least one or more of the group of venue information further comprises acts of determining respective scores for each venue location in the result set based on more than one of the personal information, the social network information, and the popularity information. According to another embodiment of the invention, the method further comprises determining scores for each venue location based on the personal information, the social network information, and the popularity information and combining the scores to produce a total score for each venue location. According to another embodiment of the invention, the method further comprises an act of using a collaborative filtering function for determining the score of each venue locations in the result set using at least one or more of the group of venue information.

According to one embodiment of the present invention, the method further comprises an act of using a user-user filtering function for determining the score of each venue locations in the result set using at least one or more of the group of venue information. According to another embodiment of the invention, the method further comprises an act of using a k-nearest neighbors filtering function for determining the score of each venue locations in the result set using at least one or more of the group of venue information. According to another embodiment of the invention, the method further comprises an act of adjusting the respective score for at least one of the venue locations in the result set responsive to one or more factors relating to the at least one of the venue locations. According to another embodiment of the invention, the one of more factors includes at least one of a probability that the at least one of the venue locations is currently open and information identifying that the at least one of the venue locations is currently being frequented. According to another embodiment of the invention, the act of ordering the plurality of venue locations is responsive to a determination of popularity of each of the plurality of venue locations, the determination of popularity for a respective one of the plurality of venue locations being based on whether the respective one venue appears on a list of venues.

According to one embodiment of the invention, the act of ordering the plurality of venue locations is responsive to a determination of popularity of each of the plurality of venue locations, the determination of popularity of a respective one of the plurality of venue locations being based on how popular the respective one venue is with one or more experts. According to another embodiment of the invention, the method further comprises an act of determining the one or more experts based on their activity within the location-based service. According to another embodiment of the invention, the act of ordering the plurality of venue locations is responsive to a determination of sentiment of each of the plurality of venue locations. According to another embodiment of the invention, the determination of sentiment comprises an act of determining, for at least one venue of the plurality of venue locations, an indication of sentiment based on review information provided by users for the at least one venue to the location-based service. According to another embodiment of the invention, the method further comprises an act of limiting the result set of venue locations responsive to a determination of densities of venues in a particular area. According to another embodiment of the invention, the method further comprises an act of limiting the result set of venue locations responsive to a determination of a distance between subsequent check-ins in a particular area. According to another embodiment of the invention, the method further comprises an act of determining the distance between subsequent check-ins for a plurality of users within the particular area.

According to one aspect of the present invention, a system for providing recommendations in a distributed communications network is provided. The system comprises a location-based service including a distributed computer system having at least one processor and a memory, an interface adapted to receive an input from a mobile device defining a query for a recommendation of one or more venue locations by the location-based service, a component for determining, by the location-based service, a location of the mobile device, a component adapted to determine a result set of venue locations based on the provided query, a component adapted to order, within the interface of the mobile device, a plurality of the venue locations of the result set based on at least one or more of a group of venue information comprising personal information associated with the user, the personal information relating to one or more of the plurality of venue locations, social network information relating to the one or more of the plurality of venue locations, and popularity information that identifies a popularity of the one or more of the plurality of venue locations as determined by a set of users defined in the location-based service. According to one embodiment of the present invention, the system further comprises a component adapted to determine, for each of the venue locations in the result set, a respective score based on at least one or more of the group of venue information. According to another embodiment of the invention, the system further comprises a component adapted to present, to the user in a display of the mobile device associated with the user, an input control in which the user provides one or more keywords. According to another embodiment of the invention, the system further comprises a component adapted to present, to the user in a display of the mobile device associated with the user, an input control that permits the user to select a category of venues.

According to another embodiment of the invention, the system further comprises a control that permits the user to select a limitation of a distance from a current location of the user where recommendations will be provided. According to another embodiment of the invention, the personal information relating to one or more of the plurality of venue locations comprises preference information for venues already visited by the user. According to another embodiment of the invention, the personal information relating to one or more of the plurality of venue locations comprises preference information for venues not yet visited by the user. According to another embodiment of the invention, the social network information relating to the one or more of the plurality of venue locations comprises preference information for venues already visited by one or more users in the social network. According to another embodiment of the invention, the system further comprises a component adapted to determine a popularity measure of the one or more of the plurality of venue locations as determined by the set of users defined in the location-based service. According to another embodiment of the invention, the component that is adapted to determine, for each of the venue locations in the result set, the respective score based on the at least one or more of the group of venue information further comprises a component adapted to determine respective scores for each venue location in the result set based on more than one of the personal information, the social network information, and the popularity information.

According to one embodiment of the present invention, the system further comprises a component adapted to determine scores for each venue location based on the personal information, the social network information, and the popularity information and combining the scores to produce a total score for each venue location. According to another embodiment of the invention, the system further comprises a component adapted to perform a collaborative filtering function for determining the score of each venue locations in the result set using at least one or more of the group of venue information. According to another embodiment of the invention, the system further comprises a component adapted to perform a user-user filtering function for determining the score of each venue locations in the result set using at least one or more of the group of venue information. According to another embodiment of the invention, the system further comprises a component adapted to perform a k-nearest neighbors filtering function for determining the score of each venue locations in the result set using at least one or more of the group of venue information. According to another embodiment of the invention, the system further comprises a component adapted to adjust the respective score for at least one of the venue locations in the result set responsive to one or more factors relating to the at least one of the venue locations. According to another embodiment of the invention, the one or more factors includes at least one of a probability that the at least one of the venue locations is currently open and information identifying that the at least one of the venue locations is currently being frequented.

According to one embodiment of the present invention, the component adapted to order the plurality of venue locations is responsive to a component adapted to determine a popularity of each of the plurality of venue locations, the popularity for a respective one of the plurality of venue locations being based on whether the respective one venue appears on a list of venues. According to another embodiment of the invention, the component adapted to order the plurality of venue locations is responsive to a component adapted to determine a popularity of each of the plurality of venue locations, the popularity for a respective one of the plurality of venue locations being based on how popular the respective one venue is with one or more experts. According to another embodiment of the invention, the system further comprises a component adapted to determine the one or more experts based on their activity within the location-based service. According to another embodiment of the invention, the component adapted to order the plurality of venue locations is responsive to a component adapted to determine sentiment of at least one of the plurality of venue locations. According to another embodiment of the invention, the component adapted to determine sentiment comprises a component adapted to determine, for at least one venue of the plurality of venue locations, an indication of sentiment based on review information provided by users for the at least one venue to the location-based service.

According to one embodiment of the invention, the system further comprises a component adapted to limit the result set of venue locations responsive to a determination of densities of venues in a particular area. According to another embodiment of the invention, the system further comprises a component adapted to limit the result set of venue locations responsive to a determination of a distance between subsequent check-ins in a particular area. According to another embodiment of the invention, the system further comprises a component adapted to determine the distance between subsequent check-ins for a plurality of users within the particular area.

Still other aspects, examples, and advantages of these exemplary aspects and examples, are discussed in detail below. Moreover, it is to be understood that both the foregoing information and the following detailed description are merely illustrative examples of various aspects and examples, and are intended to provide an overview or framework for understanding the nature and character of the claimed aspects and examples. Any example disclosed herein may be combined with any other example in any manner consistent with at least one of the objects, aims, and needs disclosed herein, and references to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. The appearances of such terms herein are not necessarily all referring to the same example.

It may be useful and particularly advantageous to third party providers to engage customers using location-based services. Although location-based advertisements using location-based services are known, it would be beneficial to more adequately engage customers using a location-based service. Further, it is appreciated that it may be more effective to make offers to and otherwise engage a user while the user is located at or near the venue location, as the user is more likely to accept an offer at that particular location.

To this end, a location-based service may be provided that may be integrated with venue systems, credit card processing systems, and/or loyalty systems for purposes of increasing the likelihood that offers will be accepted and sales of products and services will be made. Such a system according to various embodiments may leverage a social network of the user, and extend particular brand loyalties throughout the social network. That is, certain offers may be passed among users of the social network, permitting others to take advantage of offers thereby increasing the brand awareness and loyalty of particular venues. For instance, in one embodiment, a first user may send another user within his/her social network an indication of an offer that may be available. In another example, a user may be provided the ability to permit other users in his/her social network to redeem offers originally made to the user.

Further, according to certain embodiments, because an offer management and redemption system may be integrated with a location-based service, offers may be extended at or near the venue location. To this end, users may be provided one or more tools for accepting, redeeming, and fulfilling offers. Further, tools may be provided for making an associated purchase, and fulfilling that purchase (e.g., receiving goods or services at a venue location).

According to one embodiment, offers are made to loyalty cardholders having loyalty program memberships. In one embodiment, such offers are capable of being viewed by users who are not members currently of the loyalty program, but they may be provided an opportunity to join the loyalty program to be permitted to redeem the offer. When a user "checks in" to a particular venue location, offers associated with that venue are displayed to the user in the display of a mobile device (e.g., smart phone, cell phone, etc.). The user may then accept and/or redeem one or more offers at the venue. For instance, the user may select one or more offers within the display to be redeemed at the venue location. Such offers may be displayed to the user based on any number of criteria, including previous purchase history of the user, offers redeemed by people in the user's social network, rating information collected on a particular offer, or other criteria, either alone or in combination with other information or criteria.

In another embodiment, offers are made to credit card holders that have a credit card account with a particular company. According to one embodiment, an offer may be made to a credit card holder that can be applied to the credit card holder's statement removing the need for a merchant to be involved in the redemption and crediting of a discount. Because the merchant does not have to be involved in the processing of the offer, it becomes easier to roll out particular offers to various locations, and to create offers that are independent of particular merchants. In one embodiment, a location-based service may be used to assist in processing such offers and notifying users that these offers have been applied to their accounts.

According to one embodiment, the location-based service may provide a control, that, when activated by a user at a merchant location, will notify a credit card system that the user intends to accept and/or redeem a particular offer. When the credit card is swiped at the location and the transaction completed, the credit card system may send transaction details to the location-based service, and the location-based service may notify the user that the transaction was completed. Further, the notification may be displayed to the user and may indicate that the offer was accepted, and any savings that the user might receive on his/her credit card statement.

According to various embodiments of the present invention, a location-based service may present offers that can be accepted by a user in a variety of ways. For instance, the location-based service may display offers in a disabled state within a display of the mobile device until the user of the mobile device "checks in" to that particular venue location. When the user checks in, the system may permit the user to accept and/or redeem that particular offer. A credit card company or other provider may provide a number of offers correlated to particular venue locations. These venue locations may be "owned" and maintained within the location-based service by a merchant. When users "check in," they may be permitted to accept offers correlated with the checked in venue location.

In another embodiment, a user may selectively allow the location-based service to send offers to the user's mobile device as the user changes his/her location. These offers may be targeted to particular graphical areas or regions. Venue owners may be permitted to associate, within a management interface of a location-based service, one or more offers to a particular region. If a user having a mobile device and location-based service program enters that region, an indication of an offer may be presented to the user. In this way, the likelihood of an offer being accepted is higher, as the indication is provided to the user while they are within the targeted region.

Further, particular offers may be targeted to particular users based on one or more criteria. For instance, certain users may be presented particular offers based on demographic information, information provided by the user, or other information, along or in combination with other information. In one example implementation, a user may be targeted for a particular offer based on an indication that the user would like to visit a particular venue location in the future (e.g., a "to do" list). For instance, if a particular user indicated that he/she wanted to visit a Starbucks location, an offer system may target the user to receive an offer at that particular entry in the user's "to-do" list.

To enable acceptance and/or redemption of particular offers, a location-based service may pass an indication (e.g., a message using a communication protocol) to a credit card system, the message including one or more data items. For instance, the indication may include an identifier of the venue (e.g., a unique venue identifier), a user identifier (e.g., a user id of the location-based service or credit card username), and/or an identifier of the offer that is to be accepted and/or redeemed. In one implementation, the offer identifier may be associated with a particular discount or the message may indicate what discount should be applied to the user's account. The credit card system may associate that offer identifier with a credit card account for the user (e.g., to apply a discount to his/her statement). In response to this offer being accepted, the credit card system may send an acknowledgement message to the location-based service indicating that the offer is associated with the credit card account of the user. The location-based service may in turn notify the user (e.g., via the mobile device), that the offer was accepted and applied to his/her account.

In another embodiment, a third party provider of offers may be capable of distributing such offers via the location-based service. For instance, a third party provider of coupons may indicate particular coupon offers that are available to the user based on their location (e.g., as determined by the location of a mobile device, such as a smartphone). The third party may associate certain offers with certain venue locations in the location-based service by creating the offer in the location-based service, determine venues to which the offer applies, and associate the offer with the venue location in the location-based service. Once created, the user may be capable of redeeming the offer when they are proximate to the venue location with which the offer is associated.

According to another embodiment it is appreciated that while some offers will need to be redeemed from the venue location, other types of offers can be redeemed from any location. In one implementation, the user is notified about the offer when the user is close to a particular location (e.g., the venue location). Such a notification may be presented to the user, for example, using an interface of a mobile device. For instance, an indicator in a display of the mobile device may show an offer to a user responsive to the user moving to a particular location (e.g., proximate to a particular venue location).

In one embodiment, the offer redemption may be completed on the mobile device, and the user may proceed to the venue to claim the product or service. In another embodiment, an interface may be provided on the mobile device or a merchant device located at the venue that receives information from the user required to accept the offer. In one embodiment, coupon offers may be printed at check-out at a venue location (e.g., as printed by a Catalina printer or other method) and may be redeemed during the current transaction (e.g., if there is a qualifying purchase).

In yet another embodiment, a merchant may be capable of providing one or more offers responsive to a user "checking in" to a particular location. In one embodiment, an association is made between a location-based service user identification and a loyalty program identity. Because an association is made using the user identification of the location-based service that tracks the user's location, actions performed using the location-based service at that location can be applied to the loyalty program account. Conversely, use of a loyalty program account at a venue location can be used to "check in" the user to that particular venue location (e.g., an action of a user "swiping" their loyalty program card at the venue location may be used to automatically "check in" the user within the location-based service.

In one embodiment, an interface may be provided on the mobile device that lists offers available nearby the location of the user. For instance, the offers may be shown as an ordered list within the interface based on distance. Such a display may be useful for notifying a user of an offer that he/she would likely accept based on his/her interests and the location of the user. Such a display may also include offers based on the interest(s) of other users within the social network of the user, recommendations by users in their network, and/or popularity of the offer (e.g., as determined by acceptances, rating in the social network, etc.). In one embodiment, users may opt in to receive offers that are available nearby the user's location. Such offers may be "pushed" to users as the user changes location. Location along with any other criteria may be used to determine whether a user may be presented with an offer.

According to another aspect, it is appreciated that a location-based service may assist with the management and redemption of offers for a number of third party services. For instance, a location-based service may be used to manage offers for credit card providers, wireless (e.g., Bluetooth) payment systems, "powered" cards such as dynamic credit cards that create unique codes to perform transactions, loyalty programs and cards, NFC sticker programs (e.g., that are placed on mobile phones to perform transactions), NFC-capable devices (e.g., a mobile phone, NFC card, etc.), rewards points programs, third party coupon providers, merchants, or any other provider or service. There may be certain programs that have different aspects of different types of programs (e.g., certain "powered" cards permit purchases to be applied to a credit card account or loyalty points may be used for conducting a transaction by activating a switch on the powered card).

Tools may be provided that associate offers with particular identities of a user in the location-based service, as well as identities of the user within the third party program (e.g., a credit card account, loyalty account, or other identity in any other program). Tools may also be provided to discern between different accounts to which the offer may apply (e.g., a credit card account vs. a loyalty account). As discussed above, there may be an interface tool presented on a display of a mobile device that permits an association of an offer with a particular program and/or identity of the user within that program. For instance, an interface control may be provided that when selected by the user, permits an offer to be associated with an account (e.g., a credit card or other type of account). In other implementations, offers may be associated dynamically based on the user's location as determined by the location-based service.

Yet other aspects of the present invention allow a location-based service to provide offers in real time to users based on users' locations. Such offers may be sourced from within the location-based service (e.g., provided by venue owners and defined on their venue objects), or may be sourced from locations outside of the location-based system. For instance, offers may be associated with venue locations via an API provided to companies that create offers such as merchants or companies that receive and process offers on behalf of providers (e.g., Groupon). In yet another implementation, the location-based service may be integrated with one or more offer providers, and the system may be adapted to pull offers into the location-based system and provide them to users.

Other embodiments of the present invention may relate to targeting offers to particular users based on one or more criteria. For instance, particular offers may be made and/or presented to the user of a mobile device based on the determined location of that particular device. Offers presented may also be determined based on whether a particular user "checked-in" to the venue associated with the offer previously and/or presently. Further, offers may be targeted to users based on their social network relation to other users. For instance, some people may "follow" other users, companies, or products on a social network such as the Twitter network, Facebook network or other network types, and based on that following, certain offers may be targeted responsive to that relation. In yet another implementation, users that are friends of other users that follow particular users, companies or products may also be targeted for offers based on that relation.

In another embodiment, the user may be presented an indication that identifies a justification for an offer presented to a user. For instance, a user may be shown an indication that identifies a social relation to another user (e.g., "Your friend Fred recommended this restaurant") within the interface that displays the offer. Because there is a context being presented along with the offer, the user may be more likely to redeem particular offers based on the justification provided. According to one embodiment, a location-based service may present personal justifications for particular offers (e.g., "You have been to 7 related places") that indicate a user's behavior that led to an offer being presented.

In another example, the location-based service may present to a user a social network related justification that depends on what the user's social network has done at a particular venue. For instance, a social justification may indicate "7 friends have been here" and a search may be performed of the user's network based on a particular venue to determine appropriate offers to be targeted to a particular user. Offers may also be targeted to users within a social network (e.g., a user and their immediate friends), whereby a notification may be sent targeting a particular offer to a group of users in a social network. Such targeting may be in response to one or more of the users having a social connection purchasing or otherwise accepting a particular offer.

Offers may be targeted based on social information or other information, either alone or in combination. For instance, offers may also be targeted to users based on the rate at which a particular offer is being accepted, loyalty metrics such as frequency of visit, recency of visit, spend amount (e.g., average, peak, volume, etc.), or other information relating to the user such as the behavior of the user, demographic information, among other types.

According to one aspect of the present invention, a method for processing an offer is provided. The method comprises acts of storing, in a distributed computer system of a location-based service, at least one offer; associating the at least one offer with a credit card program, determining a location of a mobile device associated with a user, determining that the determined location is proximate to a venue at which the at least one offer may be redeemed, presenting, to the user in a display of the mobile device associated with the user, an indication of the at least one offer responsive to the act of determining that the determined location is proximate to a venue at which the at least one offer may be redeemed, and permitting the user to redeem the offer at the venue. According to one embodiment of the present invention, the method further comprises an act of storing an indication in the distributed computer system of the location-based service, the indication identifying that the user is checked in to the venue. According to another embodiment of the invention, the act of presenting the indication of the at least one offer is responsive to an act of providing a control of the mobile device that, when activated, displays one or more offers that are capable of being redeemed at the location of the mobile device. According to another embodiment of the invention, the method further comprises an act of associating an identity of the user in the location-based service with an identity of the user in the credit card program. According to another embodiment of the invention, one or more offers are displayed only if the user is an authorized account holder in the credit card program.

According to one embodiment of the present invention, the method further comprises an act of permitting the user to select, within the display of the at least one offer, a control that associates the at least one offer with the identity of the user in the credit card program. According to another embodiment of the invention, the method further comprises an act of storing, by the distributed computer system of a location-based service, an indication of the association of the at least one offer associated with the identity of the user in the credit card program. According to another embodiment of the invention, the method further comprises an act of accepting, from the user at the venue, the identity of the user in the credit card program, retrieving the indication of the association of the at least one offer associated with the identity of the user in the credit card program, and applying the at least one offer to a transaction involving the user at the venue. According to another embodiment of the invention, the act of accepting, from the user at the venue, the identity of the user in the credit card program comprises an act of scanning a credit card at the venue.

According to one embodiment of the present invention, the method further comprises an act of sending, by a computer system associated with the venue to the distributed computer system of the location-based service, an indication that the at least one offer was redeemed at the venue. According to another embodiment of the invention, the method further comprises indicating, to the user in the display of the mobile device, the indication that the at least one offer was redeemed at the venue. According to another embodiment of the invention, the method further comprises applying, by a computer system operated by a credit card company, the at least one redeemed offer to a credit card associated with the user.

According to one aspect of the present invention, a method for processing an offer is provided. The method comprises acts of storing, in a distributed computer system of a location-based service, at least one offer; associating the at least one offer with a credit card program, determining a location of a mobile device associated with a user, determining that the determined location is proximate to a venue at which the at least one offer is available, presenting, to the user in a display of the mobile device associated with the user, an indication of the at least one offer responsive to the act of determining that the determined location is proximate to a venue at which the at least one offer is available, and permitting the user to accept the offer. According to one embodiment of the invention, the method further comprises an act of storing an indication in the distributed computer system of the location-based service, the indication identifying that the user is checked in to the venue. According to another embodiment of the invention, the act of presenting the indication of the at least one offer is responsive to an act of providing a control of the mobile device that, when activated, displays one or more offers that are capable of being accepted at the location of the mobile device. According to another embodiment of the invention, the method further comprises an act of associating an identity of the user in the location-based service with an identity of the user in the credit card program. According to another embodiment of the invention, one or more offers are displayed only if the user is an authorized account holder in the credit card program.

According to one embodiment of the present invention, the method further comprises an act of permitting the user to select, within the display of the at least one offer, a control that associates the at least one offer with the identity of the user in the credit card program. According to another embodiment of the invention, the method further comprises an act of storing, by the distributed computer system of a location-based service, an indication of the association of the at least one offer associated with the identity of the user in the credit card program. According to another embodiment of the invention, the method further comprises an act of accepting, from the user at the venue, the identity of the user in the credit card program, retrieving the indication of the association of the at least one offer associated with the identity of the user in the credit card program, and applying the at least one offer to a transaction involving the user at the venue. According to another embodiment of the invention, the act of accepting, from the user at the venue, the identity of the user in the credit card program comprises an act of scanning a credit card at the venue.

According to one embodiment of the present invention, the method further comprises an act of sending, by a computer system associated with the venue to the distributed computer system of the location-based service, an indication that the at least one offer was accepted. According to another embodiment of the invention, the method further comprises indicating, to the user in the display of the mobile device, the indication that the at least one offer was accepted. According to another embodiment of the invention, the method further comprises applying, by a computer system operated by a credit card company, the at least one accepted offer to a credit card associated with the user. According to another embodiment of the invention, the method further comprises an act of permitting the user to accept the at least one offer using the mobile device. According to another embodiment of the invention, the method further comprises an act of permitting the user to accept the at least one offer at the venue. According to another embodiment of the invention, the method further comprises an act of indicating to the user in the display of the mobile device an acceptance of the at least one offer.

According to one embodiment of the present intention, the method further comprises an act of permitting the user to fulfill the acceptance of the at least one offer at the venue responsive to the display of the acceptance of the at least one offer. According to another embodiment of the invention, the method further comprises acts of displaying information relating to the acceptance of the at least one offer and using, at the venue, the displayed information to fulfill the acceptance of the at least one offer. According to another embodiment of the invention, the method further comprises an act of permitting the user to execute a purchase associated with the at least one offer using the mobile device.

According to one aspect of the present invention, a system for processing an offer is provided. The system comprises a location-based service including a distributed computer system having at least one processor and a memory, a component for storing, in the memory, at least one offer, a component for storing, in the memory, an association of the at least one offer with a credit card program, a component for determining a location of a mobile device associated with a user, a component that determines that the determined location is proximate to a venue at which the at least one offer may be accepted, a display component configured to present, to the user in a display of the mobile device associated with the user, an indication of the at least one offer responsive to determining that the determined location is proximate to a venue at which the at least one offer may be accepted, and a component that permits the user to accepted the offer. According to one embodiment of the present invention, the system further comprises a component configured to store an indication in the memory of the distributed computer system of the location-based service, the indication identifying that the user is checked in to the venue. According to another embodiment of the invention, the display component configured to present the indication of the as least one offer is responsive to a control of the mobile service that, when activated, displays one or more offers that are capable of being accepted at the location of the mobile device.

According to one embodiment of the present invention, the system further comprises a component configured to associate an identity of the user in the location-based service with an identity of the user in the credit card program. According to another embodiment of the invention, one or more offers are displayed only if the user is an authorized account holder in the credit card program. According to another embodiment of the invention, the system further comprises a component that permits the user to select, within the display of the at least one offer, a control that associates the at least one offer with the identity of the user in the credit card program. According to another embodiment of the invention, the system further comprises a component for storing, in the memory of the distributed computer system of the location-based service, an indication of the at least one offer associated with the identity of the user in the credit card program. According to another embodiment of the invention, the system further comprises a component configured to accept, from the user at the venue, the identity of the user in the credit card program, a component configured to retrieve the indication of the association of the at least one offer associated with the identity of the user in the credit card program, and a component configured to apply the at least one offer to a transaction involving the user at venues.

According to one embodiment of the present invention, the component configured to accept the identity of the user in the credit card program comprises a scanner configured to scan a credit card at the venue. According to another embodiment of the invention, the system further comprises a component of a computer system associated with the venue, the component being configured to send to the distributed computer system of the location-based service, an indication that the at least one offer was accepted. According to another embodiment of the invention, the system further comprises a component adapted to indicate, to the user in the display of the mobile device, the indication that the at least one offer was accepted. According to another embodiment of the invention, the system further comprises a component adapted to apply the as least one accepted offer to a credit card account associated with the user.

According to one aspect of the present invention, a method for processing an offer is provided. The method comprises acts of storing, in a distributed computer system of a location-based service, at least one offer, storing, in the distributed computer system, an association of the at least one offer with a loyalty program, determining a location of a mobile device associated with a user, determining that the determined location is proximate to a venue at which the at least one offer may be accepted, presenting, to the user in a display of the mobile device associated with the user, an indication of the at least one offer responsive to the act of determining that the determined location is proximate to a venue at which the at least one offer may be accepted, and permitting the user to accept the offer. According to one embodiment of the present invention, the method further an act of storing an indication in the distributed computer system of the location-based service, the indication identifying that the user is checked in to the venue. According to another embodiment of the present invention, the act of presenting the indication of the at least one offer is responsive to an act of providing a control of the mobile device that, when activated, displays one or more offers that are capable of being accepted at the location of the mobile device. According to another embodiment of the present invention, the method further comprises an act of associating an identity of the user in the location-based service with an identity of the user in the loyalty program.

According to one embodiment of the present invention, the method further comprises an act of permitting the user to select, within the display of the at least one offer, a control that associates the at least one offer with the identity of the user in the loyalty program. According to another embodiment of the invention, the method further comprises an act of storing, by the distributed computer system of a location-based service, an indication of the association of the at least one offer associated with the identity of the user in the loyalty program. According to another embodiment of the invention, the method further comprises an act of accepting, from the user at the venue, the identity of the user in the loyalty program, retrieving the indication of the association of the at least one offer associated with the identity of the user in the loyalty program, and applying the at least one offer to a transaction involving the user at the venue. According to another embodiment of the invention, the act of accepting, from the user at the venue, the identity of the user in the loyalty program comprises an act of scanning a loyalty program card at the venue.

According to one embodiment of the present invention, the method further comprises an act of sending, by a computer system associated with the venue to the distributed computer system of the location-based service, an indication that the at least one offer was accepted at the venue. According to another embodiment of the invention, the method further comprises indicating, to the user in the display of the mobile device, the indication that the at least one offer was accepted at the venue.

According to one aspect of the present invention, a system for processing an offer is provided. The system comprises a location-based service including a distributed computer system having at least one processor and a memory, a component for storing, in the memory, at least one offer, a component for storing, in the memory, an association of the at least one offer with a loyalty program, a component for determining a location of a mobile device associated with a user, a component that determines that the determined location is proximate to a venue at which the at least one offer may be accepted, a display component configured to present, to the user in a display of the mobile device associated with the user, an indication of the at least one offer responsive to determining that the determined location is proximate to a venue at which the at least one offer may be accepted, and a component that permits the user to accept the offer. According to one embodiment of the present invention, the system further comprises a component configured to store an indication in the distributed computer system of the location-based service, the indication identifying that the user is checked in to the venue. According to another embodiment of the invention, the display component configured to present the indication of the at least one offer is responsive to a control of the mobile device that, when activated, displays one or more offers that are capable of being redeemed at the location of the mobile device. According to another embodiment of the invention, the system further comprises a component configured to associate an identity of the user in the location-based service with an identity of the user in the loyalty program.

According to one embodiment of the present invention, the system further comprises a component configured to permit the user to select, within the display of the at least one offer, a control that associates the at least one offer with the identity of the user in the loyalty program. According to one embodiment of the present invention, the system further comprises a component configured to store, by the distributed computer system of a location-based service, an indication of the association of the at least one offer associated with the identity of the user in the loyalty program. According to another embodiment of the invention, the system further comprises a component configured to accept, from the user at the venue, the identity of the user in the loyalty program, a component to retrieve the indication of the association of the at least one offer associated with the identity of the user in the loyalty program, and a component configured to apply the at least one offer to a transaction involving the user at the venue. According to another embodiment of the present invention, the component configured to accept, from the user at the venue, the identity of the user in the loyalty program comprises a scanner configured to scan a loyalty program card at the venue. According to another embodiment of the present invention, the system further comprises a component configured to send, from a computer system associated with the venue to the distributed computer system of the location-based service, an indication that the at least one offer was accepted at the venue. According to another embodiment of the present invention, the system further comprises a component configured to indicate, to the user in the display of the mobile device, the indication that the at least one offer was accepted at the venue.

According to one aspect of the present invention, a method for processing an offer is provided. The method comprises acts of determining, in a distributed computer system of a location-based service, a location-based service identity of a user, defining, in a computer system of a loyalty program, a loyalty program identity associated with the a loyalty program account, associating, within the distributed computer system of a location-based service, the location-based service identity of the user with the loyalty program identity, determining a location of a mobile device associated with the user, and performing an action relating to the loyalty program identity associated with the a loyalty program account responsive to the determined location. According to one embodiment of the present invention, the method further comprises an act of storing, in the distributed computer system of a location-based service, at least one offer associated with a loyalty program. According to another embodiment of the invention, the method further comprises an act of determining that the determined location is proximate to a venue at which the at least one offer may be accepted. According to another embodiment of the invention, the method further comprises an act of presenting, to the user in a display of the mobile device associated with the user, an indication of the at least one offer responsive to the act of determining that the determined location is proximate to a venue at which the at least one offer may be accepted. According to another embodiment of the invention, the method further comprises an act of permitting the user to redeem the offer at the venue.

According to one embodiment of the present invention, the method further comprises an act of storing an indication in the distributed computer system of the location-based service, the indication identifying that the user is checked in to the venue. According to another embodiment of the invention, the act of presenting the indication of the at least one offer is responsive to an act of providing a control of the mobile device that, when activated, displays one or more offers that are capable of being accepted at the location of the mobile device. According to another embodiment of the invention, one or more offers are displayed only if the user is an authorized account holder in the loyalty program. According to another embodiment of the invention, the method further comprises an act of receiving loyalty program identification information at the venue, and responsive to receiving the loyalty program identification information, providing the at least one offer associated with a loyalty program to the user. According to another embodiment of the invention, the method further comprises an act of providing an indication of the at least one offer to the user proximate to a location of the venue. According to another embodiment of the invention, the method further comprises an act of printing, at the venue location, a coupon identifying the at least one offer during a checkout of the user.

According to one embodiment of the present invention, the method further comprises an act of indicating, to the user in a display of the mobile device, the at least one offer. According to another embodiment of the invention, the method further comprises an act of storing, by the distributed computer system of a location-based service, an indication of the association of the location-based service identity of the user with the loyalty program identity. According to another embodiment of the invention, the act of accepting act of receiving loyalty program identification information at the venue comprises an act of swiping a loyalty program card at the venue. According to another embodiment of the invention, the act of accepting act of receiving loyalty program identification information at the venue comprises an act of receiving, from the user, loyalty program account information at the venue. According to another embodiment of the invention, the method further comprises an act of sending, by a computer system associated with the venue to the distributed computer system of the location-based service, an indication that the at least one offer was redeemed at the venue. According to another embodiment of the invention, the method further comprises indicating, to the user in the display of the mobile device, the indication that the at least one offer was redeemed at the venue.

According to one aspect of the present invention, a method for processing an offer is provided. The method comprises acts of receiving, in a distributed computer system of a location-based service, a location of a mobile device associated with the user, determining a location-based service identity of the user, defining, in the distributed computer system of a location-based service, a plurality of offers that may be accepted by users of the location-based service, and responsive to the received location and parameters associated with the location-based service identity of the user, targeting at least one of the plurality of offers to the user. According to one embodiment of the present invention, the act of targeting is responsive to an act of determining a social relation of the user to one or more other users in a social network. According to another embodiment of the present invention, the act of targeting is responsive to an act of determining an interest of the one or more other users in the social network. According to another embodiment of the present invention, the act of targeting is responsive to an act of determining a rating of the at least one offer by the one or more other users in the social network. According to another embodiment of the present invention, the act of targeting is responsive to an act of determining a popularity of the at least one offer. According to another embodiment of the present invention, the act of targeting is responsive to the user activating a selection indicating that the user desires to receive targeted offers. According to another embodiment of the present invention, at least one of the plurality of offers is received from a third party offer service. According to another embodiment of the present invention, at least one of the plurality of offers is defined by a venue operator within a management interface of the location-based service.

According to one embodiment of the present invention, at least one of the plurality of offers is received from an external system via an API of the location-based service. According to another embodiment of the present invention, the method further comprises acts of determining a ranking of the plurality of offers and displaying, in the interface of the mobile device, the determined ranking of the plurality of offers. According to another embodiment of the present invention, the act of determining a ranking is responsive to an act of determining a relation of the user to one or more other entities defined within a social network. According to another embodiment of the present invention, the act of determining a ranking of the plurality of offers is responsive to an act of determining an action or relation of the one or more other entities within the social network to at least one of the plurality of offers. According to another embodiment of the present invention, the act of determining a ranking is responsive to an act of determining one or more parameters relating to the user. According to another embodiment of the present invention, the one or more parameters includes at least one of a group comprising loyalty metrics relating to the user, behavioral information of the user, purchasing behavior of the user, offer acceptance information relating to the user, and demographic information relating to the user.

According to one embodiment of the present invention, the ranking is determined, at least in part, based on a location of the mobile device associated with the user and respective locations of venues associated with the plurality of offers. According to another embodiment of the present invention, the method further comprises an act of determining that the determined location of the mobile device is proximate to a venue at which at least one of the plurality of offers may be accepted.

According to one aspect of the present invention, a method for processing an offer is provided. The method comprises acts of receiving, by a distributed computer system of a location-based service, at least one offer, determining a location of a mobile device associated with a user, determining that the determined location is proximate to a venue at which the at least one offer is available, presenting, to the user in a display of the mobile device associated with the user, an indication of the at least one offer responsive to the act of determining that the determined location is proximate to a venue at which the at least one offer is available, and permitting the user to accept the offer. According to another embodiment of the present invention, the method further comprises an act of storing, in a memory of the distributed computer system of the location-based service, the at least one offer. According to another embodiment of the invention, the method further comprises an act of associating the at least one offer with at least one of a group comprising a credit card program, a loyalty program, and a third party offeror. According to another embodiment of the invention, the method further comprises an act of targeting the at least one offer to the user responsive to the determined location. According to another embodiment of the invention, the act of targeting the at least one offer to the user is further responsive to the one or more parameters associated with the user. According to another embodiment of the invention, the one or more parameters comprise at least one user parameter relating to at least one of the group comprising demographic information of the user, behavioral information of the user, and psychographic information of the user. According to another embodiment of the invention, the act of receiving the at least one offer includes an act of receiving the at least one offer from a source of offers separate from the location-based service.

According to one embodiment of the present invention, the method further comprises an act of presenting, in the display of the mobile device, a control that, when selected by the user, permits the user to accept the at least one offer. According to another embodiment of the invention, the act of permitting the user to accept the offer further comprises an act of automatically accepting the offer without user intervention. According to another embodiment of the invention, the act of determining that the determined location is proximate to the venue at which at which the at least one offer may be fulfilled by the user. According to another embodiment of the invention, the method further comprises an act of permitting the user to accept the at least one offer using the mobile device. According to another embodiment of the present invention, the method further comprises an act of permitting the user to accept the at least one offer at the venue. According to another embodiment of the present invention, the method further comprises an act of indicating to the user in the display of the mobile device an acceptance of the at least one offer. According to another embodiment of the invention, the method further comprises an act of permitting the user to fulfill the acceptance of the at least one offer at the venue responsive to the display of the acceptance of the at least one offer.

According to one embodiment of the present invention, the method further comprises acts of displaying information relating to the acceptance of the at least one offer and using, at the venue, the displayed information to fulfill the acceptance of the at least one offer. According to another embodiment of the invention, the method further comprises an act of permitting the user to execute a purchase associated with the at least one offer using the mobile device.

According to one aspect of the present invention, a system for processing an offer is provided. The system comprises a location-based service including a distributed computer system having at least one processor and a memory, a component adapted to receive, by the distributed computer system of the location-based service, at least one offer, a component adapted to determine a location of a mobile device associated with a user, a component adapted to determine that the determined location is proximate to a venue at which the at least one offer may be accepted, a component adapted to present, to the user in a display of the mobile device associated with the user, an indication of the at least one offer responsive to the act of determining that the determined location is proximate to a venue at which the at least one offer may be accepted, and a component adapted to permit the user to accept the offer.

According to one embodiment of the present invention, the system further comprises a component adapted to store, in a memory of the distributed computer system of the location-based service, the at least one offer. According to another embodiment of the invention, the system further comprises a component adapted to associate the at least one offer with at least one of a group comprising a credit card program, a loyalty program, and a third party offeror. According to another embodiment of the invention, the system further comprises a component adapted to target the at least one offer to the user responsive to the determined location. According to another embodiment of the invention, the component adapted to target the at least 103 one offer to the user is further responsive to the one or more parameters associated with the user. According to another embodiment of the invention, the one or more parameters comprise at least one user parameter relating to at least one of the group comprising demographic information of the user, behavioral information of the user, and psychographic information of the user.

According to one embodiment of the present invention, the component adapted to receive the at least one offer is further adapted to receive the at least one offer from a source of offers separate from the location-based service. According to one embodiment of the present invention, the system further comprises a component adapted to present, in the display of the mobile device, a control that, when selected by the user, permits the user to accept the at least one offer. According to another embodiment of the invention, the component that is adapted to permit the user to redeem the offer at the venue further comprises a component that automatically accepts the offer at the venue without user intervention.

Still other aspects, examples, and advantages of these exemplary aspects and examples, are discussed in detail below. Moreover, it is to be understood that both the foregoing information and the following detailed description are merely illustrative examples of various aspects and examples, and are intended to provide an overview or framework for understanding the nature and character of the claimed aspects and examples. Any example disclosed herein may be combined with any other example in any manner consistent with at least one of the objects, aims, and needs disclosed herein, and references to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. The appearances of such terms herein are not necessarily all referring to the same example.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and examples, and are incorporated in and constitute a part of this specification, but are not intended as a definition of the limits of a particular example. The drawings, together with the remainder of the specification, serve to explain principles and operations of the described and claimed aspects and examples. In the figures, each identical or nearly identical component that is illustrated in various figures is represented by a like numeral. For purposes of clarity, not every component may be labeled in every figure. In the figures:

DETAILED DESCRIPTION

Figure 1:
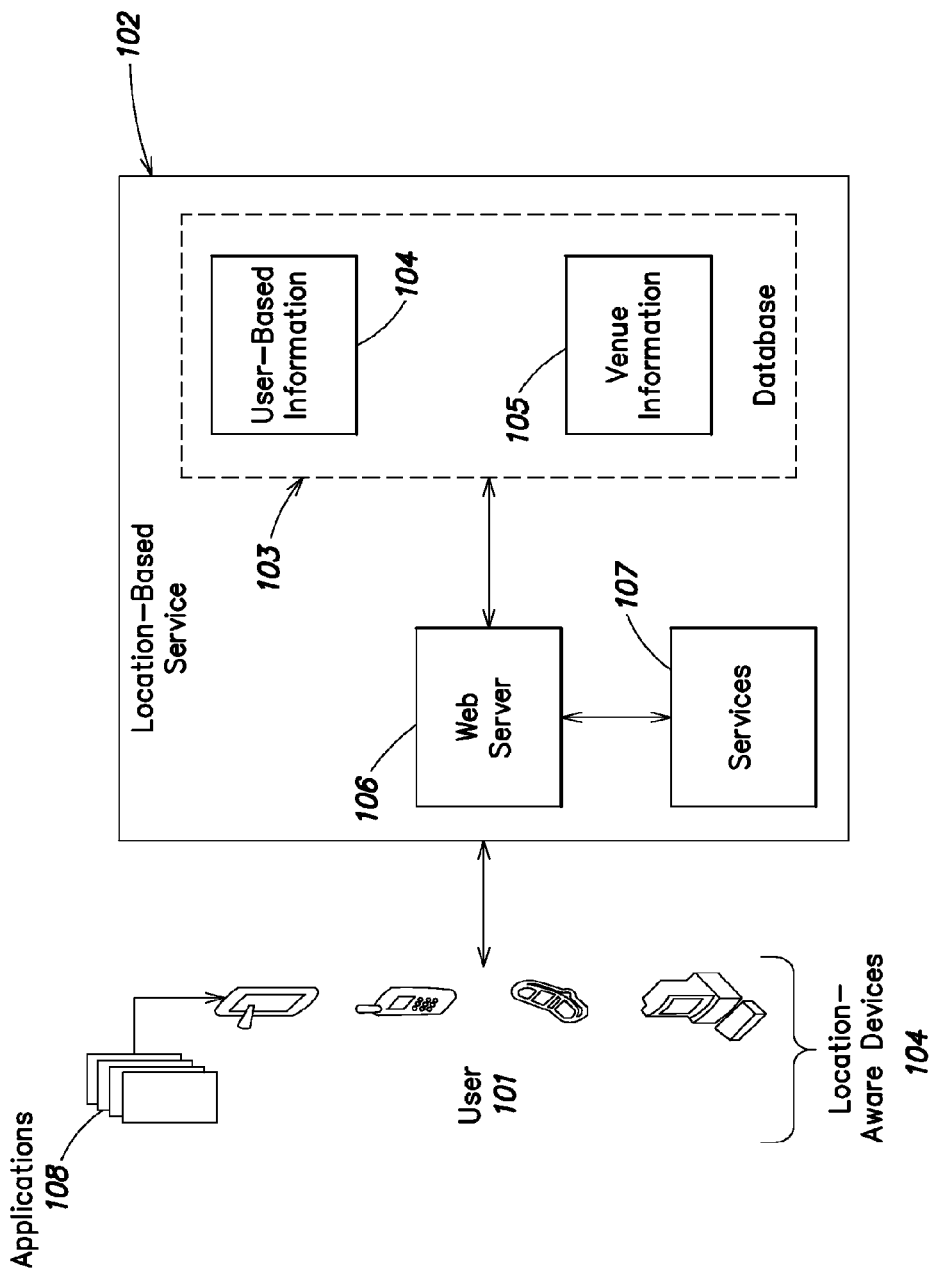
FIG. 1 is a block diagram showing a location-based service and system suitable for incorporating various aspects of the present invention.

FIG. 1 shows a block diagram of a location-based service and system suitable for incorporating various aspects of the present invention. For instance, a location-based service 102 may permit one or more users (e.g., user 101) to interact with one or more other users, systems and services based on their location. To this end, the user's location may be determined using one or more location-aware devices (e.g., devices 104), such as, for example, a cell phone, smart phone, PDA, tablet computer, laptop or other system, and location-based service may provide one or more recommendations for the user based on their location. Users may use an interface of the location-aware device for interacting with the system to receive recommendations for certain venue locations. These recommendations may be provided responsive to one or more inputs a user might provide within the interface of the mobile device, such as a query formed by one or more keywords, selection of particular search categories (e.g., "Food", "Nightlife", etc.), distance from the user's current location, or other parameters, either alone or in any combination.

In one embodiment, service 102 may include one or more components. Such components may be implemented using one or more computer systems. In one embodiment, location based service 102 may be implemented on a distributed computer system using one or more communication networks (e.g., the Internet). In one implementation, the service is implemented in a cloud-based computing platform, such as the well-known EC2 platform available commercially from Amazon.com, Seattle, Wash. Other implementations are possible and are within the scope and spirit of the invention, and it is appreciated that other platforms may be used.

Service 102 may include a web server 106 which is capable of serving as a front end to the location-based service 102. Devices may communicate and display data provided by service 106 to the user (e.g., user 101). Notably, devices may include controls that perform various functions in a location-based application (such as one or more of application(s) 108), such as viewing venues proximate to the user's location, reviewing information regarding proximate venues left by other users, communicating with other users, among other functions. Further, such devices may provide the location of the user to the location-based service 102, and this location information may be used to perform one or more functions.

Service 102 may also provide one or more related services (e.g., services 107), such as a service for recommending venues, storing pictures based on location, location-based games, or other service that utilizes location information relating to its users. Services 107 may be integral to location-based service 102 or many alternatively operate in conjunction with location-based service 102, (e.g., by communicating with the location-based service through an Application Programming Interface (API)). Notably, according to one aspect of the present invention, recommendations for particular venue locations defined within service 102 may be provided to a user.

Service 102 may also be capable of storing information in one or more databases (e.g., database 103). For instance, service 102 may be configured to store user-based information (e.g., user-based information 104) such as a user identification, identifications of friends associated with the user identification, any history information such as locations visited, preference information for particular venue locations, notes regarding venue locations visited, among other user-related information. Service 102 may also be capable of storing venue information (e.g., venue information 105) that may include, for example, location information (e.g., address, latitude, longitude, altitude, etc.), contact information, venue description, among other information. Venue information may also include, according to one embodiment, preference information for the particular venue.

One commercially-available system that may be suitable for implementing various aspects of the present invention may include the Foursquare service, available at http://www.foursquare.com and provided by Foursquare Labs, Inc., New York. Other systems capable of providing location-based services are available and are capable of implementing various aspects of the present invention.

Figure 2:
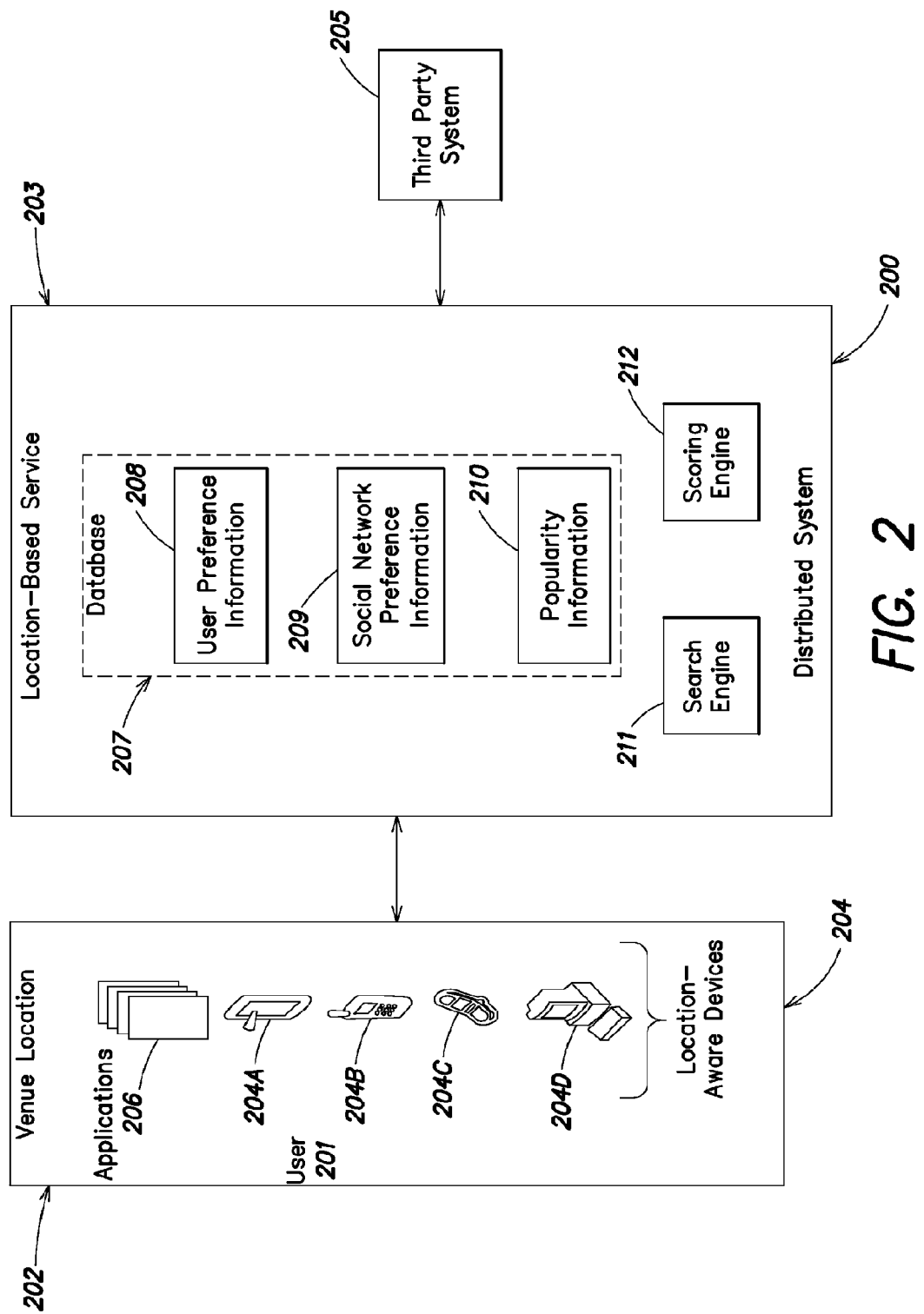
FIG. 2 shows a block diagram of a distributed system suitable for performing various aspects of the present invention.

FIG. 2 shows a system incorporating various aspects of the present invention. In particular, a distributed computer system (e.g., system 200) may be provided that is capable of providing recommendations in association with a location-based system (e.g., system 203). Such recommendations may be provided to one or more users. Further, such recommendations may be provided to other systems and/or applications that work integrally with location-based service 203. For instance, a third party system (e.g., system 205) may be capable of receiving recommendations for one or more venue locations from the location-based system.

Such recommendations may be presented to users (e.g., user 201) at or near one or more venue locations (e.g., venue location 202) on one or more location-aware devices (e.g., device 204). For instance, recommendations may be presented and viewed using one or more applications 206 that execute on a location-aware device. Device 204 may be any device, system, or item that can be used to locate a user, including a tablet computer (element 204A), smartphone (element 204B), cell phone (204C), personal computer (element 204D), or other system type.

Location-based service 203 may include, for example, a search engine 211 that receives search information from one or more applications 206, and provides recommendations to a location-aware device for display to the user. Search engine 211 may be capable of accepting one or more parameters such as keywords, distance settings, among others, from the location-aware device and provide a list of venues that satisfy the provided parameters. Search engine 211 or any other separate process or element may be capable of ordering and/or ranking the search results based on one or more sets of information stored in a database of the location-based service.

For instance, a database 207 may be provided (either separate or the same as database 203) that stores user preference information (e.g., information 208) relating to venues stored by the location-based service. Such information may include, for example, a history of venues the user has previously visited and their rating of such venues. User preference information may also include preference information for venues that the user has not yet visited. Database 207 may also store social network preference information (e.g., information 209) relating to venues stored by the location-based service. For instance, for users defined within the location-based service or are defined in other social networking applications that are indicated as the current users "friends," information regarding what venues those users have visited, their preferences for particular venues, and preferences for venues that they have not visited may be used to influence what recommendations may be displayed to the current user.

Further, database 207 may store popularity information (e.g., information 210) relating to venues defined in the location-based service. For instance, other users not within the current user's social network may also be used to determine what recommendations are displayed. For instance, certain venues may be determined as more popular and/or have higher quality ratings as determined by other users, specific groups of users, or the entire network itself.

In one embodiment, the user "checks-in" to the location-based service using an application executing on the mobile device, and responsive to the user "checking-in," that user is permitted to search for recommendations within the location-based service. Such recommendations may be ordered relative to a location of the venue where the user "checked in" or where the user is otherwise located. For example, as discussed above, a user's location may be determined by a location-aware device. In certain embodiments, the user may be permitted to check in using a number of different applications (e.g., Check-in4Me, 4squareSMS, Foursquare, etc.) into the same location-based service or from another location-based service that shares location and check-in information regarding users. In one implementation, application providers may be permitted to receive recommendations from the location-based service for display to their users. Some applications that do not provide check-in services may still be capable of receiving recommendation information from the location-based service.

Figure 3:
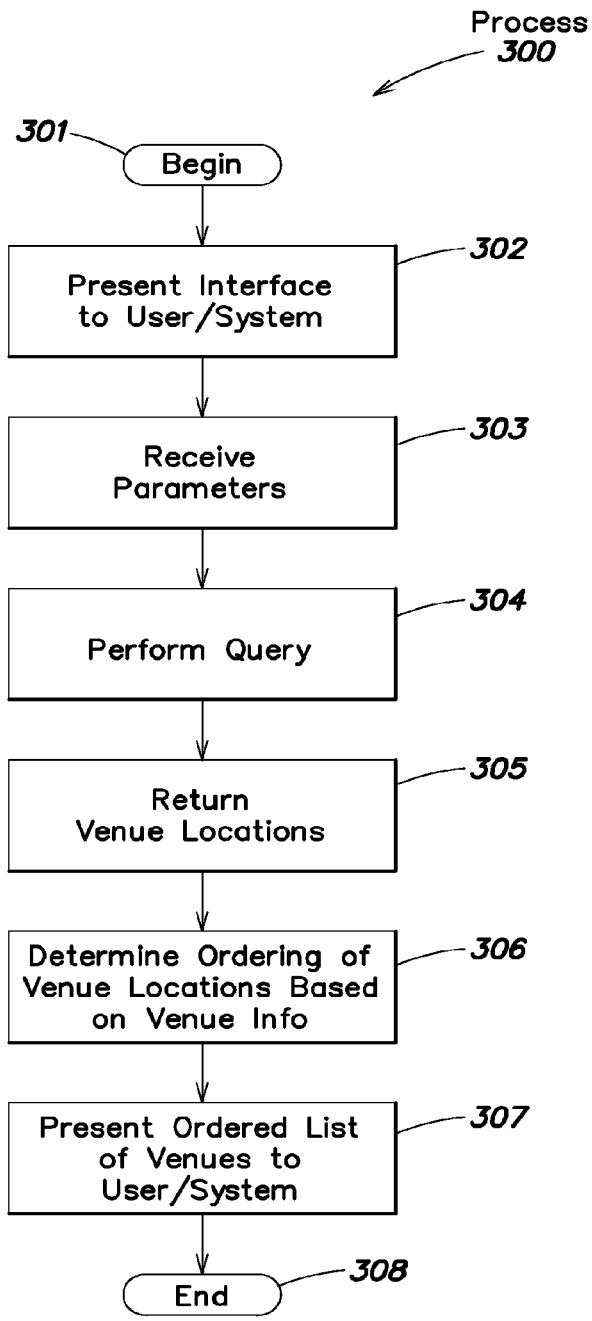
FIG. 3 is a block diagram showing an example process for providing recommendations in a system that uses location-based services.

FIG. 3 shows an example process (e.g., process 300) for providing recommendations in a location-based service in accordance with one embodiment. At block 301, process 300 begins. At block 302, a website, other application (e.g., a location-aware application executing on the mobile device) may be displayed to the user. Alternatively, an interface such as an API may be provided to an application for the purpose of providing recommendations to another application or system.

At block 303, the location-based system may receive one or more parameters requesting a search for recommendations. Such information may be provided via one or more interfaces, such as receiving the parameters in an interface of a mobile device, the parameters being provided by a user within a search function performed on the mobile device. Also, the parameters may be received from a third party application or system that utilizes location-based services. Such parameters may include, for example, one or more keywords, distance, the current location of the user, one or more categories that limit the search results, an indication of what type of search performed (e.g. one based on user parameters, social network parameters, popularity within the overall location-based service, or combination of these types), among other parameters, either alone or in combination with other parameters.

At block 304, a component within the location-based service (e.g., a search engine such as search engine 211) may perform a search of stored venues matching some or all of the parameters provided. Such a search may be performed, for example, using venue information stored in database 207. At block 305, an output list or set of venue locations may be returned.

At block 306, a component within the location-based service (e.g., a scoring engine such as scoring engine 212) may determine an ordering of output venues that were provided by the query. In one embodiment, the ordering may be based on the venue information that is collected by the location-based service. As discussed, venue information that can be used to determine a ranking or order of venues may include user preference information, social network preference information, and/or popularity information. Scores may be computed for each venue, and ranking may be determined based on the computed scores. At block 307, an ordered list of venues may be provided to the user, application, other system, or other entity. At block 308, process 300 ends.

Figure 4:
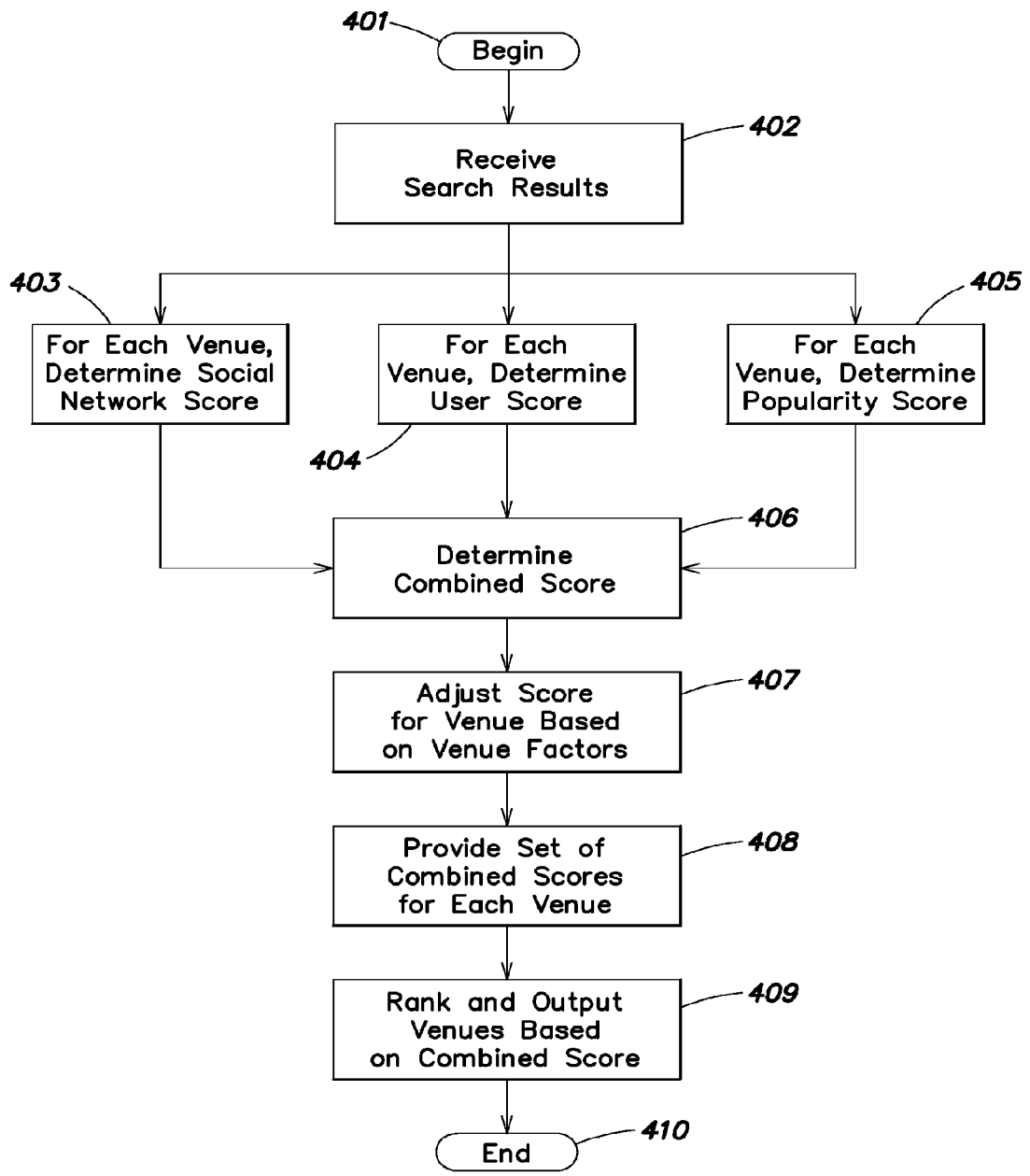
FIG. 4 is a block diagram showing an example process for scoring venue locations using a location-based service according to one embodiment of the present invention.

FIG. 4 shows an example process (e.g., process 400) for scoring venues in a location-based service in accordance with one embodiment. At block 401, process 400 begins. At block 402, a component of the location-based service (e.g., a scoring engine 212) receives search results which may include a set of venues defined in the location-based service. At block 404, for each venue within the result set, a user score may be determined based on user preferences as discussed above. In one embodiment, one or more functions such as collaborative filtering, user-user, k-nearest neighbors functions, or others may be used to determine a user score for a particular venue. In one embodiment, this function may be performed based on information stored by the location-based service indicating whether the user has previously been to this or similar venues. Further, this function may be performed based on information stored by the location-based service indicating that the user intends to go to this venue or similar venues.

At block 403, for each venue within the result set, a social network score may be determined based on social network preferences as discussed above. In one embodiment, one or more functions such as collaborative filtering, user-user, k-nearest neighbors functions, or others may be used to determine a social network score for a particular venue. In one embodiment, this function may be performed based on information stored by the location-based service indicating whether users within the specified user's social network has previously been to this or similar venues, and/or intends to go to this venue or similar venues.

At block 405, for each venue within the result set, a popularity score may be determined based on the popularity of the venue within the location-based service as discussed above. The popularity of the venue may be determined by the entire history of user preferences, some weighted function of preferences, a subset of particular users (e.g., users determined to be similar to the current user), or by other methods.

One or more of these scores may be used to determine a total score for a particular venue. In one embodiment, what scores that are used may be defined by the user within an interface of a mobile device application. In one embodiment, one or more scores are combined to determine a combined score for each venue within the result set. Optionally, the combined score for each venue may be adjusted based on one or more venue factors (e.g., at block 407). For instance, if the venue is not currently open at the time of day the search is executed, the score of that venue may be reduced so that the venue is not highly recommended. Further, if the venue location is currently popular or many people are checked-in to the venue, the score for that particular venue may be adjusted upward. According to one embodiment, different methods of scoring may be used alone or in combination to determine a combined score. At block 408, the set of combined scores for each venue may be provided as an output to a mobile device application, system or other entity. The receiving entity may then rank and output the venues based on the combined score at block 409. At block 410, process 400 ends.

According to one aspect, it is appreciated that higher quality venues are desired for presentation to users. According to one embodiment, one or more factors may be used alone or in combination with other factors to determine the quality of a particular venue. As discussed, it is desired that a signal indicative of the best venues would be helpful in the creation and display of a list to a user (e.g., particularly one of a location-based service that has limited display capability and/or needs to provide a limited number of recommendations). Thus, a method of ranking may be desired that provides a high-precision ranking of the "best" venues, but not necessarily a ranking of all venues, which might be typically returned in an Internet search.

In one embodiment, it is appreciated that a factor that is derived from a list of venues and how they are arranged may be used as an indicator of the level of quality of a particular venue. In one implementation of a location-based service, users are permitted to create "lists" of venues. For instance, in one implementation of a location-based service, a list of venues may be created by a particular user and shared with other users. Users may "follow" other users and/or lists, may have lists recommended to them based on their associations with other users, their venue history, or may have lists presented to them based on other criteria.

In one aspect, it is appreciated that higher quality venues are contained by more lists followed by more influential users and created by more influential users of the location-based service than "average" venues. Thus, in one implementation, a score may be determined, at least in part, based on the number of times that a particular venue appears within lists of these influential users. Because multiple lists may be used to determine a score, a single powerful list may not necessarily dominate the score.

According to one embodiment, a process may be performed to determine a score for a particular venue location based on a reputation score for a particular user. One example process includes the following:

Wherein the expression rep(user,)=reputation score for user.

In one embodiment, a venue score (VenueListScore) may be determined according to the following:

VenueListScore=
  sum for each list $L_i$ that contains a venue:
    rep(author of $L_i$)*
    sum for follower $F_j$ of list $L_i$
      cred($F_j$)/count(lists $F_j$ follows)

Where rep(author of $L_i$) is a reputation score for the "author" or creator of the list of venues within the location-based service. The expression [cred($F_j$)/count(lists $F_j$ follows)] accounts for users who follow many lists. According to this expression, the credibility as calculated for a particular user is spread evenly over the lists that the user follows, so that an influential user that follows many lists may not dominate any one particular list.

According to another embodiment, it is appreciated that a factor that is derived from a measurement of how "expert" users view the venue may be used to determine the quality of that venue. In one implementation, there may be a ranking or scoring that is indicative of how popular a particular venue is with "expert" users within a particular venue category. For instance, do people who often go to coffee places (e.g., a coffee expert) go to this particular coffee place? In one implementation, expertise may be measured by a total activity in the category. For instance, a user's expertise in the category may be determined based on, for example, the number of check-ins, the number of venues checked into, tips left for venues in the category, photos taken, among other actions performed with respect to one or more venues in that category. Expertise may also be determined for a particular user based on geographic area or location.

In one embodiment, an "ExpertRank" function may be used by the location-based system to determine, for each user and category pair, how "expert" that user is in that category. For instance, in one implementation, the score may be determined as a linear combination of at least one or more of the following parameters:
  a number of check-ins by the user in that category
  a number of distinct venues checked into by the user that category
  a number of tips left by the user in that category
  a number of tips the user has "left" that other users have "done" in that category According to one implementation, these amounts may be weighted to determine an optimal score that reflects a user's expertise. Although the weights may be determined manually, it should be understood that the weights could be tuned (e.g., by a knowledge-based system) using a set of training examples of known users that are determined experts in certain categories.

Thus, in one example, there is one particular user that loves coffee, and has been to 40 distinct coffee places (venues), many of them the user has frequented dozens of times. Also, in the example, the user has left many tips, and many other users have completed these defined tips. Thus, that user may be given a high expertise score for the category "coffee" based on the interactions with the location-based service.

In another embodiment, it is appreciated that a factor that is derived from a user sentiment regarding certain venues in the location-based service may be used as an indication of the level of quality of a particular venue. For instance, the location-based service may analyze information left by users for a particular venue (e.g., "tips" left by users that describe the quality of the venue) to determine whether the sentiment relating to the venue is positive or negative. In one implementation, venues having more positive sentiment may be scored or ranked higher than those having negative sentiment.

In one embodiment, an "SentimentRank" function may be used by the location-based system to determine whether an overall sentiment about a venue is positive or negative (or other ranking or scoring factor type). According to one implementation, the function may be executed on "tips" or other feedback left by users for a particular venue. In the case of textual-based feedback, a keyword analysis may be used to determine whether the feedback is positive or negative. In one implementation, venues having a more positive score may be adjusted in the ranking, or their ranking or score may be adjusted. For example, a tip similar to "Best Mexican food in the city –1 loved it!" is very positive, so that venue may be adjusted upward. A tip similar to "Terrible service, long lines." is negative, so the ranking of the venue may be adjusted downward. A tip similar to "Slow, but very tasty" has mixed sentiment and may have a neutral or slightly higher or lower adjustment affect.

An overall score for the venue may be determined, in one embodiment, by determining a sum of the sentiment on all of the tips or other feedback left by users for the particular venue. It is appreciated that in some location-based systems, some venues may have hundreds of tips, and therefore, this feedback may be highly indicative of the sentiment for a particular venue.

Sentiment or any of the above factors such as popularity may also be adjusted based on time. For instance, tips given two years ago may have less weight than a tip given more previously. In another example, scores may be adjusted based on the on time of day or day of week. In one implementation, one or more of the scores or rankings of a particular venue (e.g. venue popularity) may be based on historic check-ins in a particular defined period of time (e.g., performing a check-in within each hour of the week). Such tracking of scores in different time periods allows a location-based service to provide more granular time-based recommendations. For instance, a location-based service may determine that a particular venue may be most popular on Friday and Saturday nights after 10 pm. Other types of ranking or scores may be tracked in this manner. For example, check-in popularity, popularity with "friends" defined in a social network, popularity relative to a category, popularity relative to a neighborhood, may be determined based on time period according to various embodiments.

According to another aspect of the present invention, a location-based system may determine an adjustable boundary of a geographical area in which to search for venues based on a query (e.g., a query provided by a user within an interface of a mobile device). According to one embodiment, the boundary of search may be adjusted based on the density of venues within a particular area. For instance, from a particular geographic point, a radius from the geographic point may be adjusted to achieve a particular venue density within a circular area. Although a circle may be used, other boundary types and shapes may be used (e.g., square, rectangle, displayed map area, town, or similar boundary).

In another embodiment, the adjustable boundary may be determined based on a distance between subsequent "check-ins" in an area by users in that particular area in relation to some time. For instance, a determination may be made by the location-based system that a user checked in a certain distance from one check-in location point (e.g., a first venue) to a second check-in location point (e.g., a second venue). In one implementation, an average distance between check-in points (e.g., from one user, all users) may be used as an input to determine an adjustment of an adjustable boundary used for executing a search query for venue locations.

Such a search query may be time-dependent, in that the average distance may be computed for different time periods and the adjustable boundary may be modified according to the different periods. For instance, a search result returned by a location-based service based on a search for "pharmacies" at 3 AM may have a wider geographic search result than a similar search performed at 3 PM, if it is based on the number of check-in density and/or average distance between check-ins during the 3 AM period is much less than that at 3 PM. In a similar way, queries of areas having little check-in activity (and perhaps fewer venues defined) may use a wider geographic search.

According to another aspect, it is appreciated that the check-in history may be used as an indicator of the activity density within a particular region. In one implementation, check-in history may be used to determine a default or adjustable setting for performing a search query (e.g., as a setting in a location-based application operated by a user). In one embodiment, the boundary information may be used as a limiting parameter on a search query that is performed to limit a number of returned venues.

It should be appreciated that any of the above ranking/scoring methods may be used either alone or in combination with any other ranking and/or scoring methods.

Example Interfaces

Figure 5:
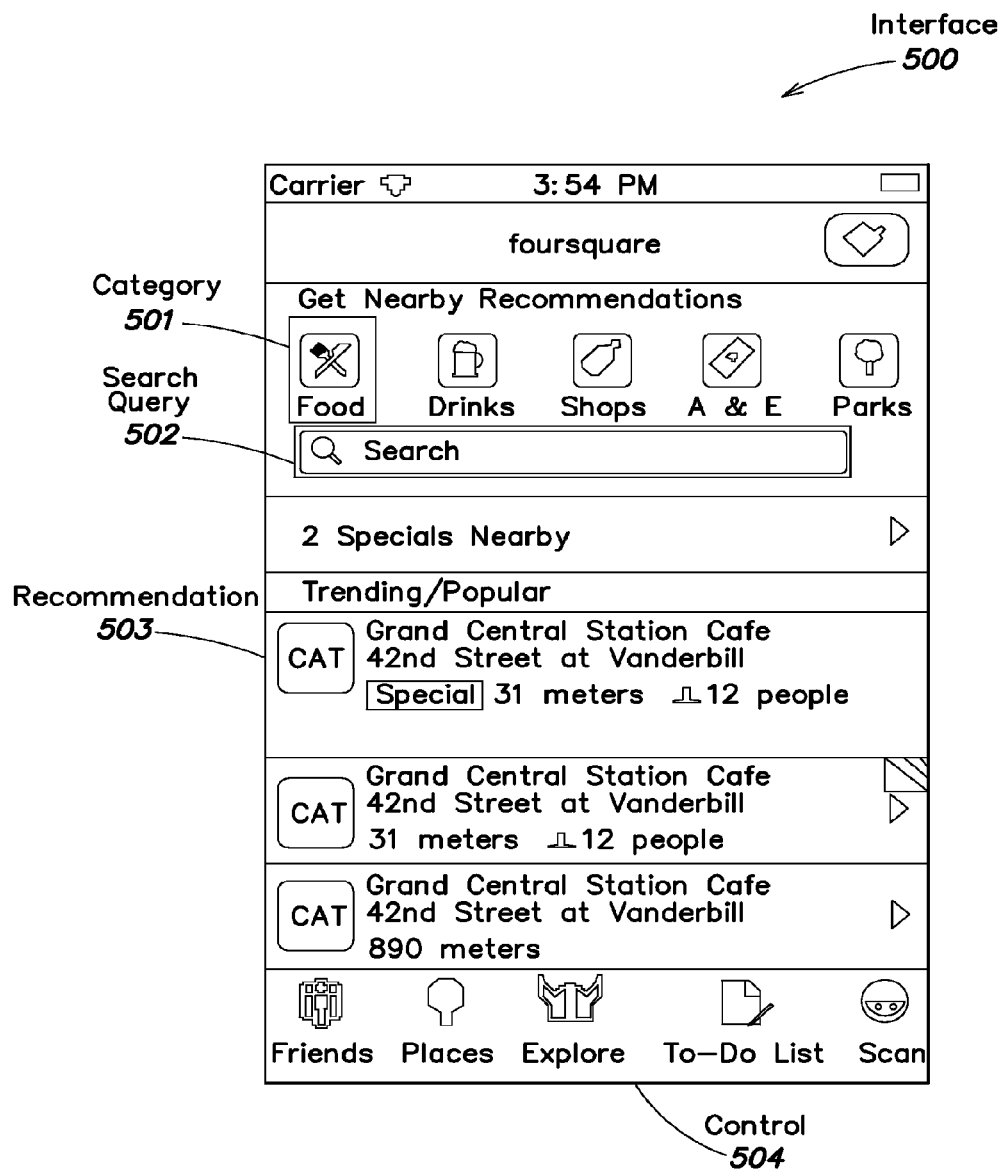
FIG. 5 shows an example interface in which recommendations may be provided according to one embodiment of the present invention.

FIG. 5 shows one example interface in which recommendations may be provided according to one embodiment of the present invention. In particular, and interface 500 may be provided that shows one or more recommendations (e.g., recommendation 503) responsive to a user searching for one or more venues. In one embodiment, an "Explore" control (e.g., control 504) is presented within an interface of the location-based system (e.g., an interface of a mobile device) that allows the user to search and view recommendations for particular venues.

In one embodiment, interface 500 may include one or more categories (e.g., category 501) that may permit the user to identify venues associated with these categories. For instance, example categories may include food, drinks, shops, art and entertainment (A&E), parks, among other possible categories that may be defined based on venues.

According to one embodiment, interface 500 may include a search query area 502 where users may enter text based search queries. Further, interface 500 may include a control, when activated, executes a search of venues according to various embodiments as discussed above. In another embodiment, a search query is executed as information is entered and/or changed by the user. Such a search query may be responsive to one or more controls or one or more query inputs to limit a number of returned venues.

Responsive to users selecting one or more categories and/or entering information within search query area 502, one or more recommendations may be shown to the user within a recommendation area within the display. In one embodiment, interface 500 may include a "trending" area that shows venues where check-in activity is increasing. As discussed above, one or more recommendations may be ranked and/or scored using the various methods described above, either alone or in combination, and the recommendations may be arranged within the interface (interface 500) responsive to these determined ranks or scores.

Figure 6:
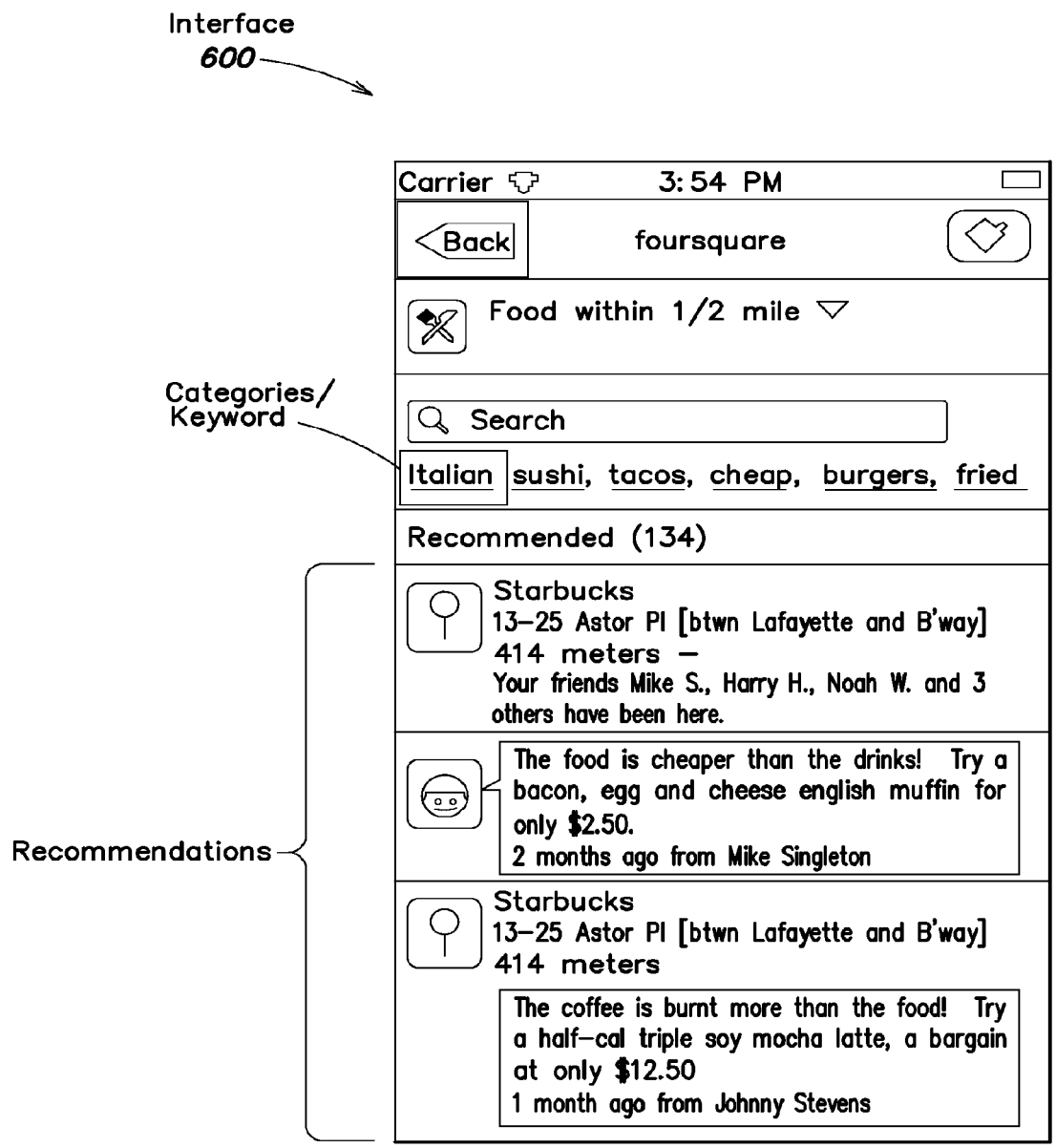
FIG. 6 shows an example interface within a particular venue category according to one embodiment of the present invention.

FIG. 6 shows an example interface within a particular venue category according to one embodiment of the present invention. In particular, interface 600 may be displayed to a user, for instance, after the user selects one or more categories (e.g. food). Interface 600 may include further categories/keywords (e.g. categories/keywords 601) that permits the user to further narrow the category of venues to be searched. In one embodiment, such categories or keywords may be extracted from information defined within the venues defined within the location-based service. Such information may include, for example, descriptions of the venues, any feedback (e.g., tips) for the venue, any tags or other defining information for the venue. Such categories/keywords that may be used to narrow the search may change based on popularity, location, frequency of search and/or any other parameter that permits the user to find the necessary venues.

Interface 600 may also include a recommendations area 602 wherein various recommendations are displayed corresponding to search criteria, location of the user, personal information of the user, social relations of the user, popularity, among other criteria. According to one embodiment of the present invention, within each of the recommendations provided to the user, a justification (e.g., justification 603) may be displayed that indicates to the user why a particular recommendation was provided. For instance in the example shown, a suitable justification may include "Your friend Mike S, Harry H, Noah W, and three others have been here." Therefore, rather than merely providing search results, the location-based system may provide additional information regarding the recommendation that might trigger a user to adopt the recommendation. For instance, if the user perceives that Mike S. has similar tastes, the user may be inclined to review and/or adopt the recommendation.

Further, in one embodiment, interface 600 may include an area where a tip is displayed (e.g., tip area 604). One or more tip information may be chosen by the location-based system to be displayed to the user. This information may be chosen, for instance, based on a social relationship between the user and the user whose tip information is being displayed within the recommendation interface.

Figure 7:
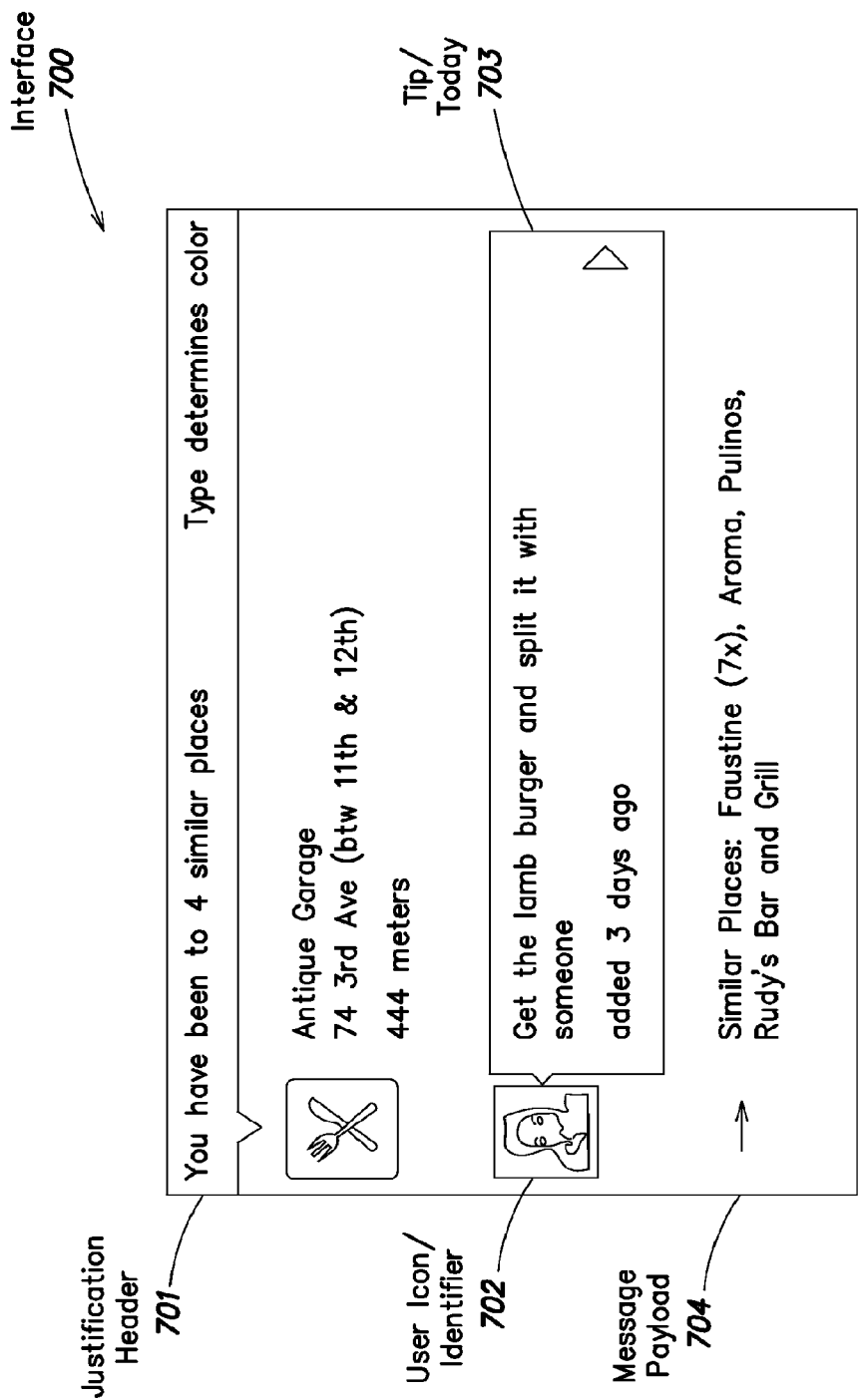
FIG. 7 shows an example interface showing a recommendation and associated justification information according to one embodiment of the present invention.

FIG. 7 shows one example interface showing a recommendation and associated justification information according to one embodiment of the present invention. In particular, interface 700 includes a justification header area 701 that shows a brief description of the justification for the particular recommendation. In one embodiment, the type of justification provided causes the interface to display different type of color to the user, permitting the user to quickly determine a relation of the justification. Interface 700 may also include a user icon or other identifier 702 that identifies a particular user that left the tip (or todo) (e.g., tip/todo 703). Interface 700 may also include other information relating to the recommendation within a message payload area 704. For instance, the location-based service may provide a listing of similar places associated with a particular recommended venue. Any or all of this information may be helpful for the user to determine whether the recommendation should be adopted.

According to one embodiment of the present invention, any number of interfaces having one or more of the above features may be provided to relate recommendation information to the user. For instance, there may be separate areas for showing recommendations based on personal and social justifications, and a separate display area for displaying venues based on a popularity justification. Further, it should be appreciated that more than one justification may be combined to push up the relevancy of a particular venue within a display of recommendations, and multiple recommendations may be displayed within this display.

Example Computer Implementations

Processes described above are merely illustrative embodiments of systems that may provide recommendations in association with a location-based service. Such illustrative embodiments are not intended to limit the scope of the present invention, as any of numerous other implementations for performing the invention. None of the claims set forth below are intended to be limited to any particular implementation of a method of providing player incentives, unless such claim includes a limitation explicitly reciting a particular implementation.

Processes and methods associated with various embodiments, acts thereof and various embodiments and variations of these methods and acts, individually or in combination, may be defined by computer-readable signals tangibly embodied on a computer-readable medium, for example, a non-volatile recording medium, an integrated circuit memory element, or a combination thereof. According to one embodiment, the computer-readable medium may be non-transitory in that the computer-executable instructions may be stored permanently or semipermanently on the medium. Such signals may define instructions, for example, as part of one or more programs, that, as a result of being executed by a computer, instruct the computer to perform one or more of the methods or acts described herein, and/or various embodiments, variations and combinations thereof. Such instructions may be written in any of a plurality of programming languages, for example, Java, Visual Basic, C, C#, or C++, Fortran, Pascal, Eiffel, Basic, COBOL, etc., or any of a variety of combinations thereof. The computer-readable medium on which such instructions are stored may reside on one or more of the components of a general-purpose computer described above, and may be distributed across one or more of such components.

The computer-readable medium may be transportable such that the instructions stored thereon can be loaded onto any computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present invention.

Various embodiments according to the invention may be implemented on one or more computer systems. These computer systems may be, for example, general-purpose computers such as those based on Intel PENTIUM-type processor, Motorola PowerPC, Sun UltraSPARC, Hewlett-Packard PA-RISC processors, ARM Cortex processor, Qualcomm Scorpion processor, or any other type of processor. It should be appreciated that one or more of any type computer system may be used to partially or fully automate play of the described game according to various embodiments of the invention. Further, the software design system may be located on a single computer or may be distributed among a plurality of computers attached by a communications network.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

A computer system may be a general-purpose computer system that is programmable using a high-level computer programming language. Computer system may be also implemented using specially programmed, special purpose hardware. In a computer system there may be a processor that is typically a commercially available processor such as the well-known Pentium, Core, Core Vpro, Xeon, or Itanium class processors available from the Intel Corporation. Many other processors are available. Such a processor usually executes an operating system which may be, for example, the Windows NT, Windows 2000 (Windows ME), Windows XP, Windows Vista or Windows 7 operating systems available from the Microsoft Corporation, MAC OS X Snow Leopard, MAC OS X Lion operating systems available from Apple Computer, the Solaris Operating System available from Sun Microsystems, iOS Blackberry OS, Windows 7 Mobile or Android OS operating system or UNIX available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

Further, on each of the one or more computer systems that include one or more components of distributed system 200, each of the components may reside in one or more locations on the system. For example, different portions of the components of system 200 may reside in different areas of memory (e.g., RAM, ROM, disk, etc.) on one or more computer systems. Each of such one or more computer systems may include, among other components, a plurality of known components such as one or more processors, a memory system, a disk storage system, one or more network interfaces, and one or more busses or other internal communication links interconnecting the various components.

Figure 8:
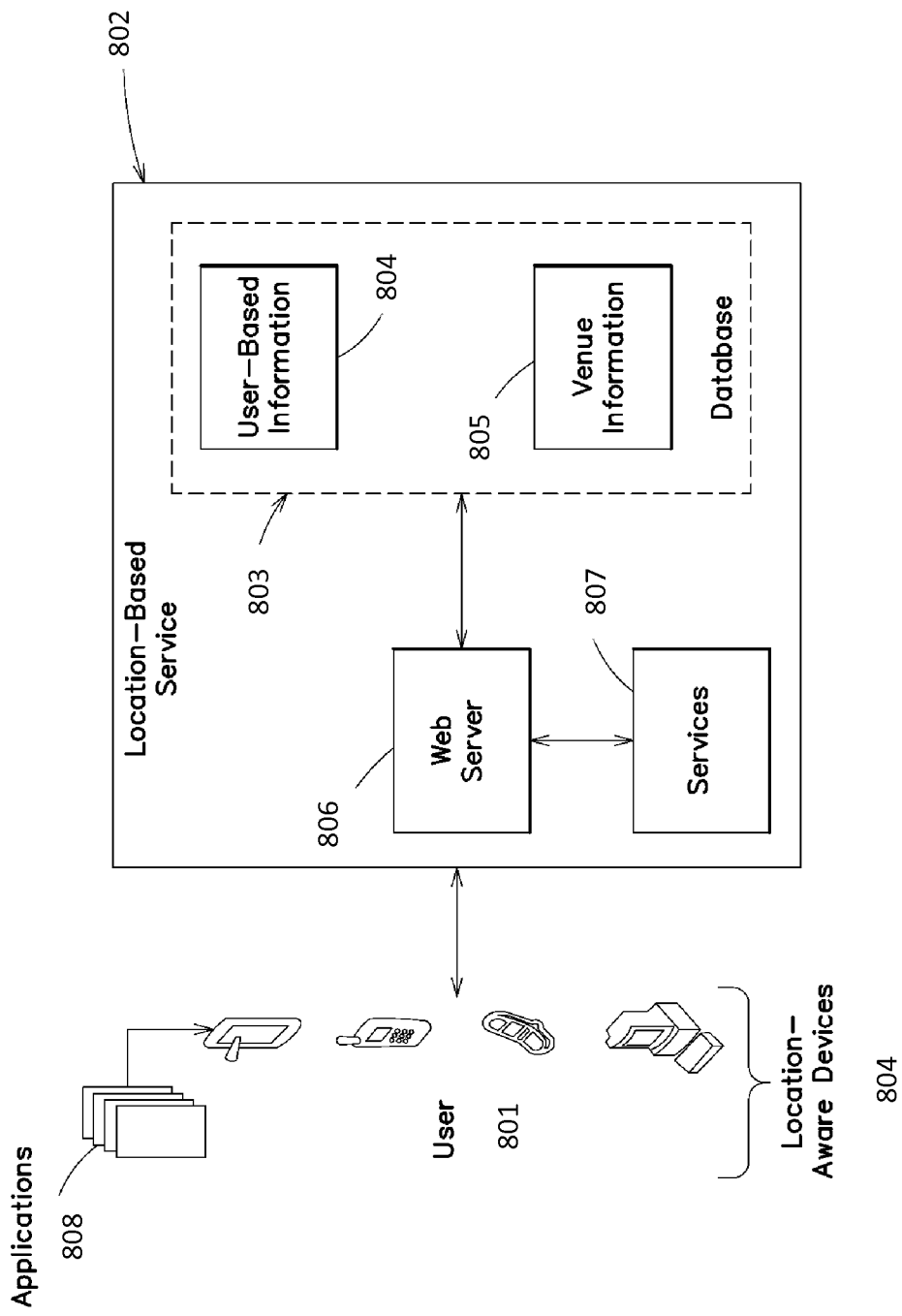
FIG. 8 is a block diagram showing a location-based service and system suitable for incorporating various aspects of the present invention.

FIG. 8 shows a block diagram of a location-based service and system suitable for incorporating various aspects of the present invention. For instance, a location-based service 802 may permit one or more users (e.g., user 801) to interact with one or more other users, systems and services based on their location. To this end, the user's location may be determined using one or more location-aware devices (e.g., devices 804), such as, for example, a cell phone, smart phone, PDA, tablet computer, laptop or other system. Users may use other methods for interacting with the system to receive and redeem offers, such as by using a "powered" card as discussed above, an NFC terminal (e.g., an NFC sticker placed on the back of a mobile phone), a loyalty club card, a credit card or other methods.

In one embodiment, service 802 may include one or more components. Such components may be implemented using one or more computer systems. In one embodiment, location-based service 802 may be implemented on a distributed computer system using one or more communication networks (e.g., the Internet). In one implementation, the service is implemented in a cloud-based computing platform, such as the well-known EC2 platform available commercially from Amazon.com, Seattle, Wash. In another example, a distributed application may be provided using servers and client systems provided by an application provider. Other implementations are possible and are within the scope and spirit of the invention, and it is appreciated that other platforms in any combination may be used.

Service 802 may include a web server 806 which is capable of serving as a front end to the location-based service 802. Devices may communicate and display data provided by server 806 to the user (e.g., user 801). Notably, devices may include controls that perform various functions in a location-based application (such as one or more of application(s) 808), such as viewing venues proximate to the user's location, reviewing information regarding proximate venues left by other users, communicating with other users, among other functions. Further, such devices may provide the location of the user to the location-based service 802, and this location information may be used to perform one or more functions.

Service 802 may also provide one or more related services (e.g., services 807), such as a service for recommending venues, storing pictures based on location, location-based games, or other service that utilizes location information relating to its users. Services 807 may be integral to location-based service 802 or many alternatively operate in conjunction with location-based service 802, (e.g., by communicating with the location-based service through an Application Programming Interface (API)). Notably, according to one aspect of the present invention, credit card companies, merchant, and third party offerors may create offers associated with particular venue locations defined within service 802.

Service 802 may also be capable of storing information in one or more databases (e.g., database 803). For instance, service 802 may be configured to store user-based information (e.g., user-based information 804) such as a user identification, identifications of friends associated with the user identification, any history information such as locations visited, preference information for particular venue locations, notes regarding venue locations visited, among other user-related information. Service 802 may also be capable of storing venue information (e.g., venue information 805) that may include, for example, location information (e.g., address, latitude, longitude, altitude, etc.), contact information, venue description, among other information. Venue information may also include, according to one embodiment, offers associated with a particular venue location.

One commercially-available system that may be suitable for implementing various aspects of the present invention may include the Foursquare service, available at http://www.foursquare.com and provided by Foursquare Labs, Inc., New York. Other systems capable of providing location-based services are available and are capable of implementing various aspects of the present invention.

Figure 9:
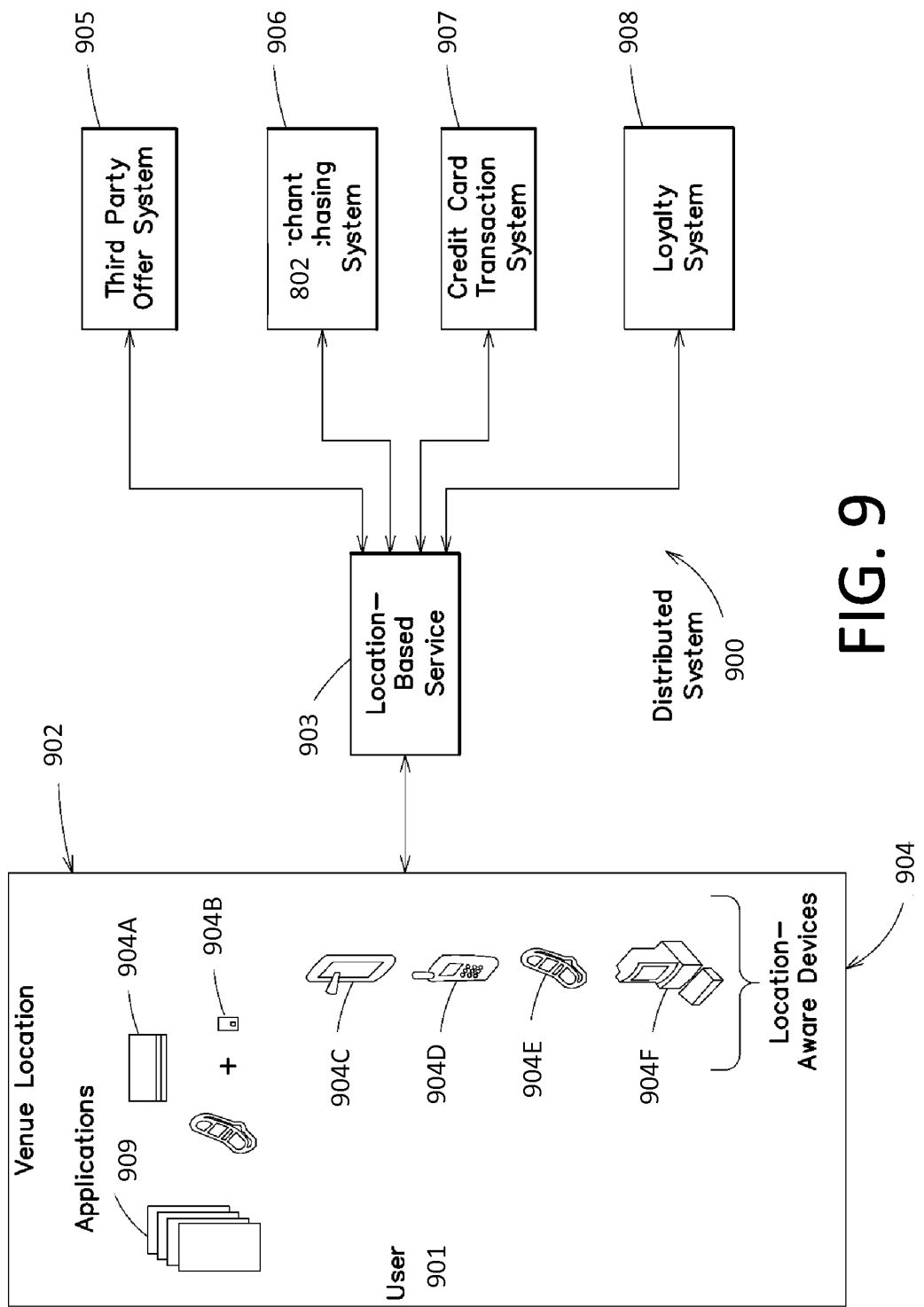
FIG. 9 shows a block diagram of a distributed system suitable for performing various aspects of the present invention.

FIG. 9 shows a system incorporating various aspects of the present invention. In particular, a distributed computer system (e.g., system 900) may be provided that is capable of providing offers in association with a location-based system (e.g., system 903). Such offers may be defined and managed among one or more systems that work integrally with location-based service 903. For instance, a third party offer system (e.g., system 905) may be capable of defining and managing offers for one or more venue locations. The third party offer system may be capable of defining offers that extend across different venues, merchants, and locations. One example of an offer management system includes the well-known Groupon system (available on the Internet at http://www.groupon.com) used for managing coupon offers for various products and venue locations.

Such offers may be presented to users (e.g., user 901) at one or more venue locations (e.g., venue location 902) on one or more location-aware devices (e.g., device 904). For instance, offers may be presented, viewed, accepted, purchased, and/or redeemed using one or more applications 909 that execute on a location-aware device.

Device 904 may be any device, system, or item that can be used to locate a user. For instance, a user may use a "powered" credit card 904A to redeem an offer at the venue location or any other location. In another implementation, a user may use a device, system, or item as a payment method. For instance, a user may use an NFC terminal as is known in the art, such as one created by providing an NFC reader in a phone, affixing NFC sticker to non-NFC devices or otherwise providing a payment capability to a mobile phone (e.g., element 904B). Other systems may be used such as a tablet computer (element 904C), smartphone (element 904D), cell phone (904E), personal computer (element 904F), or other system type, either with or without payment capabilities.

Offers may be "free" offers in that they are received without a qualifying purchase. However, some offers may require a purchase, which may be performed online or at the venue location. In the case of an online purchased offer, a voucher or other indication of purchase may be provided to a user (e.g., electronically) to permit the user to fulfill the purchased offer at the venue location or any other location. In one embodiment, the voucher may be presented to the user in the form of an identifier or other information displayed on the mobile device that permits the user to purchase and/or redeem the offer at the venue location (e.g., a bar code, transaction number, offer number or other identification information). Some redemption of offers may be seamless, and require no intermediate step. For instance, the offer may be applied directly during a transaction performed at the venue location.

According to another embodiment, location-based service may be integrated with a merchant purchasing system (e.g., system 906). For instance, a merchant purchasing system may be capable of performing checkout functions at the venue location, such as scanning or otherwise inputting items to be purchased, and accepting payment from a consumer. According to one aspect, the merchant purchasing system may be capable of determining whether offers created in a location-based system apply to a particular transaction. For instance, merchants may define one or more offers using an interface of the location-based service (e.g., through a management interface or an API that attaches an offer to a particular venue location). When the location-based service determines that the user is located in a venue in which the offer may be redeemed, the merchant purchasing system may be notified that a particular offer applies. Certain offers may be redeemed by the merchant within the same transaction, and/or an offer may be provided that may be redeemed by the user in a future transaction (e.g., in the form of a coupon printed at the vendor location). Offers may be accepted and applied in real time at the vendor location (e.g., as a discount applied to the current transaction). In other embodiments, offers may include purchases that may be performed at locations other than the venue location. Further, such offers need not require a swipe of a credit card but can include any method of payment using any number of systems.

According to another embodiment, location-based service may be integrated with a credit card transaction system (e.g., system 907). In one example, the credit card transaction system may be capable of determining whether an offer applies to a transaction performed by a user using a location-based service. Further, in another embodiment, the credit card transaction system may be configured to apply an accepted offer to a user's statement without any interaction by the venue location. Alternatively, the redemption of the offer may be applied to the current transaction, without the need to wait for a credit to be applied to the user's statement. Some implementations may involve systems that perform the transaction at the venue location to apply the offer credit in real-time.

According to another embodiment, location-based service may be integrated with a loyalty system (e.g., system 908). In one embodiment, particular offers may be created and extended to loyalty card members based on their location (e.g., as determined by a location-based service). According to one embodiment, a user may be presented offers available to loyalty program members when the user "checks in" to a particular venue location and/or is displayed certain offers when the user is located in proximity to the location. In one implementation, an association may be maintained and stored by a distributed computer system that associates an identity of the user in the location-based service with an identity of the user in the loyalty program. Responsive to the user being located proximate the venue location, the user may be displayed (e.g., in the display of a mobile device) certain offers available to the user by virtue of being a loyalty card program member.

In one embodiment, the location-based service may accept a fee from an offer provider for the opportunity to promote offers using the location-based service. Offers may be paid for by the offer provider in any manner or on any basis, including impressions of an offer, redemption of an offer, display of an offer in an ordered search, among other bases for payment.

In another embodiment, a user is displayed certain offers that are available, and a control presented within the interface of the mobile device, when selected by the user, permits selected offers to be associated with the user (e.g., a credit card account, loyalty card account, or other account and/or identity).

In one embodiment, the user "checks in" using an application executing on the mobile device, and responsive to the user "checking in," that user is notified of one or more offers that can be accepted and/or redeemed. Such offers may be accepted and/or redeemed proximate a location of the venue where the user "checked in." In certain embodiments, the user may be permitted to check in using a number of different applications (e.g., CheckIn4Me, 4squareSMS, Foursquare, etc.) into the same location-based service or from another location-based service that shares location and check-in information regarding users. In one implementation, application providers may be permitted to receive offers from the location-based service for display to their users. Also, the location-based service may track the acceptance and/or redemption of offers through such applications, and provide application providers with a portion of the revenue realized by the transaction to which the offer is applied.

In yet another implementation, authentication to distributed resources in distributed system 900 may be provided using an authorization server (not shown) that permits access to distributed resources without sharing authorization information among services. Rather, authentication is performed directly with the authorization system which issues access tokens that are used to access particular information.

Figure 10:
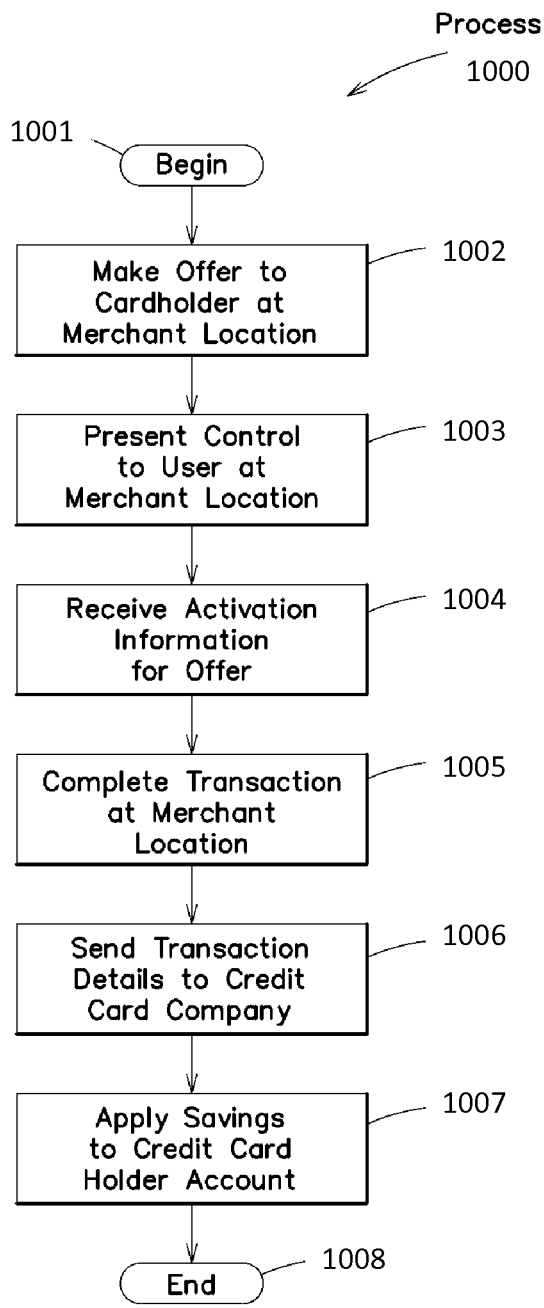
FIG. 10 shows a process for crediting an accepted offer to a credit card account according to one embodiment of the present invention.

FIG. 10 shows a process 1000 for crediting an accepted offer to a credit card account according to one embodiment of the present invention. At block 1001, process 1000 begins. At block 1002, the location-based system makes an offer to a cardholder at a merchant location. For instance, as discussed above, this may be done within an interface of a mobile device. At block 1003, the mobile device may be configured to present a control within the interface to a user at the merchant location. This control, when selected, may activate a particular offer that was displayed to the user.

At block 1004, the mobile device receives an activation of the control by the user including activation information relating to the particular offer that was accepted. At block 1005, a transaction is completed at the merchant location using the credit card associated with a particular credit card holder account. For instance, the credit card may be swiped or manually entered into a credit card processing device provided at the merchant location. In an alternative embodiment, the user may accept and/or redeem the offer outside of the venue location, either with or without providing the credit card information. At block 1006, information relating to the transaction is sent to the credit card company. Such information may identify details of the transaction performed by the user at the merchant location.

According to one embodiment, a method is provided for associating particular offers with credit card accounts and having those offers be automatically associated with credit card holder accounts when used at the merchant location. For instance, at block 1007, any savings applied to a particular offer may be automatically applied to a credit card holder account. For instance, an association may be made between a particular offer and a credit card holder account, and afterwards when the user performs a transaction that relates to the particular offer, a credit card system applies that offer to the cardholder's statement. One advantage of such a system may include, in one embodiment, that the user may be able to redeem offers in real-time at merchant locations by using only their credit cards, and thus the offer may be applied automatically to the user's account. At block 1008, process 1000 ends.

Figure 11:
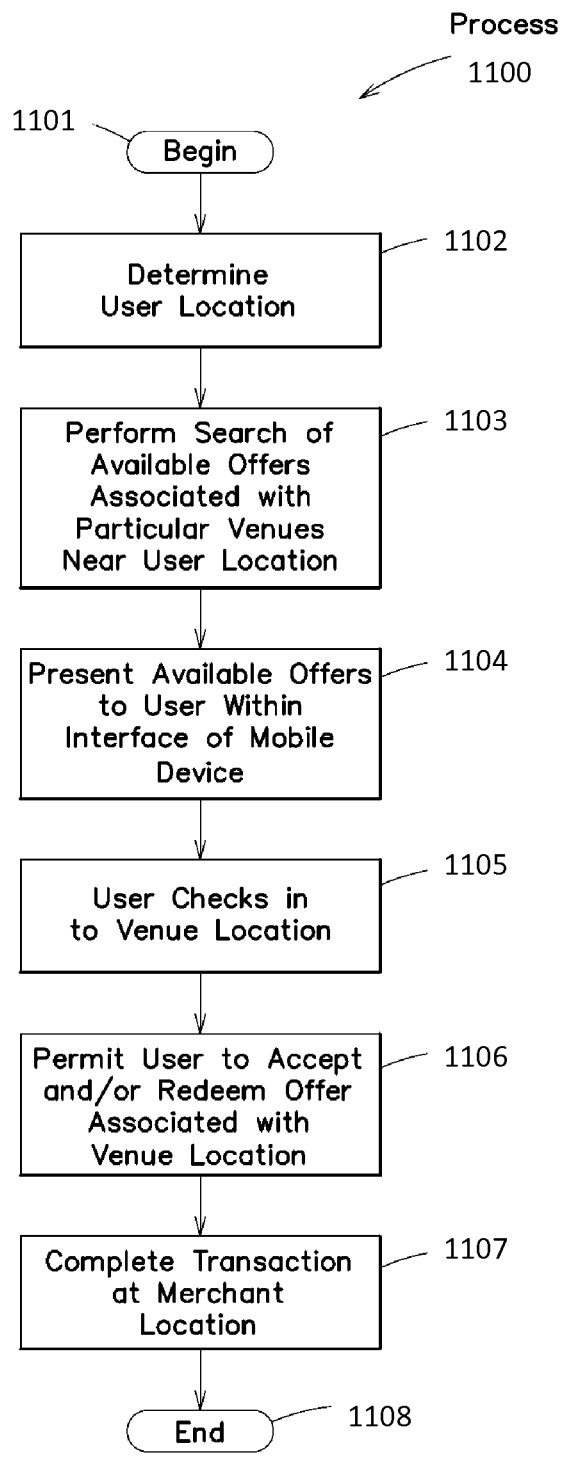
FIG. 11 shows a process for locating available offers and redeeming offers at a particular venue location according to one embodiment of the present invention.

FIG. 11 shows a process for locating available offers and redeem offers at a particular venue location according to one embodiment of the present invention. At block 1101, process 1100 begins. At block 1102, a location-based system determines the user location. This may be accomplished, for example, by a mobile device having GPS capability or other method of locating the location of the device. At block 1103, the location-based system performs a search of available offers associated with particular venues near the user's location. For instance, there may be a number of offers associated with venue locations within the particular distance of the determined mobile device, within a defined area entered by the user, or other location parameter.

At block 1104, the mobile device presents (e.g., in a display) available offers to the user within a list or other display construct. At block 1105, the user "checks in" to a particular venue location. According to one embodiment, a user may be required to check-in prior to regaining any offers at that particular venue. At block 1106, the location-based system permits a user to accept and/or redeem a selected offer associated with the venue location. At block 1107, a merchant system completely transaction at the merchant location associated with the defined venue. At block 1108, process 1100 ends.

Figure 12:
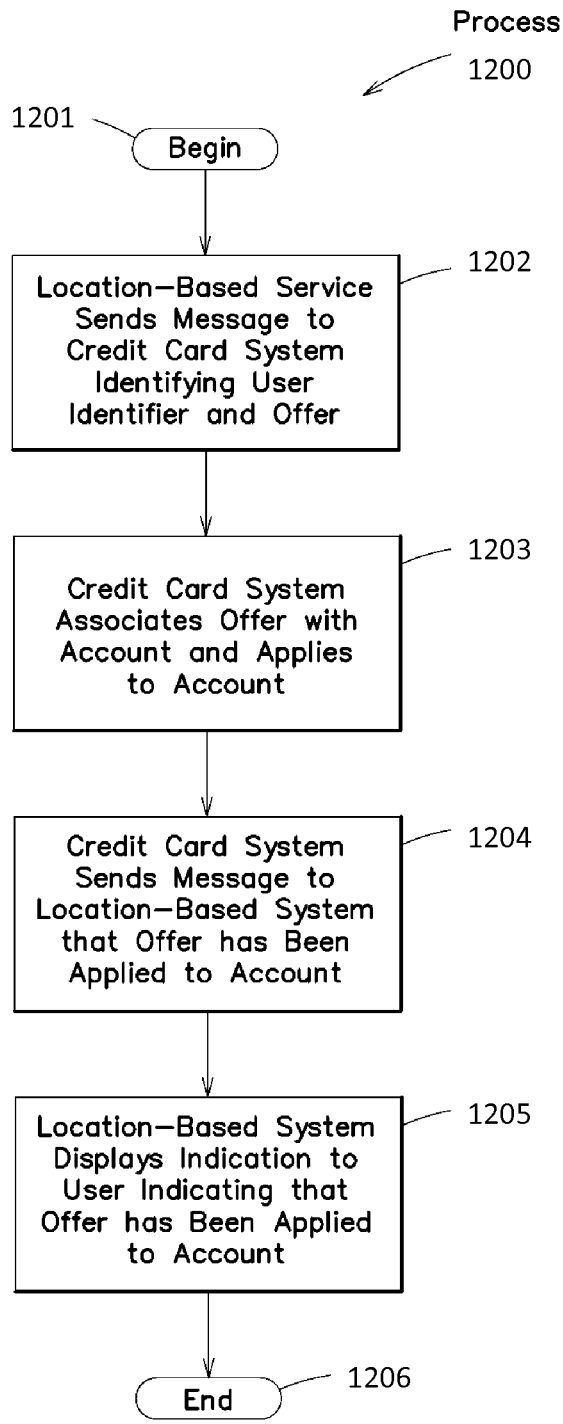
FIG. 12 shows a process for communicating between a location-based service and a credit card system for processing offers according to one embodiment of the present invention.

FIG. 12 shows a process for communicating between a location-based service and a credit card system for processing offers according to one embodiment of the present invention. At block 1201, process 1200 begins. At block 1202, a location-based service sends a message to a credit card system that processes transactions, the message identifying a particular user identifier and an offer. At block 1203, the credit card system associates the particular offer with an account of the user and applies the offer to the account. At block 1204, the credit card system sends a message to a location-based system indicating that the offer has been (or will be) applied to the user's credit card account. Notably, an offer that is accepted using the credit card is performed at any location using the location-based service, and notification of the accepted offer associated with the credit card account is indicated to the user in real-time using the mobile device and location-based service. At block 1205, the location-based system displays an indication to the user indicating that the offer has been applied to the credit card account. At block 1206, process 1200 ends.

Figure 13:
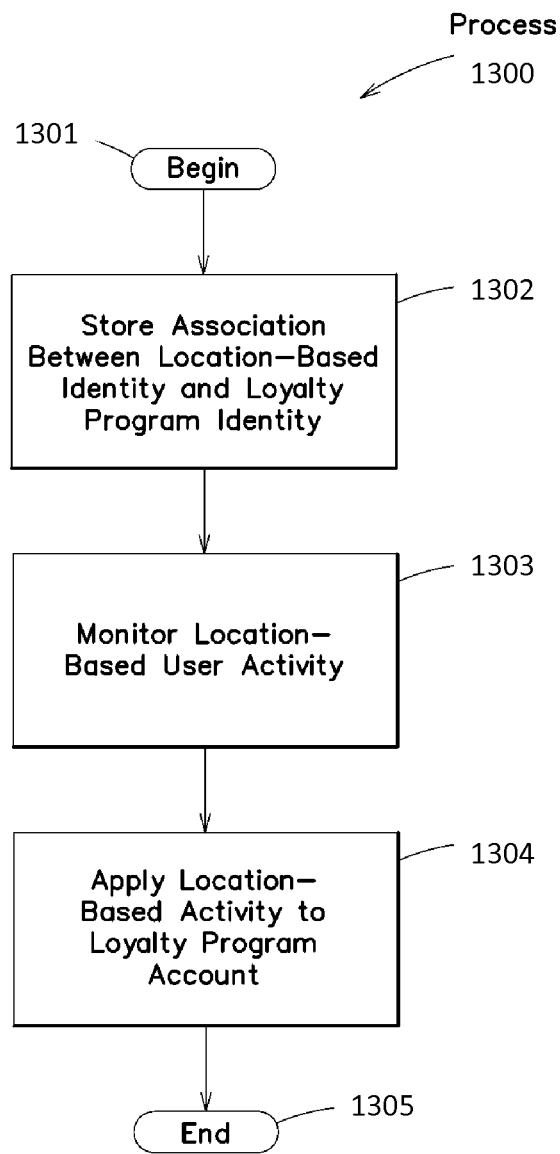
FIG. 13 shows a process for interacting between a location-based system and a loyalty program system according to one embodiment of the present invention.

FIG. 13 shows a process for interacting between a location-based system and a loyalty program system according to one embodiment of the present invention. At block 1301, process 1300 begins. At block 1302, a location-based system stores an association between a location-based identity and a loyalty program identity. For instance, the location-based identity may include a username within the location-based system. The loyalty program identity may include, for example, a loyalty program account that identifies a particular member. At block 1303, the location-based system monitors location-based user activity. For instance, the user may change their location within the location-based system, the user may view and/or accept offers within an interface of a mobile device, or perform other actions within the location-based system. At block 1304 responsive to that location-based activity, an action may be applied to a loyalty program account. For instance, the user may receive loyalty points, may receive special offers, offers may be applied to transactions, or the loyalty system may perform other functions relating to the loyalty account of the user. At block 1305, process 1300 ends.

Figure 14:
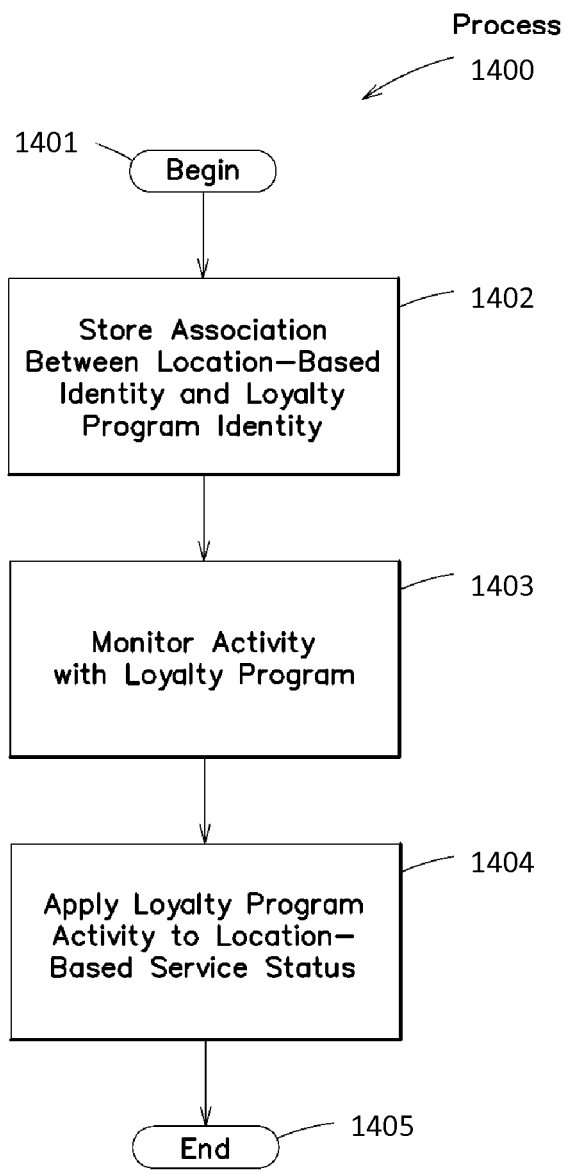
FIG. 14 shows a process for interacting between a location-based service and a loyalty program according to one embodiment of the present invention.

FIG. 14 shows a process for interacting between a location-based service and a loyalty program according to one embodiment of the present invention. At block 1401, process 1400 begins. At block 1402, a loyalty program system stores an association between a location-based identity and loyalty program identity. As discussed above, a location-based identity may include the username identified within the location-based system. A loyalty program identity may include a member number or other identifier that identifies a user within a loyalty system. At block 1403, the loyalty system monitors activity within the loyalty program. For instance, a user may "swipe" their loyalty card at a store, the user may login to an online loyalty program, or perform any other action involving the loyalty system. At block 1404, the loyalty system applies the loyalty program activity to a location-based service status. For instance, the user may receive, be permitted to view and/or accept special offers from the loyalty program (e.g., while the user is physically located at a store associated with the loyalty program) from the location-based service, may be permitted to associate offers accepted in the location-based service with a membership in the loyalty program, or perform other actions. At block 1405, process 1400 ends.

Figure 15:
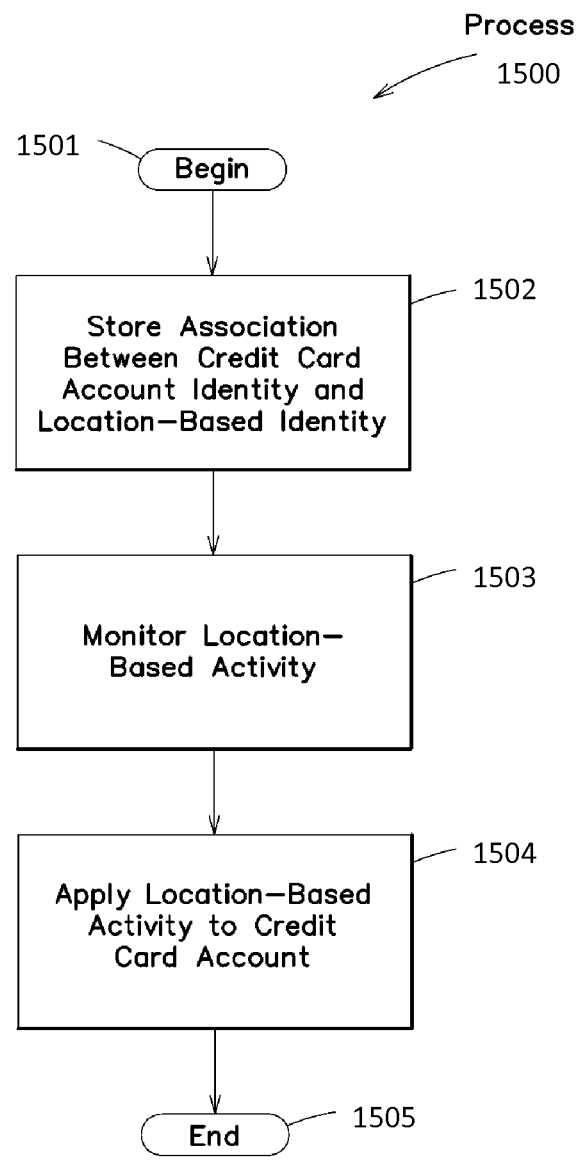
FIG. 15 shows a process for interacting between a credit card system and a location-based service according to one embodiment of the present invention.

FIG. 15 shows process for interacting between a credit card system and a location-based service according to one embodiment of the present invention. At block 1501, process 1500 begins. At block 1502, a location-based system stores an association between a credit card account identity and a location-based identity. As discussed above, the location-based identity may include a username defined within a location-based service. A credit card account identity may include, for example, a credit card account number, user name of a website associated with the credit card account, and/or any other information used to identify a credit card account. At block 1503, the location-based service monitors location-based activity of the user. For instance, the user may change their location, check-in to particular venues, look for available offers or perform other activities within the location-based system. At block 1504, location-based system applies location-based activity to a credit card account. For example, the user may request an association of one or more selected offer(s) with a credit card account and those selected offers may be applied to the specific account. At block 1505, process 1500 ends.

Figure 16:
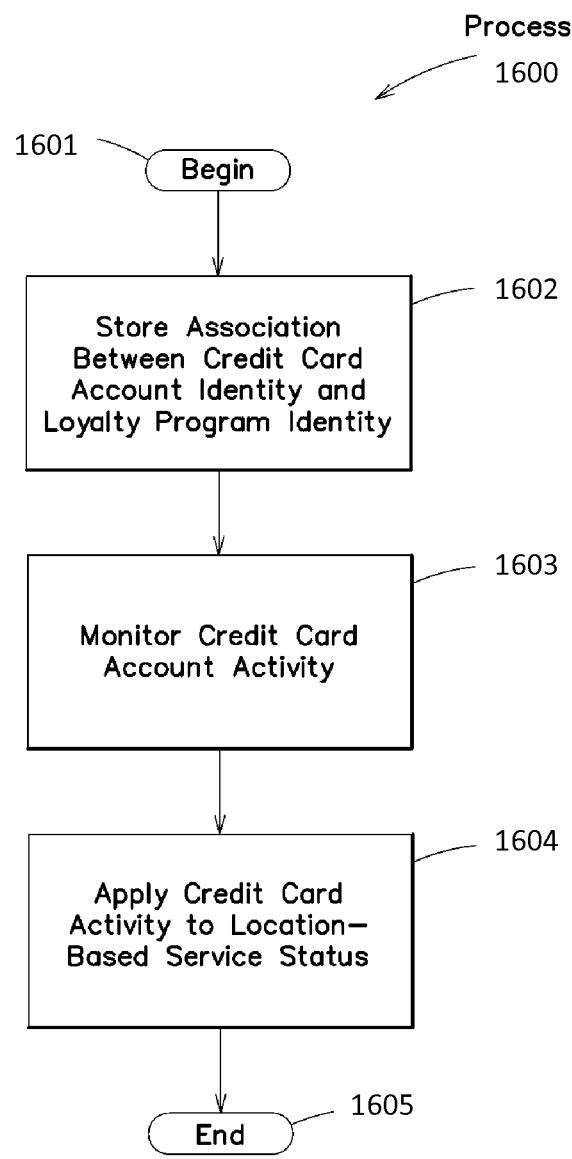
FIG. 16 shows a process for interacting between a credit card system and a location-based service according to one embodiment of the present invention.

FIG. 16 shows a process for interacting between a credit card system in a location-based service according to one embodiment of the present invention. At block 1601, process 1600 begins. At block 1602, a credit card system stores an association between a credit card account identity and a loyalty program identity. As discussed above, a credit card account identity may include a credit card and card holder username, or any other information that identifies a credit card account. A loyalty program identity may include, and the indication identifying a user within the location-based system. At block 1603, the credit card system monitors credit card account activity. For instance, the user uses his/her credit card to make a qualifying purchase at a venue location defined in a location-based system. At block 1604, the credit card system applies credit card activity to a location-based service status. For example, the user is automatically "checked-in" to the location-based on a transaction performed at the venue, the user is sent an indication that a particular offer is accepted and applied to the user's credit card account, or other action relating to the location-based service. At block 1605, process 1600 ends.

Figure 17:
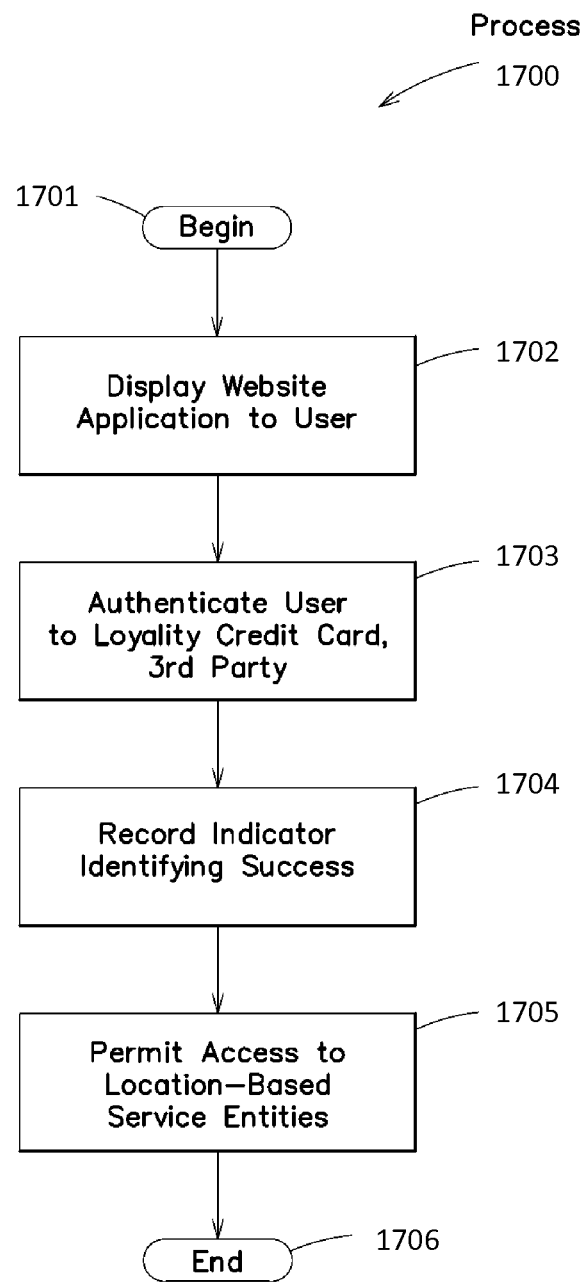
FIG. 17 is a block diagram showing a process for authenticating to a service that uses location-based service resources.

FIG. 17 shows an example process (e.g., process 1700) for authenticating to a service that uses location-based service resources in accordance with one embodiment. At block 1701, process 1700 begins. At block 1702, a website or other application (e.g., a location-aware application executing on the mobile device) may be displayed to the user. Such a website or other application may be, for example, a website operated by a loyalty program, credit card company, third-party offeror, or other service that is configured to create and manage resources in a location-based service. For instance, resources such as offers may be defined within the location-based service as more fully discussed below, and these offers may be accessed by users.

At block 1703, the users may be authenticated to a loyalty program, credit card program, third party provider, or other entity. In one implementation, a resource owner such as the loyalty program, credit card program, third party provider, or other entity may grant access by a client (e.g., a user) to particular defined offers in the location-based service without sharing a username and password defined at the loyalty program, credit card program, third party provider, or other entity's service. Rather, the client may authenticate directly to a server trusted by the location-based service (e.g., an authorization server) which issues an access token to the client to permit access to the location-based resource. Alternatively, an authorization server may be maintained by the loyalty program, credit card program, third party provider, or other entity's service. In one embodiment, the location-based service may use the OAuth 2.0 Authorization Protocol defined by IETF draft-ietf-oauth-v2-13 to permit users to access objects. However, it should be appreciated that other authentication protocols may be used.

At block 1704, the service records an indicator that identifies that the user has successfully authenticated. Such an indicator may be stored in a memory associated with a location-based service or a third party provider system. Notably, the indicator may be associated with a unique user identity of the user within the location-based service. This indicator may be used to unlock offers associated with particular venue locations. For instance, the location-based service may permit the user to access location-based service entities (e.g., offers) at block 1705. In one embodiment, after unlocking such offers, a user may be permitted to accept and/or redeem one or more of the unlocked offers. At block 1706, process 1700 ends.

Figure 18:
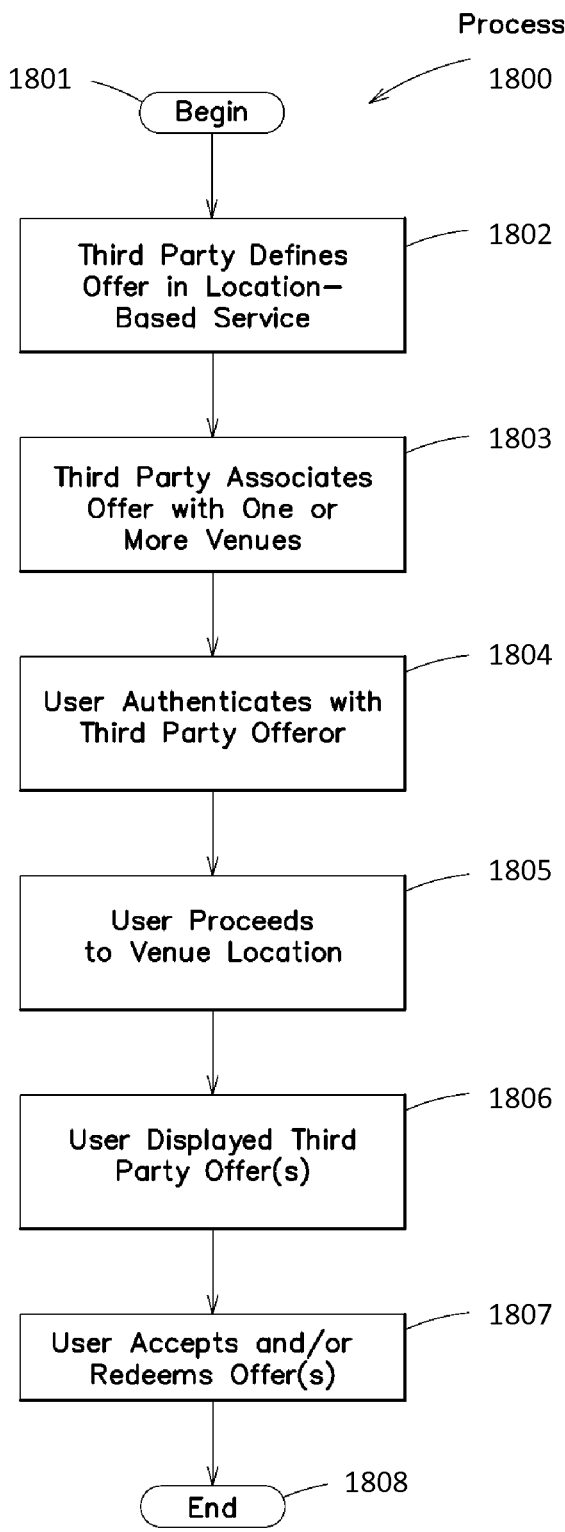
FIG. 18 is a block diagram showing a process for processing and redeeming offers using a location-based service according to one embodiment of the present invention.

FIG. 18 is a block diagram showing an example process (e.g., process 1800) for processing and redeeming offers using a location-based service according to one embodiment of the present invention. At block 1801, process 1800 begins. At block 1802, a third party or other entity that integrates with the location-based service defines an offer within the location-based service. For instance, the location-based service may include a management interface, API or other interface with which the third party or any other entity may define offers. For one or more third parties or other entities, the location-based service may automatically import offers from the third party and make them available to users of the location-based service. For instance, such offers may be imported from a data feed, storage location, website, API, or other data source.

In one embodiment, a number of parameters may be defined on the offer, such as the offer name, information displayed to the user when the offer is unlocked (e.g., by checking in to a particular venue location), a type of offer depending on the status of the user (e.g., the "mayor" of a particular venue location), frequency the user visits the venue location (e.g., the offer is unlocked every X number of check-ins), the number of friends that check-in to a location, or other parameter. It should by appreciated that offers could be created by one of any number of entities, including, but not limited to merchants, credit card company, loyalty program provider, product or service producer, application provider, location-based service provider, or any other entity.

In one embodiment, the third party may create one or more offers that can be associated with a particular venue location defined in a memory associated with a location-based service (e.g., at block 1803). To this end, the location-based service may provide a management interface, API or other interface with which the third party or other entity may "attach" or otherwise associate defined offers to particular venue locations. Venues may be tracked by a venue identifier, which in one embodiment may be a unique identifier associated with a venue location. Parameters may be defined in relation to the attached offer, such as defining when the offer expires, when the offer is activated, among other criteria that may apply to the offer as defined on that particular venue location.

Once defined, the offer may be accepted by a user. According to one optional embodiment, the user is required to authenticate with a third party offeror or other entity prior to redeeming or purchasing any offers (or particularly designated offers). Optionally, at block 1804, the user authenticates with the third party offeror, location-based service, or other entity that provides an authentication service as discussed above with reference to FIG. 3. According to another embodiment, one criteria that may be required as a prerequisite for the user to view, accept, and/or redeem offers is that the user must be located near the venue location where the offers are redeemed. Such information may be determined by, for example, a mobile device and provided to the location-based service. For instance, location may be determined by one or more methods, including, but not limited to GPS, cell triangulation methods, WiFi, WLAN, Bluetooth, RF1D, NFC, or other technologies or combinations of technologies.

At block 1805, the user proceeds to the venue location, such as a retail location where goods and/or services are sold. At block 1806, the user is displayed, on an interface of a mobile device, an indication of one or more offers made by the third party or other entity. A user may be permitted to select one or more of those offers to be accepted and/or redeemed (e.g., within an interface of a mobile device as discussed above). Alternatively, block 1806 may not be required, as the system may permit seamless acceptance of offers during a transaction (e.g., when the user "checks out" at the venue location). At block 1807, the user is permitted to accept and/or redeem the one or more offers. For instance, the user may select the offers to be accepted and/or redeemed within the interface of the mobile device, and those offers are associated with a transaction that the user is performing at the venue location. The defined offers may be permitted to be accepted and/or redeemed, according to one embodiment, when the user "checks in" to the venue location within the location-based service. In another embodiment, the user may be required to perform another action to accept and/or redeem the offer, such as, for example, selecting the offer to be redeemed within an interface of the mobile device, or by purchasing the offer and receiving a voucher. Such offers may be credited towards the current transaction, or may be provided to the user for use in a future transaction. At block 1808, process 1800 ends.

Figure 19:
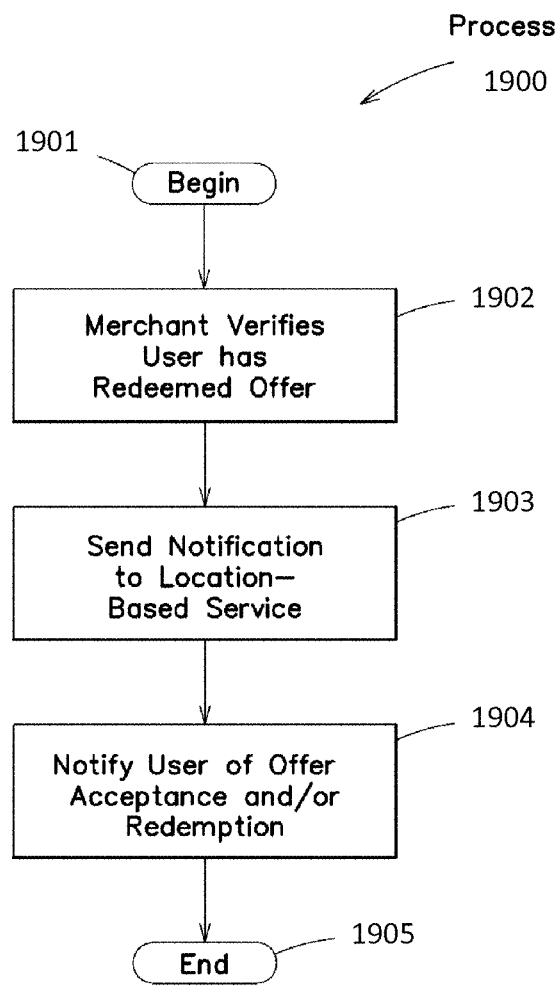
FIG. 19 is a block diagram showing a process for verifying redeemed offers using a location-based service according to one embodiment of the present invention.

FIG. 19 is a block diagram showing an example process (e.g., process 1900) for verifying accepted and/or redeemed offers using a location-based service according to one embodiment of the present invention. At block 1901, process 1900 begins. At block 1902, a merchant verifies that a user has accepted and/or redeemed a particular offer. Such an offer may include an offer defined in a location-based service as discussed above. Responsive to the acceptance and/or redemption, a computer system associated with the merchant may send a notification to a location-based service (e.g., at block 1903), and the location-based service may in turn notify the user that the offer has been accepted and/or redeemed (e.g., at block 1904). Notably, the location-based service may be used to notify the user that the offer has been accepted and that the other may be, in one embodiment, applied to the current transaction. At block 1905, process 1900 ends.

Figure 20:
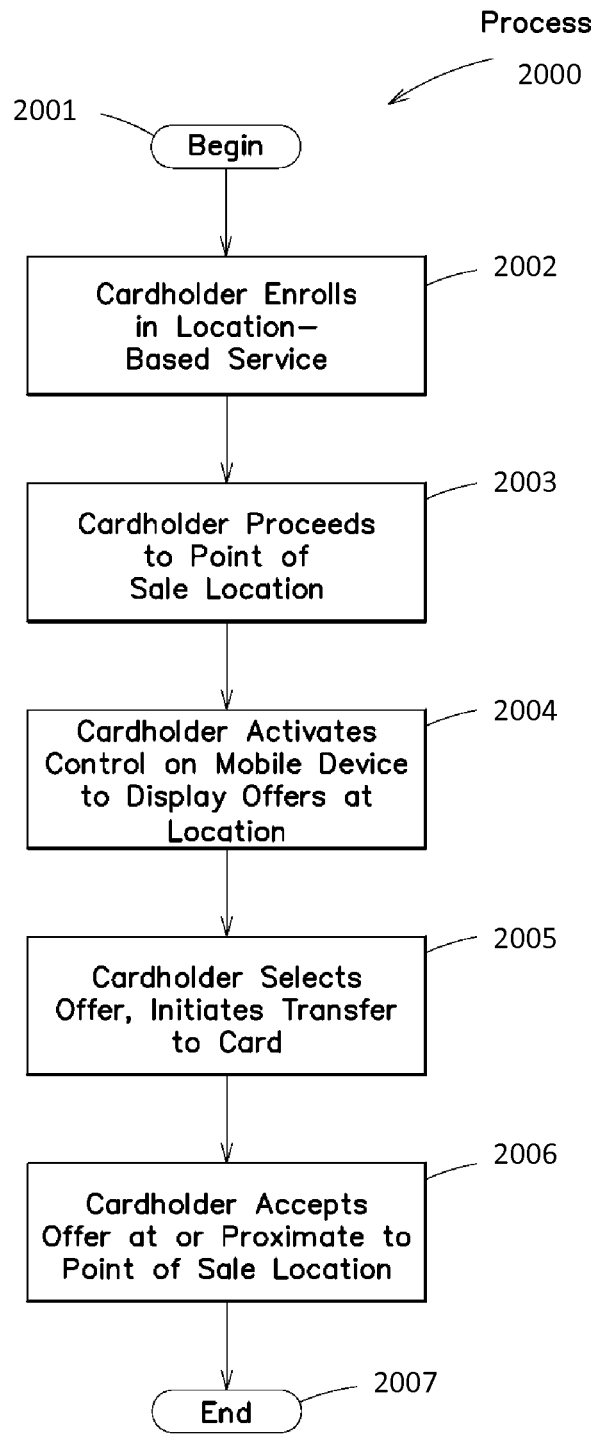
FIG. 20 is a block diagram showing a process for redeeming offers using a location-based service according to one embodiment of the present invention.

FIG. 20 is a block diagram showing an example process (e.g., process 2000) for redeeming or purchasing offers using a location-based service according to one embodiment of the present invention. At block 2001, process 2000 begins. In one embodiment, a credit card account holder is permitted to accept and redeem offers associated with credit card account holders. Such offers may be made available to credit card account holders through the location-based service. At block 2002, the cardholder enrolls in the location-based service. For instance, a website may permit a user to login using credentials of the cardholder, and enable an option that links the cardholder's identity (e.g., by credit card account number or other account identification) with the user's identity within the location-based service. Once identified with the location-based service as an authorized cardholder, that user may be permitted to view, accept, and/or redeem offers. For instance, at block 2003, the user (cardholder) proceeds to a point of sale location where the user can use his/her credit card or other payment instrument.

In one embodiment, if the user is not a cardholder, that user may be permitted to view offers (e.g., on an interface of a mobile device), but not accept or redeem them. The user may be provided an opportunity to become a cardholder in order to accept and/or redeem such offers, and the opportunity to accept and/or redeem such offers may result in increased cardholder memberships. In another embodiment, a user may not be capable of accepting and/or redeeming certain offers until the user/cardholder is authenticated as a cardholder.

At block 2004, the cardholder according to one embodiment activates a control on his/her mobile device that causes a display of offers available to be redeemed at the point of sale (e.g., the venue location as defined in the location-based service). As a prerequisite to viewing, purchasing, accepting, and/or redeeming particular offers, the user (cardholder) may be required to "check-in" to the venue location. In some embodiments, the user may be required to perform another action to redeem the offer, such as, for example, selecting the offer to be redeemed within an interface of the mobile device, or by purchasing the offer and receiving a voucher. At block 2005, the cardholder selects one or more offers to be redeemed (e.g., within an interface presented to the user in a display of the mobile device). Further, once selected, the offers may be "transferred" to the user's credit card or other payment instrument, in that the offers are then associated with the credit card account. At block 2006, the cardholder may use the card at the point of sale location to purchase goods or services, and accept any offers which may apply to the transaction. At block 2007, process 2000 ends.

Figure 21:
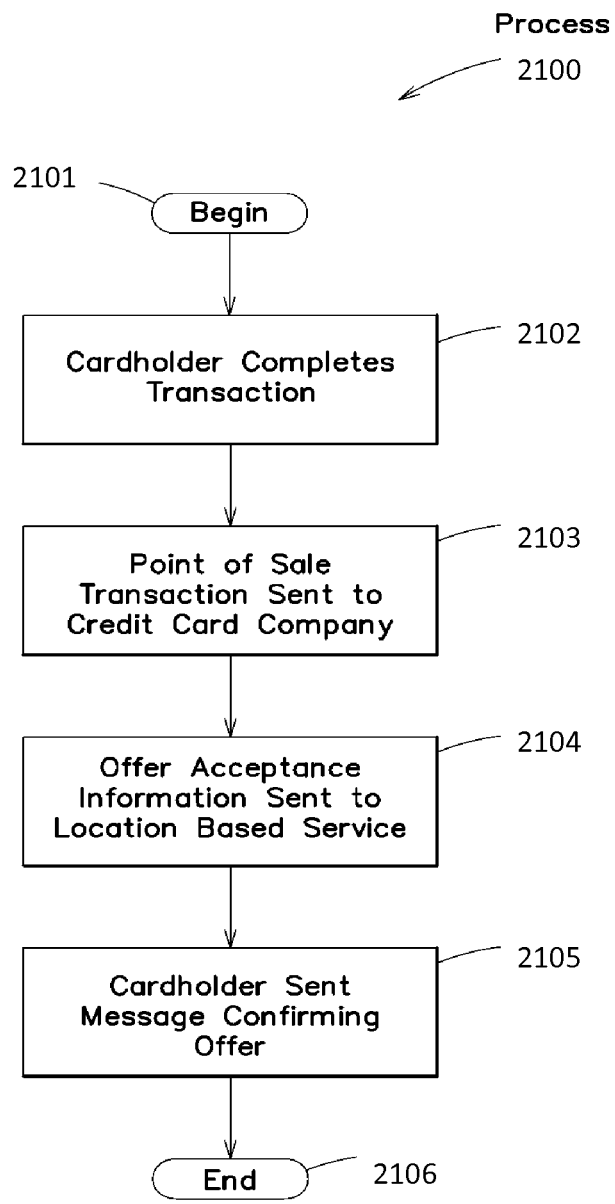
FIG. 21 is a block diagram showing a process for redeeming credit card offers using a location-based service according to one embodiment of the present invention.

FIG. 21 is a block diagram showing an example process (e.g., process 2100) for redeeming credit card offers using a location-based service according to one embodiment of the present invention. At block 2101, process 2100 begins. At block 2102, a cardholder completes a transaction involving an offer that was previously associated with the user's card or otherwise generally applied to a credit card program. Such an association may be stored in a memory of a system of a location-based service. To complete a transaction, for instance, at the point of sale location, the cardholder "swipes" his/her credit card at a card reader device. The transaction is cleared, and point of sale transaction information is sent to the credit card company (e.g., a computer system that handles transactions) at block 2103 over a communication network. The credit card company system communicates offer acceptance information to the location-based service (e.g., at block 2104). At block 2105, the location-based service sends a message to the user (e.g., via the user's mobile device) confirming that the offer has been accepted and applied to the user's account. In this way, the user may be notified separately and independently from the merchant sale transaction systems that the credit card offer was successfully applied to a particular transaction.

Figure 22:
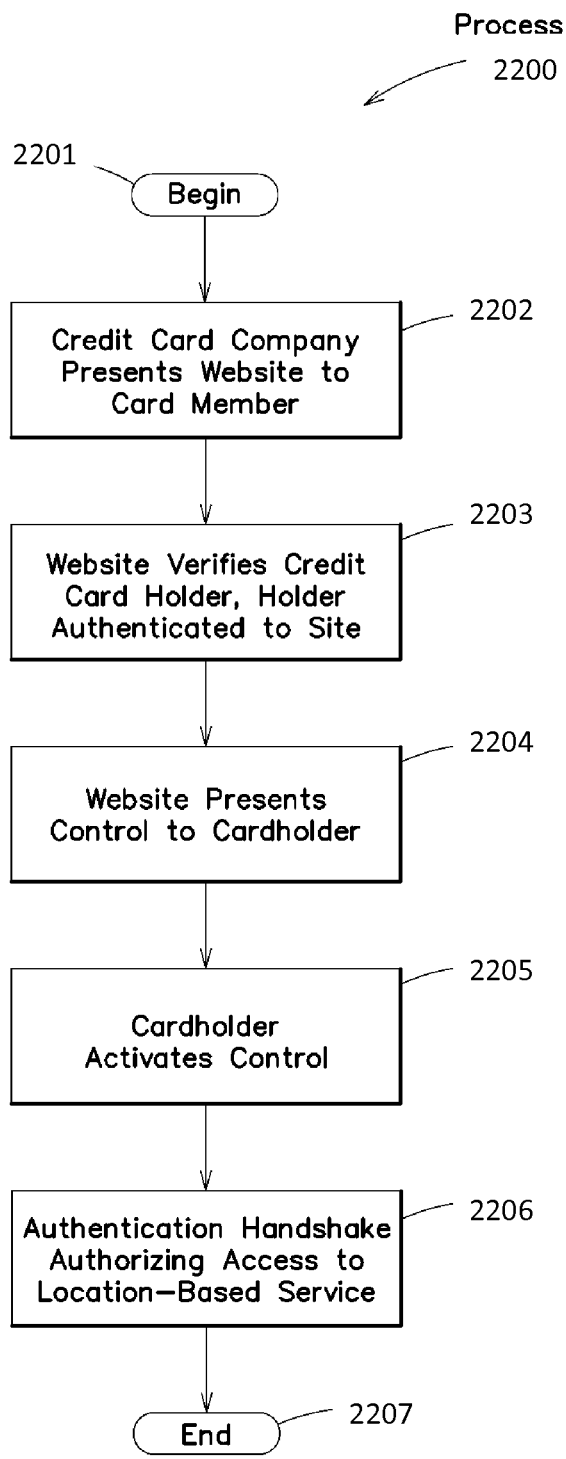
FIG. 22 shows a process for authorizing access by a location-based service to a credit card account according to one embodiment of the present invention.

FIG. 22 shows a process 2200 for authorizing access by a location-based service to a credit card account. At block 2201, process 2200 begins. At block 2202, a credit card company presents a website to a cardmember. For instance, a website interface may be provided that allows the cardmember to access their account information and configure access to their account. For instance, the cardmember may provide authentication information such as a username and/or password to gain access. Other information for authenticating the user may also be used.

At block 2203, the website verifies the credit card holder in the credit card holder is authenticated to the website. In one embodiment, the website may include a control that when presented to the user (e.g., at block 2204), allows the user to authorize access to an application or service, such as a location-based service. At block 2205, the cardholder activates a control (e.g., a button or other user interface control) that when activated, initiates an authentication handshake authorizing access to a location-based service (e.g., at block 2206). For instance, authorization information may be stored at a credit card system that allows access to particular information relating to the credit card account by the location-based service. It should be appreciated also that the authentication handshake may be performed earlier in the process (e.g., prior to or at block 2203). At block 2207, process 2200 ends.

Figure 23:
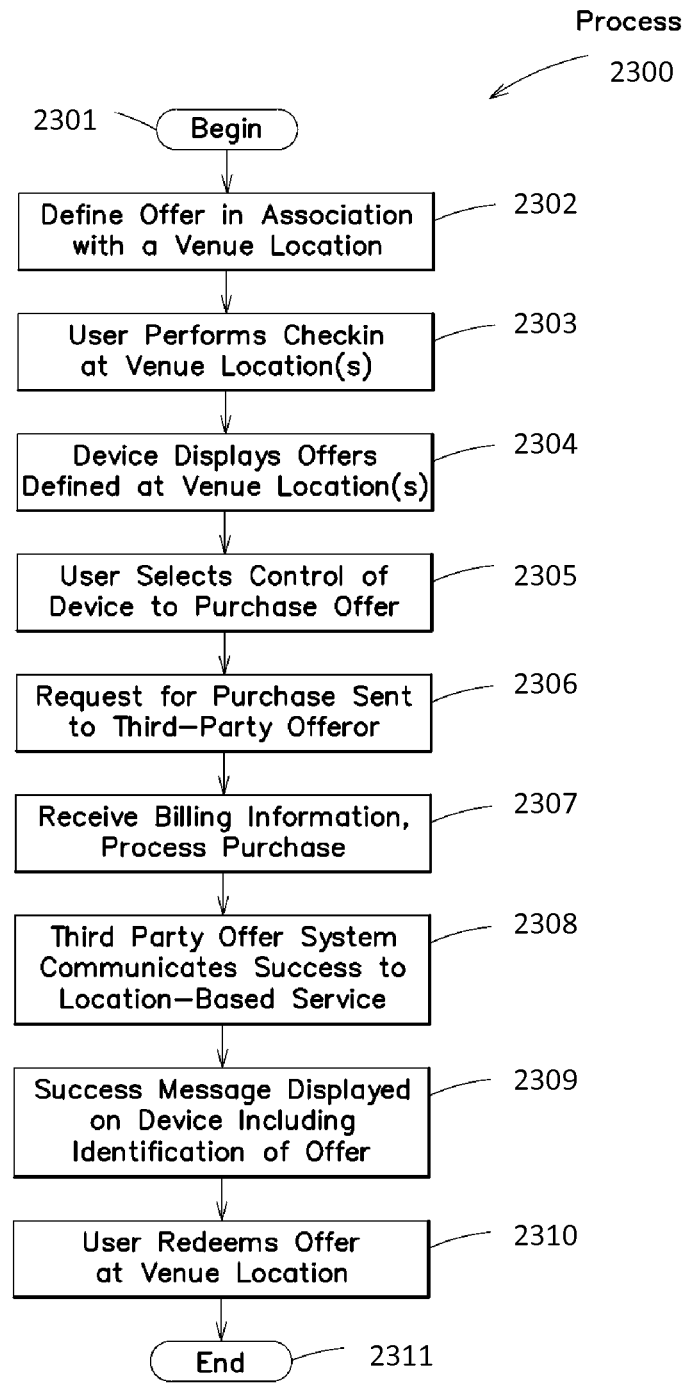
FIG. 23 shows a process for processing purchases of third-party offers using a location-based service according to one embodiment of the present invention.

FIG. 23 shows a process 2300 for processing purchases of third-party offers using a location-based service. At block 2301, process 2300 begins. At block 2302, an offer as defined in association with a venue location. For instance, a venue owner may be permitted to define one or more offers within a location-based service. In one implementation, the venue owner may define offers using a user interface to a venue management website that permits the creation an association of offers to particular venues. In another implementation, offers may be imported by the location-based service such as from an offer provider (e.g., the well-known Groupon offer site). In yet another implementation, an API may be provided that permits applications to create offers and associate them with venues within the location-based service.

At block 2303, a user performs a check in at one or more particular venue locations. For instance, in a location-based service, that user may select a control that allows the user to check in to one or more venues. According to one embodiment, the location-based service may display offers at a venue once a user is checked in to the location. For instance, at block 2304, a mobile device may display offers defined at the venue location to the user within the display. At block 2305, a user optionally selects a control presented within the interface of the device to purchase a particular offer. In another embodiment, the user does not need to affirmatively accept the offer (e.g., by selecting a control), but can perform another action such as by making a qualifying purchase at the venue location. At block 2306, a request is sent from the location-based service to a third party offeror. For instance, the location-based service may send a message to a system associated with the third party offeror. The third party offer system may indicate in return that the particular offer may be purchased, and may send such an indication to the location-based service. At block 2307, the user may enter billing information on the device, or the system may otherwise transmit any billing information to the third party offer system for purchasing the offer selected by the user. In one embodiment, such billing information may be preloaded or otherwise associated with the user prior to any of these steps. For instance, the billing information may be obtained prior to offer display and/or loading. At block 2308, the third party offeror system communicates information indicating success to the location-based service, and success information is displayed at the user device. For instance, at block 2309, a success message may be displayed on the user device including identification of the offer that was purchased.

The user may then proceed to redeem the purchased offer at the venue location at block 2310. In one embodiment, information displayed within the device may be used to redeem the offer at the venue location. For instance, a bar code or other proof of purchase information may be used or presented at the venue location for the user to receive goods or services. At block 2311, process 2300 ends.

Figure 24:
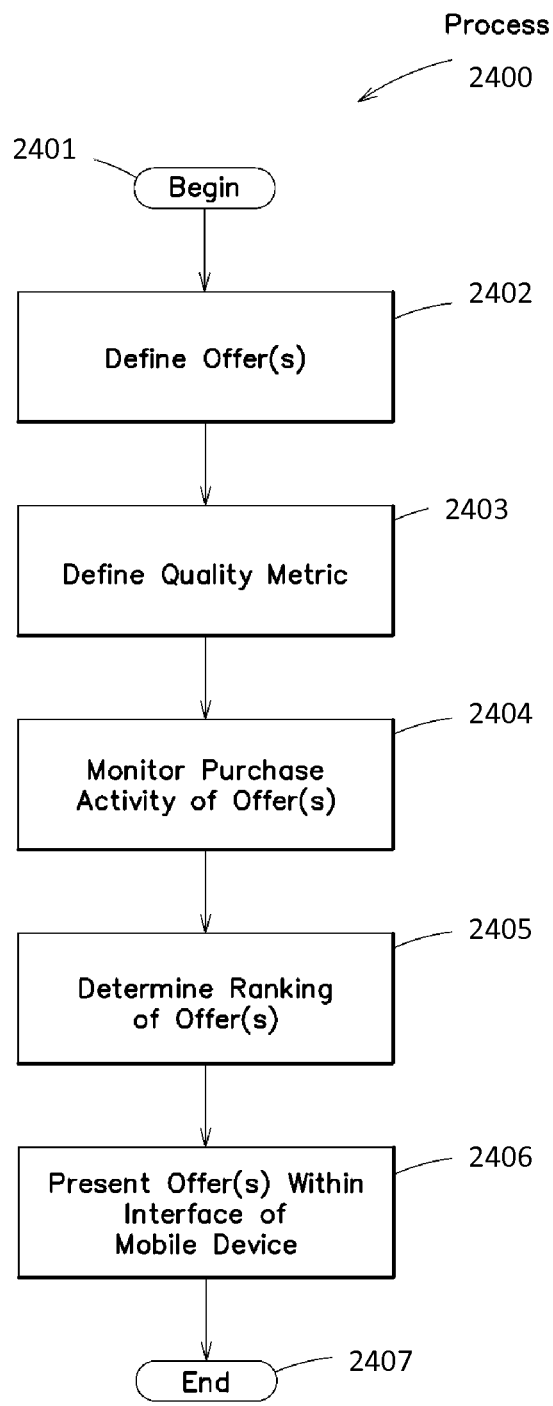
FIG. 24 shows a process for presenting offers to users in accordance with one embodiment of the present invention.

FIG. 24 shows a process 2400 for presenting offers to users in accordance with one embodiment of the present invention. At block 2401, process 2400 begins. At block 2402, one or more offers are defined within for instance a location-based service. Such offers may be defined in many ways as discussed above. At block 2403, a quality metric is defined that permits the user to filter the offers received within the interface of the device. For instance, a user may only want to see the best offers that are applicable to that user. In one embodiment, the quality metric may be a numerical ranking of particular offers, and the user may be permitted to select a particular level of quality metric so that offers having a minimum level of the quality metric may be shown within the device interface. In another embodiment, the location-based service automatically selects and ranks offers that are presented to a particular user. In one implementation, offers are ranked without user intervention.

According to one embodiment, the metric may relate to one or more parameters that are tracked by the location-based service. For instance, a quality metric may relate to the number of times a particular offer has been purchased by other users, such as users within the user's social network. Offers may also be ranked based on the amount of purchases of the offer that have occurred within a fixed amount of time (e.g., a conversion rate of the offer measured over the last 4 hours, 8 hours, 24 hours, etc.). Offers may also be ranked based on the value that they may provide to a particular user. For instance, offers may be ranked according to a percentage savings or amount of money saved. In one embodiment, a personalized ranking signal may be determined for a particular user based on information relating to that user. In this way, offers may be selectively presented to the particular user so that they are more likely to be accepted by that user. Further, because in some embodiments such offers are presented on a mobile device (e.g., a phone) that has limited display area, it is appreciated that such offers should be highly targeted to that user.

At block 2405, the location-based system determines a ranking of one or more offers, and such offers as ranked are presented within the interface of the mobile device at block 2406. At block 2407, process 2400 ends.

Figure 25:
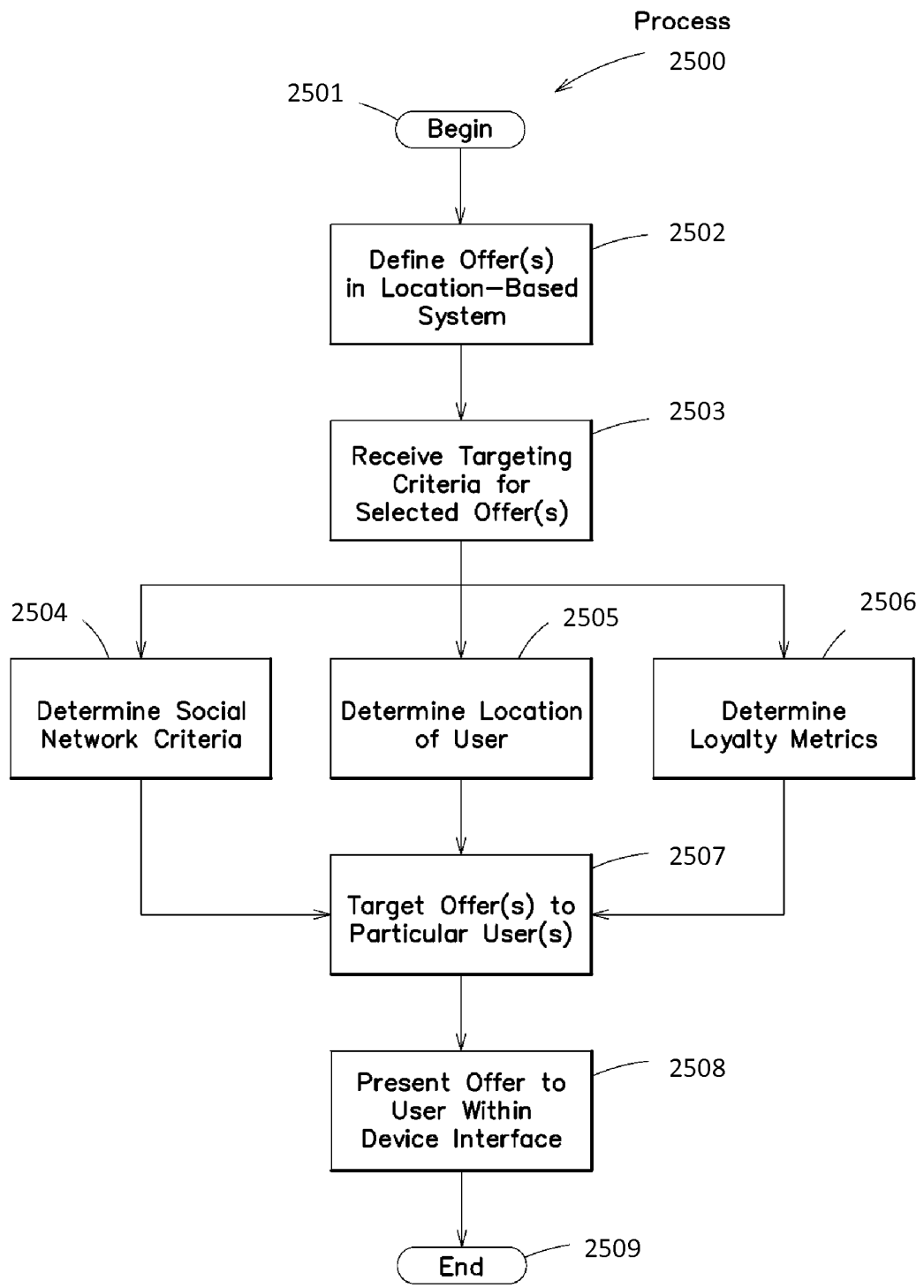
FIG. 25 shows a process targeting offers to users according to one embodiment of the present invention.

FIG. 25 shows a process 2500 targeting offers to users according to one embodiment of the present invention. At block 2501, process 2500 begins. At block 2502, one or more offers are defined within a location-based system. As discussed above, offers may be created in a number of ways and associated with particular venue. At block 2503, a user associated with a particular venue is capable of creating offers within the location-based system. This may be accomplished, for instance, using a management interface, API, or other interface associated with the location-based service.

At block 2503, the location-based system receives targeting criteria for one or more selected offers. According to one embodiment, the user may define criteria that when evaluated, causes a particular offer to be made to a user of the location-based system. For instance, when particular criteria are fulfilled, an indication of an offer is displayed within an application interface of the location-based system (e.g., as presented on an interface of a mobile device).

As discussed, one or more criteria may be used to determine whether a particular offers targeted to a particular user. At block 2504, the location-based system determines social network criteria associated with the user. For instance, the system may be able to determine whether certain deals have been targeted to particular users in that user's social network. In one example, using Twitter, offers may be sent to followers of a particular user, or offers may be sent to friends of particular followers. In one embodiment, an offer may be matched to a user and if the user accepts or purchases that particular offer, that offer may be extended to other users as determined by the location-based system.

The block 2505, the location-based system may determine the location of the user. Based on that person's location, particular offers may be targeted to that user. Location information along with other information may be used to determine whether or not that user receives a particular offer. For instance, as discussed above, particular offers may be targeted to particular users based on criteria associated with each respective user. The user criteria may include, without limitation, demographic information (e.g., residence information, income, gender, age, etc.), behavioral information of the user (e.g., check-in history, purchase history, offer acceptance history, etc.), psychographic information (e.g., interests, opinions, information relating to user values, etc.), among other types of user information, either alone or in combination with any data. At block 2506, the location-based system may also determine one or more loyalty metrics that are used to target particular offers to particular users.

At block 2507, the location-based system targets one or more offers to particular users. According to one embodiment, the system at block 2508, presents an offer to the user within the device interface. This may be done, for example, in association with a venue where the user has checked in. For instance, there may be a user interface element that displays offers associated with a particular venue. Further, depending on whether the offers are targeted to that particular user, certain offers may be displayed to the user within the interface. At block 2509, process 2500 ends.

Figure 26:
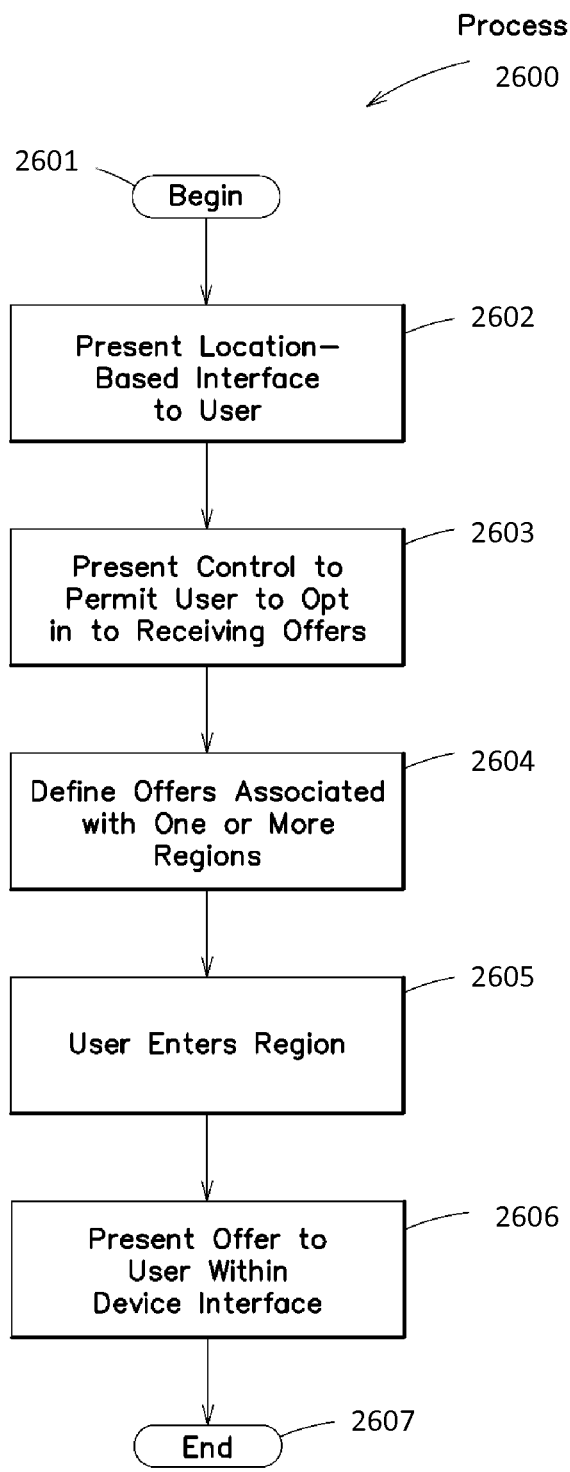
FIG. 26 shows a process that permits a user to control whether or not the user receives offers from a location-based system according to one embodiment of the present invention.

FIG. 26 shows a process 2604 permitting the user to control whether or not the user receives offers from a location-based system according to one embodiment of the present invention. At block 2600, process 2600 begins. At block 2602, a location-based interfaces present to the user. For instance, the interface may be provided to a user via a website, a user device, or other computer system that permits the user to control whether or not the user will receive offers. For example, a user device may be configured to present a user interface control to allow the user to opt in to receiving offers on that particular user device (e.g., at block 2603).

At block 2604, a venue operator or other user may define offers associated with one or more regions. These regions may be set location areas or may be a location that is relative to another particular location (e.g., the location of the user at a particular point in time, within X feet of the current location of the user, within X miles of the venue location, etc.). According to one embodiment, a venue operator that defines offers associated with his/her location may be permitted to define the location area in which a particular offer is triggered. This may be accomplished, for example, within a management interface within which venue operators define offers that are presented to users.

At block 2605, a user enters a particular region (e.g., within a particular distance of a venue location), and at block 2606, the location-based system presents an offer to the user within a device interface. For instance, if the location-based application is currently executing within the interface, an indication may be provided that notifies a user of an offer that can be redeemed. In another embodiment, where the location-based application is not currently executing, the notification may be provided by the device (e.g., a message, pop-up window, or other notification type) indicating an offer to the user. Notably, because notifications may be based at least in part on the location of the user, location data may be used to filter what offers are provided. In one example, when the user is near a particular location, the location-based service may send push notifications to that user. In yet another embodiment, recommendations may be provided to the user based on the user's location relative to the location of the venue relating to the recommendation.

In another implementation, if a user opts-in to receiving notifications, the user's device will send the location-based service the location of the device from time to time. For instance, the device may send an updated location to the location-based service after the user moves a specific distance. In one implementation, notifications are based on the user's interaction with regions. In one example, the device includes a process that monitors the user's location (referred to herein as a location manager process (such as provided in an iPhone OS by Apple Computer)) that persists between launches of an application (e.g., a location-based application). If a region crossing occurs while the user's application is not running, the system may automatically wake up the application (or relaunches the application) in the background so that the application can process the event. When relaunched, all of the regions configured previously are made available in a property of any location manager objects that are created.

Therefore, when the user moves a set distance, the application (e.g., the location-based application residing on the user device) will wake up and the location will be sent to the location-based service. The location-based service then sends the user push notifications about interesting things nearby (e.g., friends checked-in, things on the user's "to do" list, and offers located nearby). As discussed, such offers may be created in the location-based service, or may be third-party offers provided by one or more systems that provide offers (e.g., Groupon, LivingSocial, American Express, etc.). At block 2607, process 2600 ends.

Further, on each of the one or more computer systems that include one or more components of distributed system 800, each of the components may reside in one or more locations on the system. For example, different portions of the components of system 800 may reside in different areas of memory (e.g., RAM, ROM, disk, etc.) on one or more computer systems. Each of such one or more computer systems may include, among other components, a plurality of known components such as one or more processors, a memory system, a disk storage system, one or more network interfaces, and one or more busses or other internal communication links interconnecting the various components.

Figure 27:
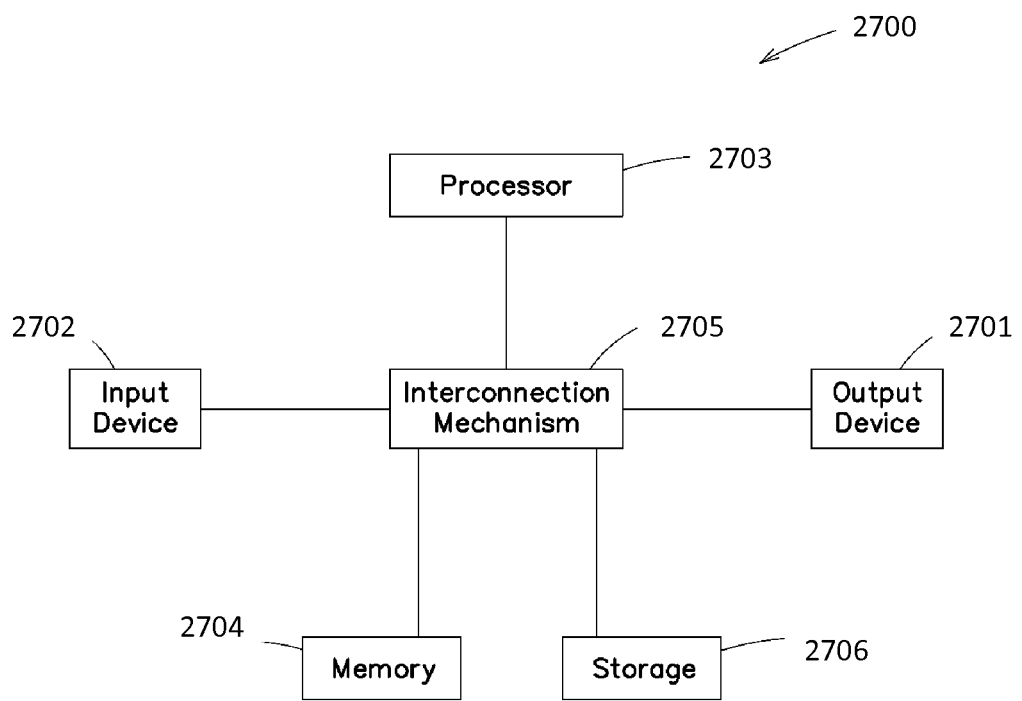
FIG. 27 shows an example computer system with which various aspects of the invention may be practiced.
Figure 28:
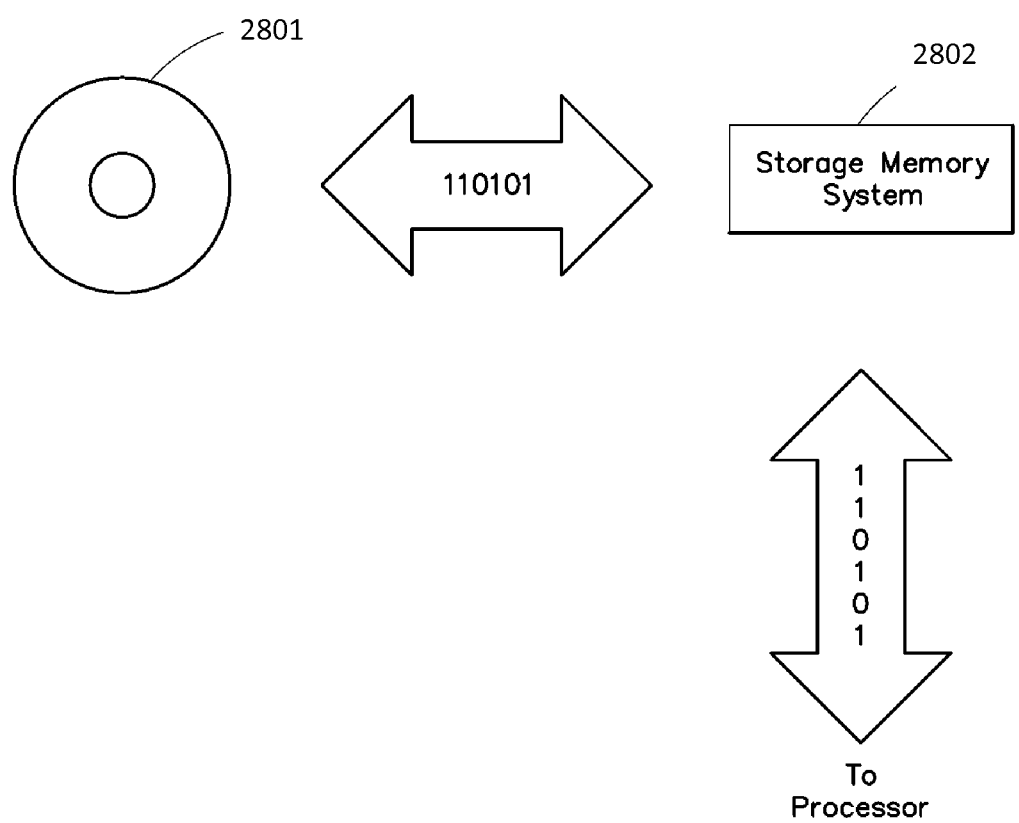
FIG. 28 shows an example storage system capable of implementing various aspects of the present invention.

Any number of systems of distributed system 800 may be implemented on a computer system described below in relation to FIGS. 27 and 28. In particular, FIG. 27 shows an example computer system 2700 used to implement various aspects. FIG. 28 shows an example storage system that may be used.

System 2700 is merely an illustrative embodiment of a computer system suitable for implementing various aspects of the invention. Such an illustrative embodiment is not intended to limit the scope of the invention, as any of numerous other implementations of the system, for example, are possible and are intended to fall within the scope of the invention. For example, a virtual computing platform may be used. None of the claims set forth below are intended to be limited to any particular implementation of the system unless such claim includes a limitation explicitly reciting a particular implementation.

Various embodiments according to the invention may be implemented on one or more computer systems. These computer systems may be, for example, general-purpose computers such as those based on Intel PENTIUM-type processor, Motorola PowerPC, Sun UltraSPARC, Hewlett-Packard PA-RISC processors, or any other type of processor. It should be appreciated that one or more of any type computer system may be used to partially or fully automate integration of the location-based services with the other systems and services according to various embodiments of the invention. Further, the software design system may be located on a single computer or may be distributed among a plurality of computers attached by a communications network.

For example, various aspects of the invention may be implemented as specialized software executing in a general-purpose computer system 2700 such as that shown in FIG. 27. The computer system 2700 may include a processor 2703 connected to one or more 27 memory devices 2704, such as a disk drive, memory, or other device for storing data. Memory 2704 is typically used for storing programs and data during operation of the computer system 2700. Components of computer system 2700 may be coupled by an interconnection mechanism 2705, which may include one or more busses (e.g., between components that are integrated within a same machine) and/or a network (e.g., between components that reside on separate discrete machines). The interconnection mechanism 2705 enables communications (e.g., data, instructions) to be exchanged between system components of system 2700. Computer system 2700 also includes one or more input devices 2702, for example, a keyboard, mouse, trackball, microphone, touch screen, and one or more output devices 2701, for example, a printing device, display screen, and/or speaker. In addition, computer system 2700 may contain one or more interfaces (not shown) that connect computer system 2700 to a communication network (in addition or as an alternative to the interconnection mechanism 2705.

The storage system 2706, shown in greater detail in FIG. 28, typically includes a computer readable and writeable nonvolatile recording medium 2801 in which signals are stored that define a program to be executed by the processor or information stored on or in the medium 2801 to be processed by the program. The medium may, for example, be a disk or flash memory. Typically, in operation, the processor causes data to be read from the nonvolatile recording medium 2801 into another memory 2802 that allows for faster access to the information by the processor than does the medium 2801. This memory 2802 is typically a volatile, random access memory such as a dynamic random access memory (DRAM) or static memory (SRAM). It may be located in storage system 2706, as shown, or in memory system 10 2704, not shown. The processor 2703 generally manipulates the data within the integrated circuit memory 2704, 2802 and then copies the data to the medium 2801 after processing is completed. A variety of mechanisms are known for managing data movement between the medium 2801 and the integrated circuit memory element 2704, 2802, and the invention is not limited thereto. The invention is not limited to a particular memory system 2704 or storage system 2706.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 2700 is shown by way of example as one type of computer system upon which various aspects of the invention may be practiced, it should be appreciated that aspects of the invention are not limited to being implemented on the computer system as shown in FIG. 27. Various aspects of the invention may be practiced on one or more computers having a different architecture or components that that shown in FIG. 27.

Computer system 2700 may be a general-purpose computer system that is programmable using a high-level computer programming language. Computer system 2700 may be also implemented using specially programmed, special purpose hardware. In computer system 2700, processor 2703 is typically a commercially available processor such as the well-known Pentium, Core, Core Vpro, Xeon, or Itanium class processors available from the Intel Corporation. Many other processors are available. Such a processor usually executes an operating system which may be, for example, the Windows NT, Windows 2700 (Windows ME), Windows XP, Windows Vista or Windows 7 operating systems available from the Microsoft Corporation, MAC OS Snow Leopard, MAC OS X Lion operating systems available from Apple Computer, the Solaris Operating System available from Sun Microsystems, iOS, Blackberry OS, Windows 7 Mobile or Android OS operating systems, or UNIX available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented using various Internet technologies such as, for example, the well-known Common Gateway Interface (CGI) script, PHP Hyper-text Preprocessor (PHP), Active Server Pages (ASP), HyperText Markup Language (HTML), Extensible Markup Language (XML), Java, JavaScript, Asynchronous JavaScript and XML (AJAX), Flash, and other programming methods. Further, various aspects of the present invention may be implemented in a cloud-based computing platform, such as the well-known EC2 platform available commercially from Amazon.com, Seattle, Wash., among others. Various aspects of the invention may be implemented as programmed or non-programmed elements, or any combination thereof.

Example Implementations

Figure 29:
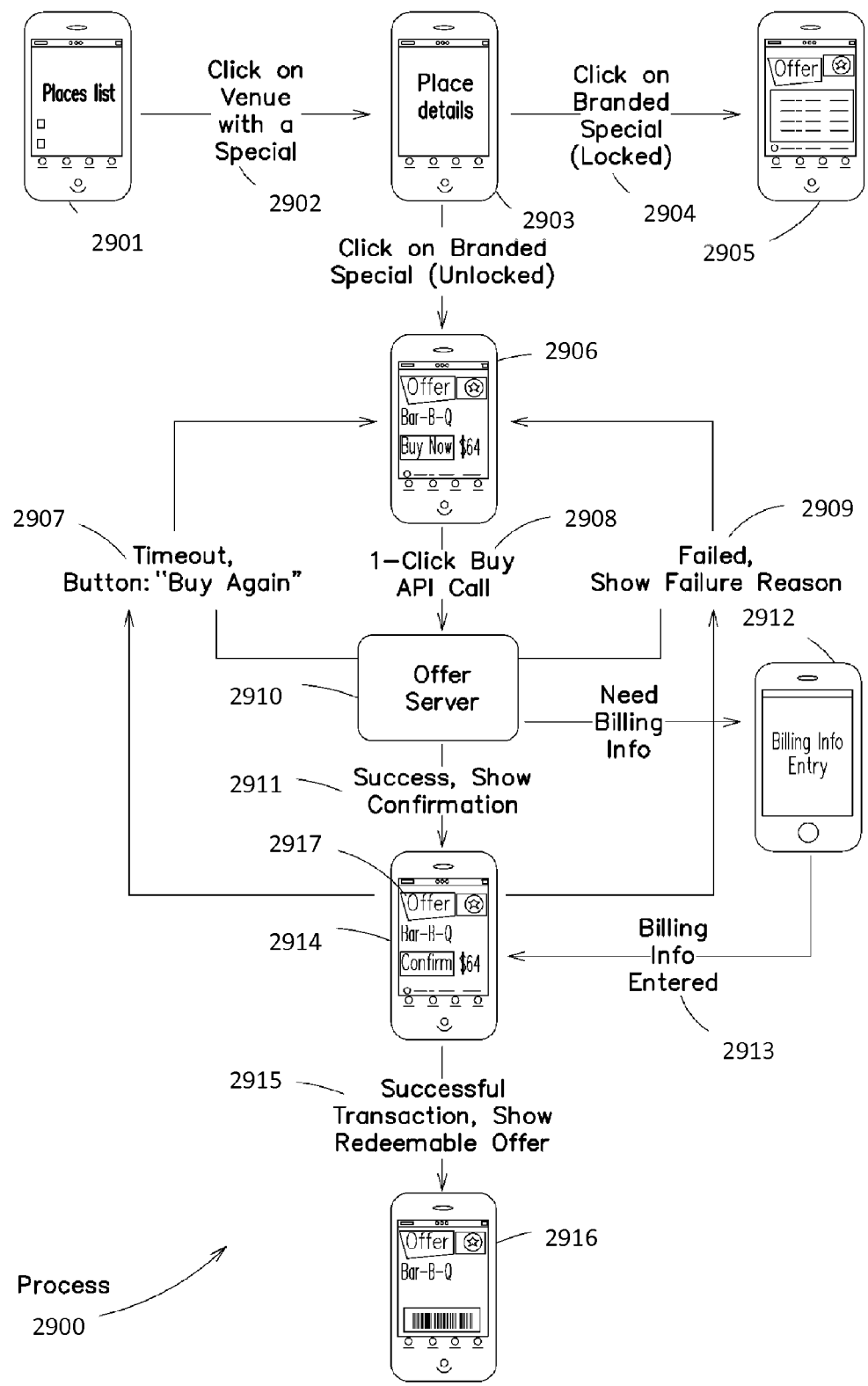
FIG. 29 shows one example implementation of a process where the offers may be purchased in redeemed using a mobile device according to one embodiment of the present invention.
Figure 30:
FIG. 30 shows an example interface of a mobile device according to one embodiment of the present invention.

Below are several implementations according to various embodiments of the present invention. In particular, FIG. 29 shows one example implementation of a process 2900 where the offers may be purchased in redeemed using a mobile device. For instance, a user utilizing a mobile device may be displayed in a list of places 2901 that identifies venues near the user. At 2902, a user selects (e.g., clicks on) a venue having an offer (e.g., a "special") defined for that particular venue. When selected, at 2903, information regarding the venue is displayed to the user.

At 2904, the user selects a branded special associated with particular venue. However, in 2904, the location-based service may prohibit a particular offer from being redeemed if the user has not checked in to the venue, or has satisfied some other criteria for redeeming a particular offer (e.g., the user has not logged into the service, the user has not provided authentication information for an offer server, the user does not belong to a particular loyalty program, among other criteria). At 2905, the particular offer may be indicated to the user on the device is being locked, and therefore cannot be redeemed.

If checked in, the user may select a branded special that is unlocked and may proceed to purchase the offer at 2906. At 2908, a method of buying the application by selecting a control within the user face of the mobile device may be performed. For instance, the user may be provided a one-click control that permits the user to purchase the offer with a single input. According to one embodiment, the location-based service sends a purchase request to an offer server 2910 that processes the offer purchase. The request can timeout, and a button may be displayed that permits the user to buy the offer again at 2907. The purchase may fail for some particular reason at 2909, and a message may be displayed to the user. If billing information is not already known by the device at 2910, the user device may display a billing information entry interface 2912 where billing information is entered (e.g., at 2913).

Figure 31:
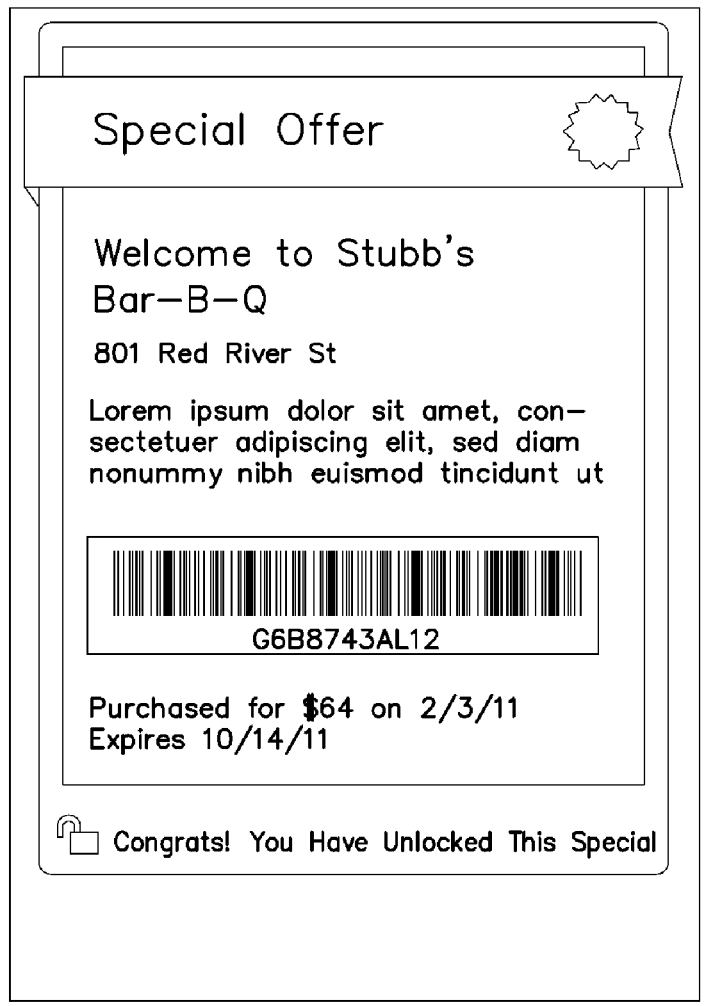
FIG. 31 shows another example interface of a mobile device according to one embodiment of the present invention.

If the purchase is successful at 2911, a confirmation may be displayed to the user on the mobile device at 2914. Further, if the transaction is successful, a redeemable offer may be shown on the display of the mobile device (e.g., at 2915). FIG. 23 shows one example interface that may be displayed to the user from a location-based service application of a mobile device according to one embodiment of the present invention. In another implementation, the device may show within the interface (e.g., 2916) information identifying the purchased offer along with information that may allows the user to redeem the offer at the venue location. For instance, a bar code may be shown identifying the purchase that when scanned at the venue location, allows the user to receive the goods or services associated with a particular offer. For instance, FIG. 31 shows another example interface of a mobile device where the purchased offer includes a bar code that may be scanned at the merchant location. The offer display may include other identifying information, such as, for example, an offer code, serial number or other information that would allow a merchant to verify the offer.

Figure 32:
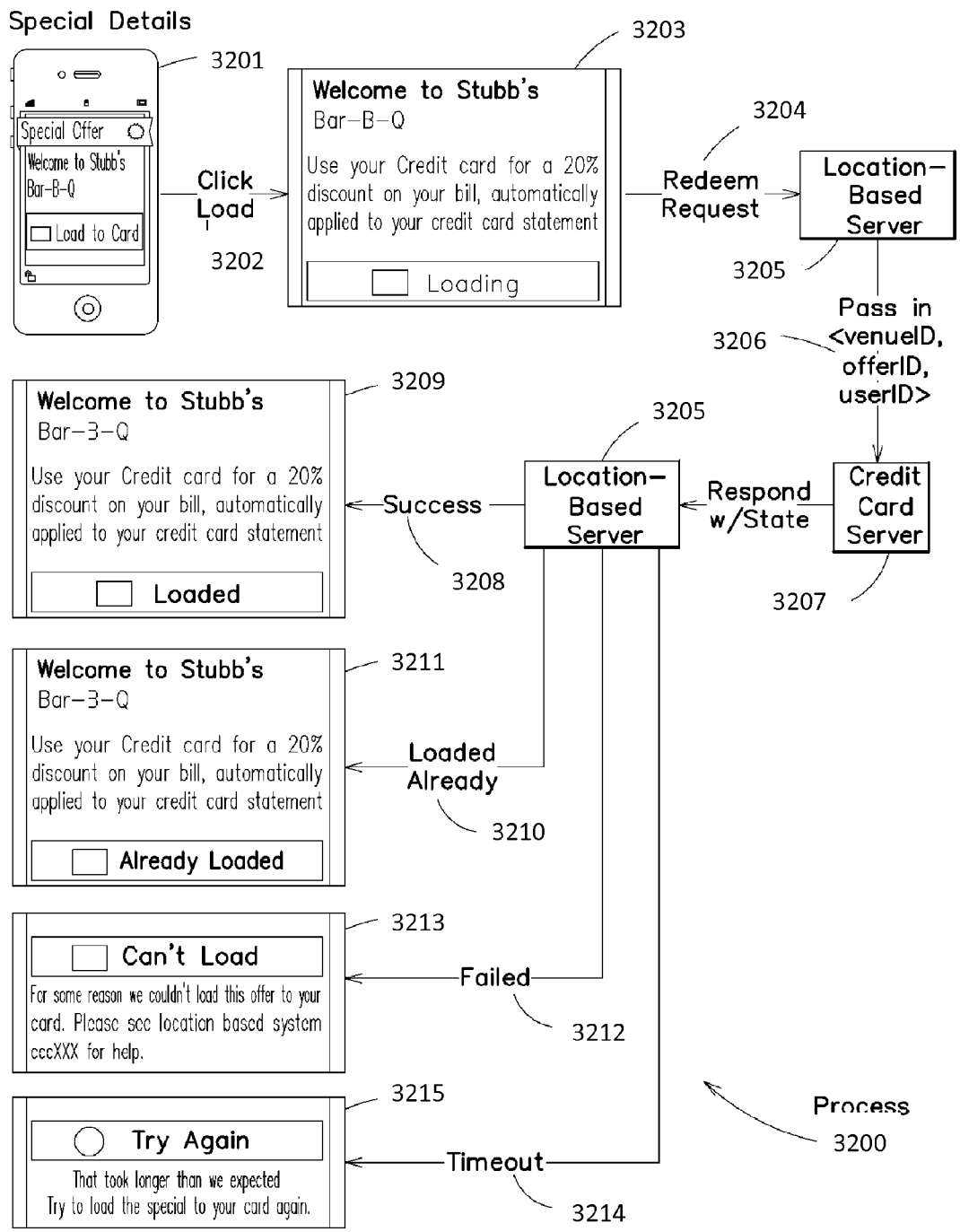
FIG. 32 shows a process for redeeming offers associated with a credit card account in processing such offers using a location-based system according to one embodiment of the present invention.

FIG. 32 shows a process 3200 for redeeming offers associated with a credit card account in processing such offers using a location-based system. In the example shown, one or more offers may be displayed to the user at a mobile device 3201. In one embodiment of the present invention, the user device includes a control that allows a user to associate a particular offer with a particular credit card account. In one implementation, the control "loads" a selected offer (e.g., at 3202) to credit card. It should be appreciated, however, that such a capability may be used with a loyalty account, user account, particular mobile device of the user, system, or other identity of the user.

At 3203, the display of the user device may indicate that a particular offer is being associated with a credit card along with any details of the offer. At 3204, the user redeems the request and a notification is sent to a location-based server 3205. Information relating to the offer to be associated with a particular credit card account is sent to a credit card server 3207. In one example, the information may include a venue identifier, an offer identifier, a user identifier for the credit card server, among other information related to the offer.

The credit card server responds with the state of the redemption request for that particular offer to the location-based service 3205. The location-based server may indicate success 3208 to the user within an interface (e.g., 3209) identifying that the offer will be automatically applied to a credit card statement associated with the cardholder. The location-based server may also indicate that the offer is loaded already onto the credit card account (e.g. at 3210), and may display an indicator to the user within the device interface (e.g., 3211). Further, the location-based server may indicate that the requested failed (3212) and that the system could not associate the offer with the particular card. An indication may be provided to the user within the interface (3213) that the offer could not be associated with the card. Further, the location-based server may indicate that the request has timed out (3214) and that the user should attempt to upload the offer to their card again (3215).

Figure 33:
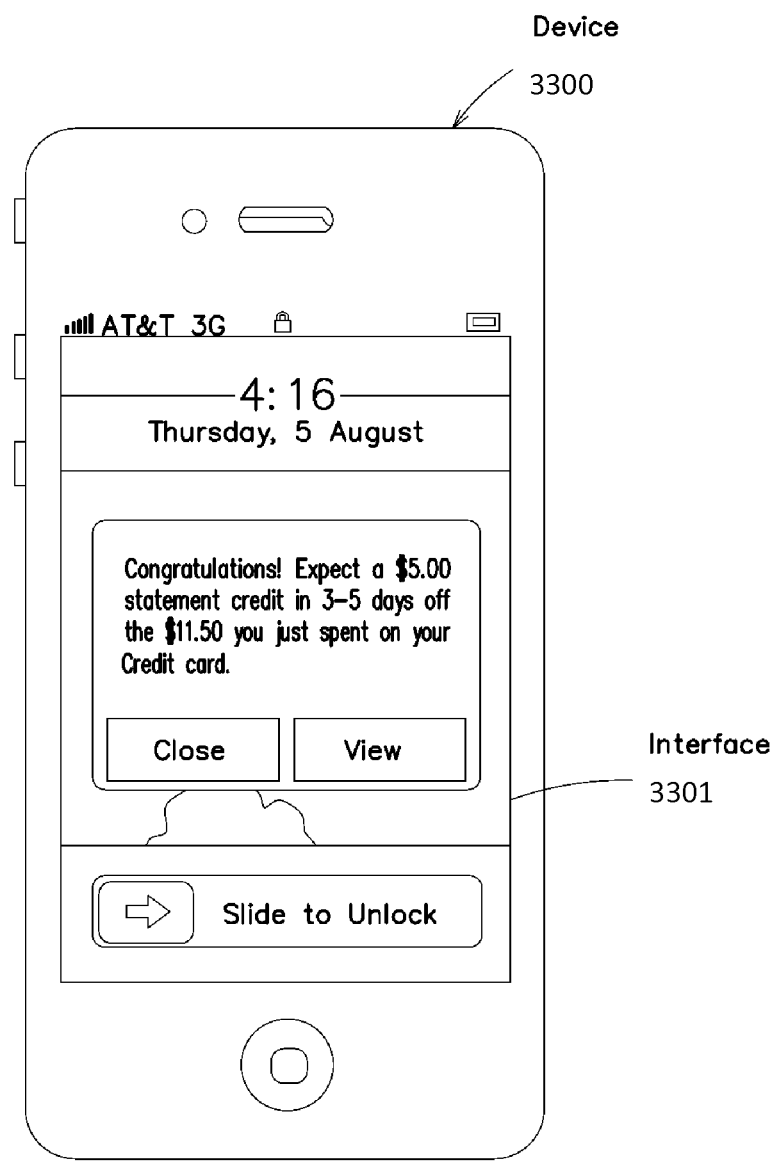
FIG. 33 shows an example interface of the a mobile device that displays an indication to the user according to one embodiment of the present invention.

After a user has successfully associated an offer with a particular credit card, that user may use the credit card to make a qualifying purchase at a particular location. Once the credit card company receives details regarding the transaction, that offer may be applied to the user's credit card account automatically. In yet another embodiment, an indication may be sent to a user of a location-based service when the particular offer is redeemed and applied to the user's credit card account. FIG. 33 shows an interface 3301 of the device 3300 that displays such an indication to the user. The indication may include information relating to the offer such as the discount applied to a particular user's account and any other related information.

Figure 34A:
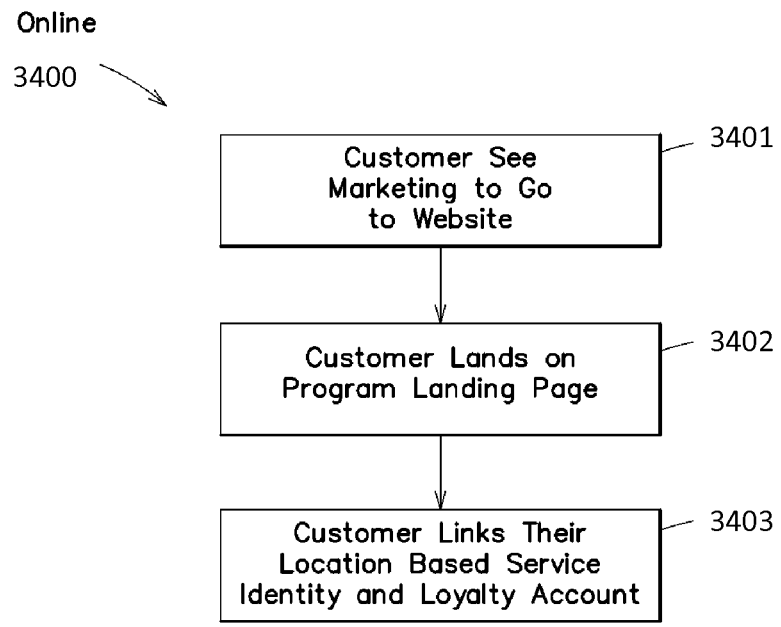
FIGS. 34A-34B show an example of a loyalty program integrated with a location-based service according to one embodiment of the present invention.
Figure 34A:
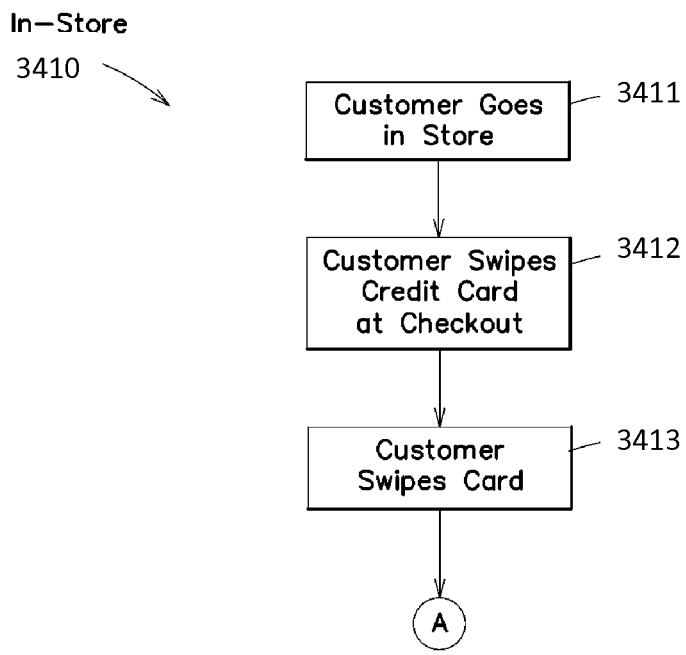
Figure 34B:
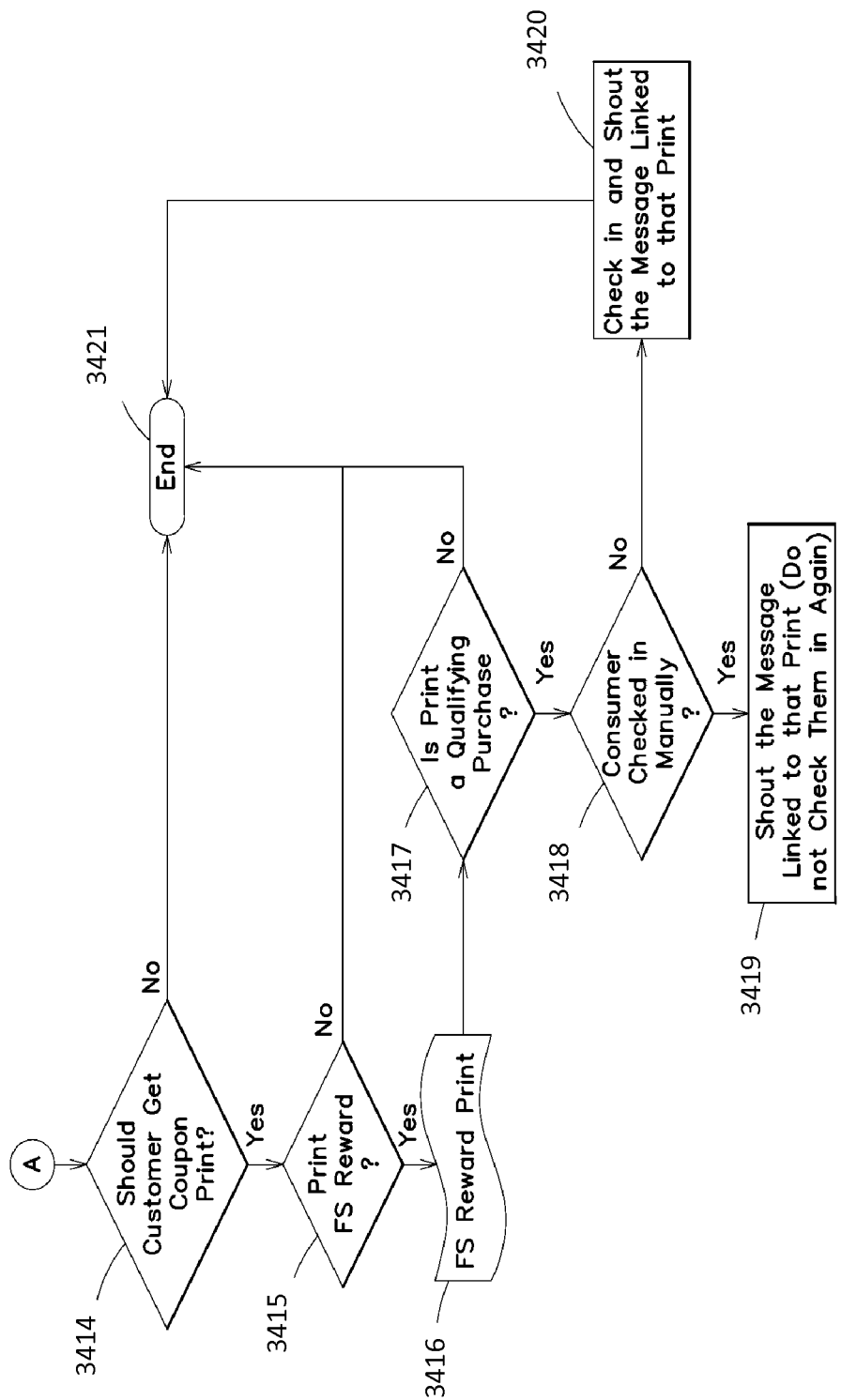

FIGS. 34A-34B show an embodiment of a loyalty program integrated with a location-based service according to one embodiment of the present invention. There may be an online 3400 component of the loyalty program process where a particular user (e.g., a customer of a vendor having a loyalty program) goes to a website (e.g., at 3401) and the customer is directed to a particular landing page (e.g., at 3401) associated with a loyalty account. For instance, there may be a loyalty program associated with a particular vendor, venue location, or other provider of goods and/or services. That customer may access the website to access loyalty program information, account details, redeem offers, or perform other functions and receive other information.

At 3403, the customer links their location-based service identity (e.g., a username, device identifier, and/or other information) with a loyalty account. This may be accomplished, for instance, by providing a control, that when selected, allows the customer to provide information regarding a location-based service identity to a loyalty account system and associate that identity with the loyalty program identity (e.g., a loyalty program username, ID, account number, home or mobile phone number or other identification information). The information may also allow the user to specify particular parameters related to the link, such as preferences of the user relating to opting in to receive offers, notifications, emails, or other communications between systems.

There may be an in-store 3410 component of the loyalty program process where a particular customer goes to the store (e.g., at 3411) to make purchases and redeem particular offers. At 3412, the customer swipes his/her credit card at a checkout along with the customer's loyalty card (e.g., at 3413). At 3414, it is determined whether the customer should get one or more coupon offers printed at the redemption location. If it is determined that an award should be printed at the redemption location (e.g., 3415), then an award is printed (e.g., 3416). It may also be permitted for a customer to instantly redeem an award if a qualifying purchase is made during the current transaction. If the printed award is a qualifying purchase, then the award may be applied to the transaction.

In one embodiment, it may determined whether the customer is "checked-in" to the venue (e.g., at 3418) within the location-based service. In one embodiment, if the user is not checked in (3420), the location-based system automatically checks the user in and sends a message to the user regarding that particular printed award so that they are aware that the award may apply to the current transaction. If it is determined that the user is already checked in, at 3419, the user may be notified that the award may be redeemed. Notably, because the loyalty program identity and the location-based service identity are linked, the customer's use of one of the identities may be updated in the other. For instance, a swipe of a loyalty club card at a particular venue location may cause the user to be automatically checked-in to that venue within the location-based service. At 3421, process 3410 ends.

Figure 35:
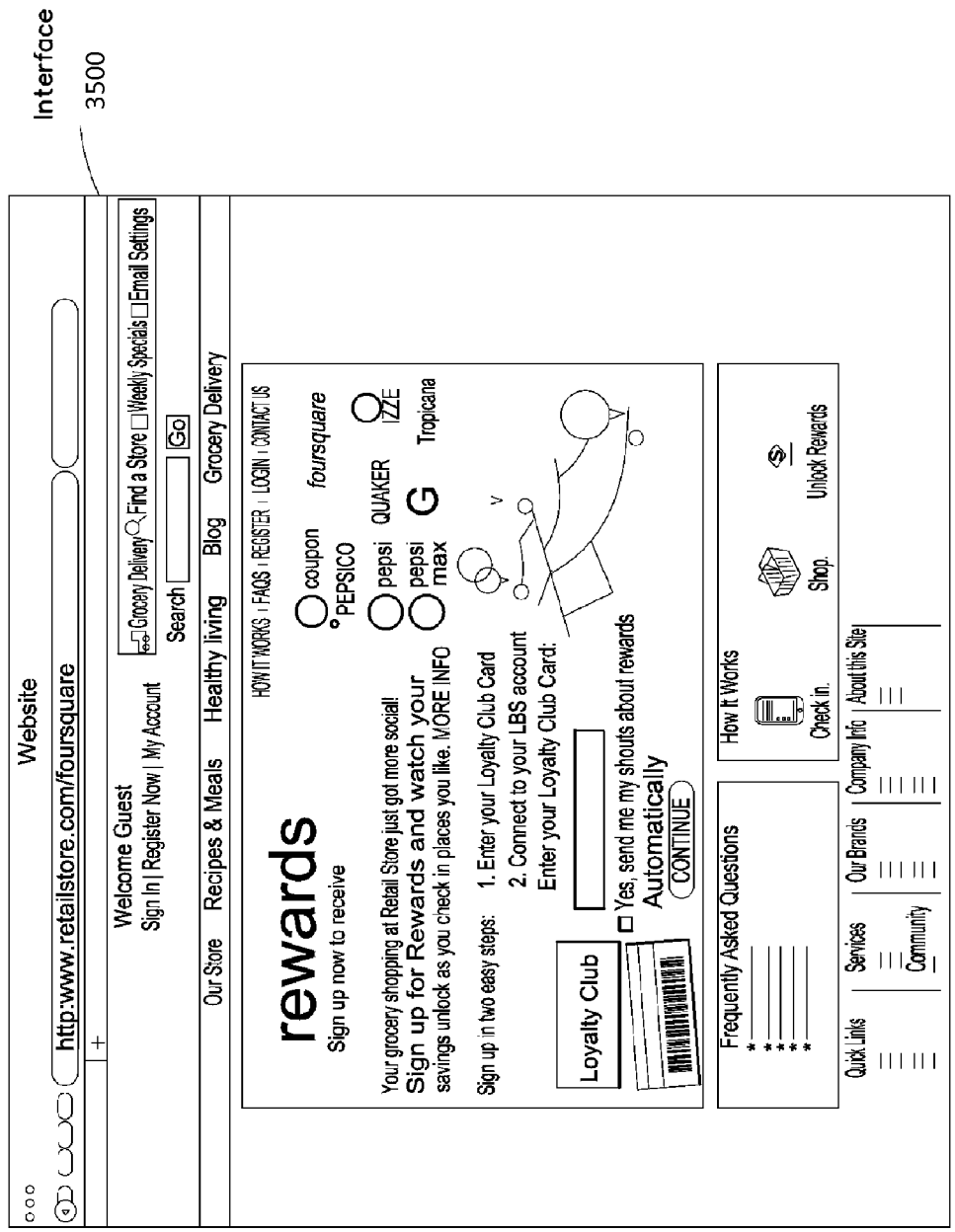
FIG. 35 shows an example website interface 3500 for use with a loyalty program in accordance with one embodiment of the present invention.
Figure 36:
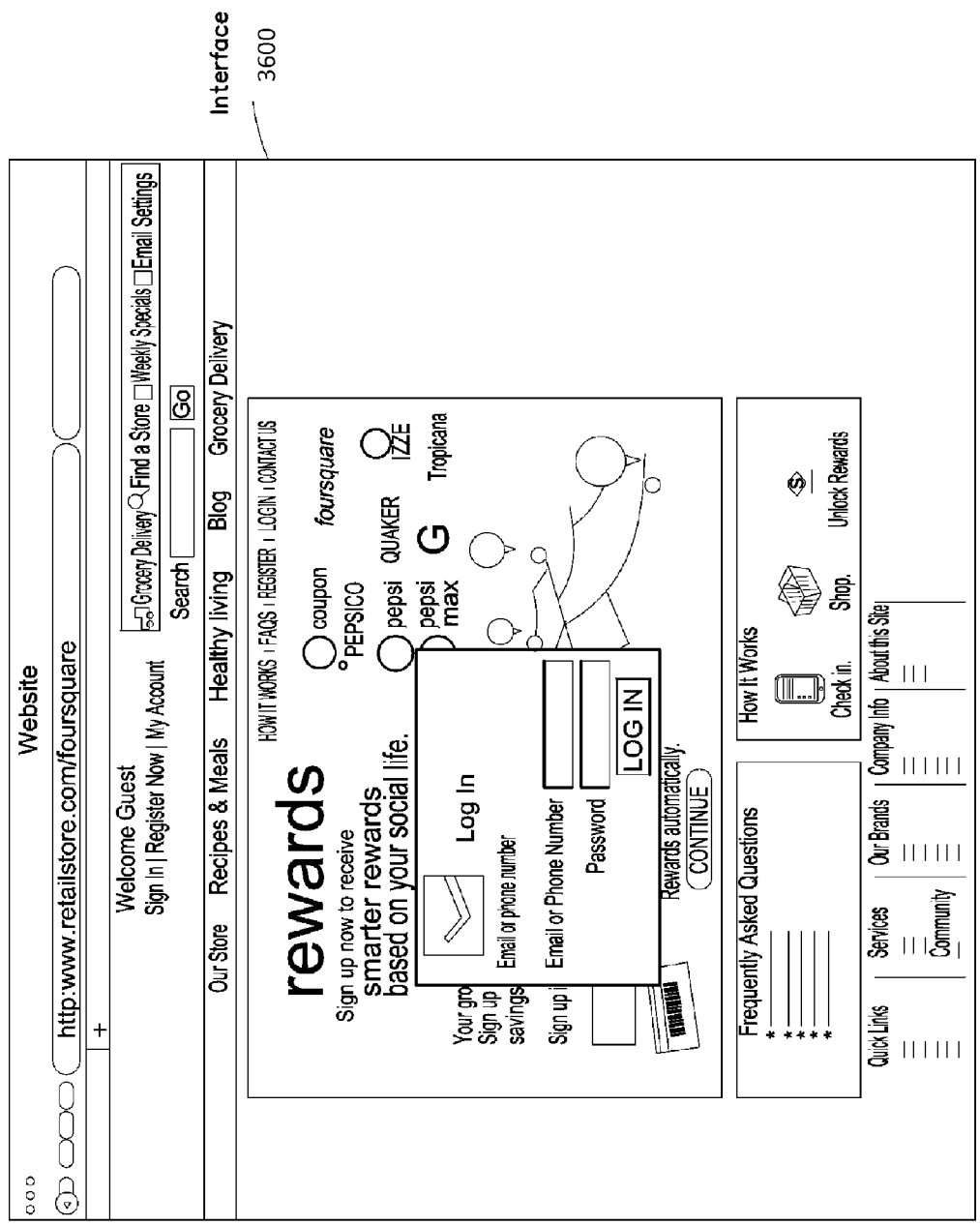
FIG. 36 shows another example website interface for use with a loyalty program in accordance with one embodiment of the present invention.

FIG. 35 shows an example website interface 3500 for use with a loyalty program in accordance with one embodiment of the present invention. For instance, there may be defined a loyalty program in association with a retail store. In one embodiment, a landing page may be provided that allows a customer to link a loyalty club account with a location-based service (LBS) identity. In one embodiment, the loyalty club member inputs their loyalty program identifier and any authentication information (e.g., the member "logs in" to their account in an interface of the website such as that shown in FIG. 36 (interface 3600)). Once authenticated, the member is permitted to enter an identifier of a location-based-service account (e.g., a username, unique identifier, device identifier, or other identifier type) to which the member is associated. The user identifier or other information may be stored by the loyalty program server to permit the location-based application to communicate and perform functions within the loyalty system.

In one embodiment, the user is permitted to check in to the venue, shop for items at the location, and unlock rewards. Such rewards may be printed at the venue (e.g., via a printer located at the check-out such as a Catalina printer), received through the location-based service (e.g., within an interface of the device, such as a popup or message), or may be applied directly to the user's loyalty account. For instance, when the user swipes his/her card at the venue location, that member may receive the award. In another embodiment, the member receives an indication of the award within an application associated with the location-based service. For instance, a notification is displayed in an interface of a mobile device. Many other embodiments may be possible, such as applying a particular offer to a credit card statement in addition to any loyalty program savings for the transaction. In this way, offers may be applied and redeemed in real time, without the necessity of the user knowing apriori what items that he/she would like to purchase, clipping coupons for particular deals ahead of time, and redeeming the deals at the merchant location.

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented using various Internet technologies such as, for example, the well-known Common Gateway Interface (CGI) script, PHP Hyper-text Preprocessor (PHP), Active Server Pages (ASP), HyperText Markup Language (HTML), Extensible Markup Language (XML), Java, JavaScript, Asynchronous JavaScript and XML (AJAX), Flash, and other programming methods. Further, various aspects of the present invention may be implemented in a cloud-based computing platform, such as the well-known EC2 platform available commercially from Amazon.com, Seattle, Wash., among others. Various aspects of the invention may be implemented as programmed or non-programmed elements, or any combination thereof.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A system for providing data in a distributed communications network, the system comprising:
   a component for determining a result set of venue locations based on a provided query; and
   a component for determining a respective score based on at least one of the group of venue information comprising:
      personal information associated with a user;
      social network information relating to one or more of the venue locations; and
      popularity information identifying a popularity of the one or more venue locations.

2. The system of claim 1, wherein the personal information comprises preference information for venues that have already been visited.

3. The system of claim 1, wherein the personal information comprises preference information for venues that have not yet been visited.

4. The system of claim 1, further comprising a component for determining a popularity measure of the one or more venue locations as determined by a set of users defined in the location-based service.

5. The system of claim 1, further comprising a component for adjusting the respective score for at least one of the venue locations in the result set in response to one or more factors relating to the venue locations.

6. The system of claim 1, wherein the popularity for the one or more venue locations is based on how one or more experts view the one or more venue locations.

7. The system of claim 1, further comprising a component for limiting the result set of venue locations responsive to at least one of a determination of densities of venues in a particular area and a determination of a distance between subsequent visits in a particular area.

8. The system of claim 1, further comprising a component for ordering, within the interface of the mobile device, a plurality of the venue locations of the result set based on at least one or more of the group of venue information.

9. The system of claim 8, wherein the component for ordering the plurality of venue locations is responsive to a component for determining a sentiment for at least one of the plurality of venue locations.

10. The system of claim 1, wherein the data related to the venue locations relates to one or more recommendations.

11. The system of claim 1, wherein the data related to the venue locations relates to one or more offers.

12. A system for processing data by a location-based service, the system comprising:
    a component for determining that a location is proximate to a venue at which the at least one offer may be accepted;
    a monitoring component being responsive to the determination that the determined location is proximate to the venue at which the at least one offer may be accepted;
    a component for presenting, an indication of the at least one offer responsive to determining that the determined location is proximate to a venue at which the one or more offers may be accepted and responsive to determining that the venue has been visited; and
    a component for permitting redemption of the at least one offer.

13. The system of claim 12, further comprising a component for associating the at least one offer with at least one of a group comprising a credit card program, a loyalty program, and a third party offer.

14. The system of claim 12, further comprising a component for presenting, in the display of the mobile device, a control that permits acceptance of the at least one offer.

15. The system of claim 12, wherein the component for permitting redemption of the offer at the venue further comprises a component that automatically accepts the offer at the venue without user intervention.

16. The system according to claim 12, wherein the component for receiving the data related to the at least one offer is adapted to receive the at least one offer from a source of offers separate from the location-based service.

17. A computer-implemented method for processing data by a location-based service, the method comprising:
- determining that a location is proximate to a venue at which the at least one offer is available;
- monitoring whether the venue has been visited;
- when the venue has been visited, displaying an indication of the at least one offer within the interface of the mobile device; and
- displaying a control that permits redemption of the at least one offer.

18. The method according to claim 1, further comprising targeting the at least one offer to the user responsive to the determined location.

19. The method according to claim 1, further comprising determining that the at least one offer may be fulfilled by the user.

20. The method according to claim 11, further comprising executing a purchase associated with the at least one offer.

* * * * *